United States Patent
Álvarez Vallina et al.

(10) Patent No.: US 12,540,181 B2
(45) Date of Patent: Feb. 3, 2026

(54) ANTI-CD19/ANTI-CD3 BISPECIFIC ANTIBODY, T CELLS SECRETING THE SAME, METHOD OF PREPARATION AND USE THEREOF

(71) Applicants: FUNDACION PARA LA INVESTIGACION BIOMEDICA HOSPITAL 12 DE OCTUBRE, Madrid (ES); FUNDACIÓN CRIS DE INVESTIGACIÓN PARA VENCER EL CÁNCER, Madrid (ES); HOSPITAL CLINIC DE BARCELONA, Barcelona (ES); INSTITUT D'INVESTIGACIONS BIOMÈDIQUES AUGUST PI I SUNYER, Barcelona (ES)

(72) Inventors: Luis Manuel Álvarez Vallina, Madrid (ES); Belén Blanco Durango, Madrid (ES); Manel Juan Otero, Barcelona (ES)

(73) Assignees: FUNDACION PARA LA INVESTIGACION BIOMEDICA HOSPITAL 12 DE OCTUBRE, Madrid (ES); FUNDACIÓN CRIS DE INVESTIGACIÓN PARA VENCER EL CANCER, Madrid (ES); HOSPITAL CLINIC DE BARCELONA, Barcelona (ES); INSTITUT D'INVESTIGACIONS BIOMÈDIQUES AUGUST PI I SUNYER, Barcelona (ES)

( * ) Notice: Subject to any disclaimer, the term of this patent is extended or adjusted under 35 U.S.C. 154(b) by 665 days.

(21) Appl. No.: 17/800,032

(22) PCT Filed: Feb. 16, 2021

(86) PCT No.: PCT/EP2021/053745
§ 371 (c)(1),
(2) Date: Aug. 16, 2022

(87) PCT Pub. No.: WO2021/165248
PCT Pub. Date: Aug. 26, 2021

(65) Prior Publication Data
US 2023/0087263 A1   Mar. 23, 2023

(30) Foreign Application Priority Data
Feb. 17, 2020   (EP) .................................... 20382113

(51) Int. Cl.
| | |
|---|---|
| *C07K 16/28* | (2006.01) |
| *A61K 40/11* | (2025.01) |
| *A61K 40/31* | (2025.01) |
| *A61K 40/33* | (2025.01) |
| *A61K 40/42* | (2025.01) |
| *A61P 35/02* | (2006.01) |

(52) U.S. Cl.
CPC .......... *C07K 16/2809* (2013.01); *A61K 40/11* (2025.01); *A61K 40/31* (2025.01); *A61K 40/33* (2025.01); *A61K 40/4211* (2025.01); *A61P 35/02* (2018.01); *C07K 16/2803* (2013.01); *C07K 2317/31* (2013.01); *C07K 2317/622* (2013.01)

(58) Field of Classification Search
CPC . C07K 16/2809; A61P 35/02; A61K 40/4211; A61K 40/33
See application file for complete search history.

(56) References Cited

U.S. PATENT DOCUMENTS

2019/0284279 A1   9/2019   Kong et al.

FOREIGN PATENT DOCUMENTS

| EP | 1629012 A1 | 3/2006 | |
|---|---|---|---|
| WO | 2004106381 A1 | 12/2004 | |
| WO | WO-2014138306 A1 * | 9/2014 | ............. A61K 35/17 |

OTHER PUBLICATIONS

Fan et al. 2015 (Bispecific antibodies and their applications; Journal of Hematology & Oncology 8:130). (Year: 2015).*
Patrick Hoffmann et al., "Serial killing of tumor cells by cytotoxic T cells redirected with a CD19-/CD3-bispecific single-chain antibody construct," International Journal of Cancer, May 20, 2005, pp. 98-104, vol. 115, No. 1.
A Löffler et al., "Efficient elimination of chronic lymphocytic leukaemia B cells by autologous T cells with a bispecific anti-CD19/anti-CD3 single-chain antibody construct," Leukemia, Jun. 2003, pp. 900-909, vol. 17, No. 5.
X Liu et al., "Improved anti-leukemia activities of adoptively transferred T cells expressing bispecific T-cell engager in mice," Blood Cancer Journal, Apr. 2016.
Belén Blanco et al., "T Cell-Redirecting Strategies to 'STAb' Tumors: Beyond CARs and Bispecific Antibodies," Trends in Immunology, Mar. 2019, pp. 243-257, vol. 40, No. 3.

(Continued)

*Primary Examiner* — Mary Maille Lyons
(74) *Attorney, Agent, or Firm* — Pilloff Passino & Cosenza LLP; Rachel Pilloff; Sean Passino

(57) ABSTRACT

The present invention relates to a bispecific antibody comprising an anti-CD19 single-chain fragment variable and an anti-CD3 single-chain fragment variable. The present invention also relates to T cells secreting the bispecific antibody, method of preparation of T cells secreting the bispecific antibody and uses thereof in the treatment of a hematological malignancy selected from the group consisting of lymphoma, leukemia and myeloma.

20 Claims, 29 Drawing Sheets
Specification includes a Sequence Listing.

(56) References Cited

OTHER PUBLICATIONS

Claudia Bluemel et al., Epitope distance to the target cell membrane and antigen size determine the potency of T cell-mediated lysis by BiTE antibodies specific for a large melanoma surface antigen, Cancer Immunol Immunother, Mar. 2010, pp. 1,197-1,209, vol. 59.

Mireya Paulina Velasquez et al., "T cells expressing CD19-specific Engager Molecules for the Immunotherapy of CD19-positive," Malignancies Scientific Reports, Jun. 2016, 6:27130.

Maria Castella et al., Development of a Novel Anti-CD19 Chimeric Antigen Receptor: A Paradigm for an Affordable CAR T Cell Production at Academic Institutions, Molecular Therapy Methods & Clinical Development, Mar. 2019, pp. 134-144, vol. 12.

Kota Iwahori et al., Engager T Cells: A New Class of Antigen-specific T Cells That Redirect Bystander T Cells, Molecular Therapy, Jan. 2015, pp. 171-178, vol. 23, No. 1.

Lars Kjer-Nielsen et al., "Crystal structure of the human T cell receptor CD3εγ heterodimer complexed to the therapeutic mAb OKT3," Proceedings of the National Academy of Sciences of the United States of America, May 2004, pp. 7,675-7,680, vol. 101, No. 20.

Bruce E. Bejcek et al., Development and Characterization of Three Recombinant Single Chain Antibody Fragments (scFvs) Directed against the CD19 Antigen, Cancer Research, Jun. 1995, pp. 2,346-2,351, vol. 55.

International Search Report and Written Opinion for PCT/EP2021/053745, mailed Jun. 21, 2021.

Ryan Haryadi, et al., Optimization of heavy chain and light chain signal peptides for high level expression of therapeutic antibodies in CHO cells. PLoS One. Feb. 23, 2015;10(2):e0116878. doi: 10.1371/journal.pone.0116878.PMID: 25706993; PMCID: PMC4338144.

Marta Compte, et al., Functional comparison of single-chain and two-chain anti-CD3-based bispecific antibodies in gene immunotherapy applications. Oncoimmunology. May 23, 2014;3:e28810. doi: 10.4161/onci.28810. PMID: 25057445; PMCID: PMC4091452.

Belen Blanco et al., Overcoming CAR-Mediated CD19 Downmodulation and Leukemia Relapse with T Lymphocytes Secreting Anti-CD19 T-cell Engagers. Cancer Immunol Res. Apr. 1, 2022;10(4):498-511. doi: 10.1158/2326-6066.CIR-21-0853. PMID: 35362043; PMCID: PMC7612571.

Laura Sanz, et al., Long-term in vivo imaging of human angiogenesis: critical role of bone marrow-derived mesenchymal stem cells for the generation of durable blood vessels. Microvasc Res. Apr. 2008;75(3):308-14. doi: 10.1016/j.mvr.2007.11.007. Epub Dec. 15, 2007. PMID: 18252255.

* cited by examiner

B

C

D

| A-T | $10^0$ | $10^1$ | $10^2$ | $10^3$ | $10^4$ | $10^5$ |
|---|---|---|---|---|---|---|
| $T_h0$ | $10^5$ | $10^5$ | $10^5$ | $10^5$ | $9 \times 10^4$ | 0 |
| A-T:Target | 1:50000 | 1:5000 | 1:500 | 1:50 | 1:5 | 2:1 |

E

F

G

ANTI-CD19/ANTI-CD3 BISPECIFIC ANTIBODY, T CELLS SECRETING THE SAME, METHOD OF PREPARATION AND USE THEREOF

TECHNICAL FIELD

The present invention relates to the field cancer immunotherapies based on bispecific antibodies or on T cells modified by genetic engineering for secreting bispecific antibodies. In particular, the present invention relates to bispecific antibodies comprising an anti-CD19 and an anti-CD3 domain and T cells secreting the same, useful for the treatment of hematological malignancies, such as lymphoma, leukemia and myeloma.

BACKGROUND ART

Several cancer immunotherapies based on the recognition of tumor-associated antigens (TAA) by T cells have emerged in the past few decades, such as therapies based on chimeric antigen receptors (CAR) or bispecific antibodies.

CAR is a synthetic receptor consisting of an extracellular antibody domain that recognizes a TAA and an intracellular signaling domain derived from the T cell receptor (TCR), most commonly CD3ζ (the zeta chain associated with the T cell receptor complex). Second- and third-generation CARs also include one or two co-stimulatory domains, respectively, usually derived from CD28 and/or 4-1BB. In CAR-T cell therapies, autologous T cells from the patient are manipulated ex vivo to express a CAR recognizing a TAA and are infused back into the patient.

Bispecific antibodies are engineered antibodies designed to recognize two different epitopes of the same or different antigens. Tandem single-chain fragment variable (scFv), also known as bispecific T cell engager (BiTE), consists of two scFv connected by a flexible linker on a single polypeptidic chain. Blinatumomab is an anti-CD19/anti-CD3 tandem scFv approved by the U.S. Food and Drug Administration (FDA) under the accelerated approval program for the treatment of relapsed/refractory B cell acute lymphoblastic leukemia (ALL) and minimal residual disease-positive B cell ALL.

Secretion of bispecific antibodies by T cells modified by genetic engineering combines aspects of antibody-based therapies and cell-based therapies. Bispecific antibodies secreted in the tumor by T cells modified by genetic engineering redirect non-engineered infiltrating T cells (bystander T cells) to tumor cells. In addition, cells engineered to produce bispecific antibodies located outside tumors have demonstrated potent systemic antitumor activity in mouse tumor models (Blanco et al, 2019).

T cells transduced by retrovirus and secreting an anti-CD3/anti-CD19 bispecific BiTE antibody in vitro recognized tumor cells and redirected infiltrating T cells (bystander T cells) to tumor cells and infusion of said T cells resulted in regression of leukemia and lymphoma in xenograft animal models (Velasquez et al, 2016).

T cells transduced by RNA electroporation and secreting an anti-CD3/anti-CD19 bispecific BiTE antibody has been disclosed by Liu et al. Said T cells were tested both in vitro and in a leukemia mouse model and compared with CD19 CAR-T cells. The T cells recognize CD19+ cells lines and has increased tumor killing ability, prolonged functional persistence, increased cytokine production and potent proliferation over CD19 CAR-T cells (Liu et al, 2016).

Anti-CD3 OKT3 single-chain fragment variable (scFv) (Iwahori et al, 2015) and a CAR comprising the anti-CD19 A3B1 scFv (Castella et al, 2019) have been disclosed in the prior art.

There is currently a need to develop improved cancer immunotherapies based on anti-CD19/anti-CD3 bispecific antibodies and on modified T cells by genetic engineering for secreting them. Said improved cancer immunotherapies provide substantial benefits to the treatment of cancer patients.

SUMMARY OF INVENTION

As used in this specification and the appended claims, the singular forms "a", "an", and "the" include plural referents unless the content clearly dictates otherwise. Thus, for example, reference to "a cell" includes a combination of two or more cells, and the like.

Unless defined otherwise, all the technical and scientific terms have the same meaning as those commonly understood by a person skilled in the art in the field of the invention.

Throughout the description and the claims, the terms "comprises", "comprising" and their variants are not limiting in nature and therefore do not aim to exclude other technical features.

Throughout the description and the claims, the terms "comprise", "comprising" and their variants includes, specifically, the term "consisting" or "consisting of". When referred to compounds or biological sequences, it can be understood that the compounds of the invention may "comprise" any of the sequences along with other sequences or molecules or, in a preferred embodiment, the compounds of the invention may "consist of" any of said sequences, the latter case meaning that the compounds of the invention are precisely restricted to the fragment identified as such by the sequence.

Amino acids are referred herein by their commonly known three letter symbols. The following three letter symbols are used herein: Ile, Ala, Ser, Asp, Thr and Gly. "Ile" refers to isoleucine, "Ala" refers to alanine, "Ser" refers to serine, "Asp" refers to aspartic acid, "Thr" refers to threonine and "Gly" refers to glycine.

An exemplary immunoglobulin (antibody) structural unit is composed of two pairs of polypeptide chains, each pair having one "light" (about 25 kD) and one "heavy" chain (about 50-70 kD). The N-terminal domain of each chain defines a variable region of about 100 to 110 or more amino acids primarily responsible for antigen recognition. The terms variable light chain ($V_L$) and variable heavy chain ($V_H$) refer to these light and heavy chain domains respectively.

The term "bispecific antibody" refers to an antibody having two different antigen-binding regions defined by different antibody sequences. This can be understood as different target binding but includes as well binding to different epitopes in one target.

The term "single-chain fragment variable" (scFv) molecule refers to a molecule having a variable domain of light chain ($V_L$) and a variable domain of heavy chain ($V_H$) connected by a polypeptide chain, arranged in the order $V_L$-$V_H$ or $V_H$-$V_L$.

The term "BiTE", also known as "tandem single chain fragment variable (ta-scFv)", refers to bispecific T cell engager and consists of two scFv connected by a flexible linker on a single polypeptidic chain.

An "anti-CD19/anti-CD3 bispecific antibody" refers to a bispecific antibody comprising two different antigen-binding regions, one of which binds specifically to the antigen CD19 and one of which binds specifically to CD3.

"CDR" refers to complementarity determining regions. Complementarity determining regions are part of the variable chains in antibodies, where these molecules bind to their specific antigen. There are three CDRs (CDR1, CDR2 and CDR3) on the amino acid sequence of a variable domain of an antibody.

By a protein (or antibody) or polynucleotide having a sequence at least, for example, 95% "identical" to a reference sequence of the present invention, it is intended that the sequence is identical to the reference sequence except that the sequence may include up to five different residues per each 100 residues of the reference sequence. In other words, to obtain a protein (or antibody) having an amino acid sequence at least 95% identical to a reference protein sequence, up to 5% of the amino acids in the reference sequence may be deleted or substituted with another amino acids, or a number of amino acids up to 5% of the total amino acids in the reference sequence may be inserted into the reference sequence. These alterations of the reference sequence may occur at the 5' or 3' terminal positions of the reference sequence or anywhere between those terminal positions, interspersed either individually among residues in the reference sequence or in one or more contiguous groups within the reference sequence. As a practical matter, whether any protein (or antibody) or polynucleotide sequence is at least, for example, 95% identical to a sequence of the present invention can be determined conventionally using known computer programs.

The term "genetic engineering" refers to modification and editing the genome of mammalian cells by gene transfer and gene-editing technologies. Genetic engineering may be applied to T cells, as well as other immune cells, such as natural killer cells.

The term "transducing" refers to a process by which an exogenous polynucleotide is introduced into a host cell. A "transduced" cell is one which has been transduced with an exogenous polynucleotide. The cell includes the primary subject cell and its progeny.

"Chimeric Antigen Receptor" (CAR) refers to a synthetic receptor consisting of an extracellular antibody domain that recognizes a tumor-associated antigen (TAA) and an intracellular signaling domain derived from the T cell receptor (TCR), most commonly CD3 (the zeta chain associated with the T cell receptor complex). CAR may also include one or two co-stimulatory domains, usually derived from CD28 and/or 4-1BB.

"CAR-T cell treatment" refers to a treatment in which autologous T cells from a patient are modified ex vivo by genetic engineering to express a CAR recognizing a tumor-associated antigen (TAA) and are infused back into the patient.

The term "bystander T cell" refers to a T cell present at the tumor site that can be activated through a mechanism which is independent from its endogenous T cell receptor (TCR) specificity.

The term "STAb-T cell treatment" refers to a cancer therapy based on endogenous secretion of bispecific antibodies secreted by T cells modified by genetic engineering, in which said bispecific antibodies secreted in the tumor by T cells modified by genetic engineering redirect non-engineered infiltrating T cells (bystander T cells) to tumor cells. "STAb-T cells" refers to T cells modified by cell engineering for secreting bispecific antibodies.

The term "effective amount" refers to the amount of a molecule or cell, such as an antibody or cell, that provides an objectively identifiable improvement in the subject's condition, recognized by a qualified observer, wherein said patient treated with a pharmaceutical composition comprising said amount of the molecule or cell.

The term "vector" refers to a polynucleotide molecule that is used to introduce and direct the expression of a specific gene in a target cell. The term includes the vector as a self-replicating polynucleotide as well as the vector incorporated into the genome of a host cell into which it has been introduced. Once the vector is inside the target cell, the ribonucleic acid molecule or protein that is encoded by the gene is produced by the cellular transcription and/or translation machinery.

The term "transwell assay" refers to a test carried out in a plate comprising an upper well (insert well) and a bottom well, separated by a transwell membrane. There are several transwell membranes with pore sizes that range from 3 μm, 5 μm, and 8 μm, which are commercially available from companies such as Corning. If the cells are too large compared to the pore size of the transwell membrane, they don't pass through the pores.

The term "IL" refers to interleukin. Throughout the description and the claims, the following terms are used: IL-1, IL-2, IL-7 and IL-15. "IL-1" refers to the protein interleukin 1, "IL-2" refers to the protein interleukin 2, "IL-7" refers to the protein interleukin 7 and "IL-15" refers to the protein interleukin 15, and the like.

The technical problem to be solved is to provide improved anti-CD19/anti-CD3 bispecific antibodies and improved T cells modified by genetic engineering for secreting them which provide improved cancer immunotherapies.

The invention as defined in the claims provides a solution to this technical problem.

The present invention provides a bispecific antibody comprising:
  an anti-CD19 single-chain fragment variable (scFv) comprising an anti-CD19 light chain variable domain $V_L$CD19 and an anti-CD19 heavy chain variable domain $V_H$CD19,
  an anti-CD3 single-chain fragment variable (scFv) comprising an anti-CD3 heavy chain domain $V_H$CD3 and an anti-CD3 light chain domain $V_H$CD3,
  wherein the domains are arranged in the order $V_L$CD19-$V_H$CD19-$V_H$CD3-$V_H$CD3,
  wherein said bispecific antibody comprises:
  an anti-CD19 light chain CDR1 region consisting of the amino acid sequence SEQ ID NO: 10,
  an anti-CD19 light chain CDR2 region consisting of the amino acid sequence Ile-Ala-Ser,
  an anti-CD19 light chain CDR3 region consisting of the amino acid sequence SEQ ID NO: 11,
  an anti-CD19 heavy chain CDR1 region consisting of the amino acid sequence SEQ ID NO: 12,
  an anti-CD19 heavy chain CDR2 region consisting of the amino acid sequence SEQ ID NO: 13,
  an anti-CD19 heavy chain CDR3 region consisting of the amino acid sequence SEQ ID NO: 14,
  an anti-CD3 heavy chain CDR1 region consisting of the amino acid sequence SEQ ID NO: 15,
  an anti-CD3 heavy chain CDR2 region consisting of the amino acid sequence SEQ ID NO: 16 and
  an anti-CD3 heavy chain CDR3 region consisting of the amino acid sequence SEQ ID NO: 17,
  an anti-CD3 light chain CDR1 region consisting of the amino acid sequence SEQ ID NO: 18, an anti-CD3 light chain CDR2 region consisting of the amino acid sequence Asp-Thr-Ser, an anti-CD3 light chain CDR3 region consisting of the amino acid sequence SEQ ID NO: 19.

In embodiments, the bispecific antibody of the invention also includes antigen binding fragments thereof, which refers to fragments of the bispecific antibody capable of binding to the antigens of the bispecific antibody of the invention, i.e. CD19 and CD3.

The bispecific antibody of the invention is based on the combination of the anti-CD19 A3B1 scFv and the anti-CD3 OKT3 scFv. The bispecific antibody of the invention unexpectedly provides an improved cytotoxic activity with respect to the bispecific antibodies disclosed in the prior art.

It is known that the OKT3 clone binds to a conformational epitope dominated by a linear stretch of residues present in one of the CD3ε subunit loops (Kjer-Nielsen et al, 2004) and both the bispecific antibody of the invention and blinatumomab recognized, with different affinities, a similar epitope located on the CD3ε subunit of the complex.

However, the bispecific antibody of the invention and blinatumomab recognize different epitopes. The HD37 clone of blinatumomab recognizes the same region as the anti-CD19 B43 clone, or an adjacent one. The crystal structure of the CD19-B43 complex revealed that the monoclonal antibody B43 binds an epitope located on a region distant to the cell membrane. The bispecific antibody of the invention binds to a region closer to the cell membrane.

The exact location of the epitope impacts the access of the bispecific antibodies to their binding region and relates to their cytotoxic activity. Epitopes located in regions distant to the cell membrane have easier access than epitopes located close to the cell membrane, since the latter would have to face several steric effects associated to the epitope's proximity to the cell membrane. Thus, HD37-based interaction, as it is far from the cell membrane, results in a more efficient binding; in contrast, binding of the bispecific antibodies of the invention, results in a less efficient binding, since the epitope is located in a region closer to the cell membrane.

It has been reported that bispecific antibodies recognizing epitopes located in regions distant to the cell membrane showed reduced cytotoxic activity (Bluemel et al, 2010).

The bispecific antibodies of the invention benefit from their membrane-proximal epitope hence resulting in increased cytotoxic activity.

The examples of the invention evidence that T cells according to the invention efficiently secrete a bispecific antibody according to the invention and said T cells successfully activate unstimulated T cells when co-cultured in the presence of CD19+, but not CD19-target cells.

In an embodiment of the bispecific antibody of the invention:
the anti-CD19 light chain variable domain $V_L$CD19 is at least 95% identical to the amino acid sequence SEQ ID NO: 3,
the anti-CD19 heavy chain variable domain $V_H$CD19 is at least 95% identical to the amino acid sequence SEQ ID NO: 5,
the anti-CD3 heavy chain variable domain $V_H$CD3 is at least 95% identical to the amino acid sequence SEQ ID NO: 7 and
the anti-CD3 light chain variable domain $V_L$CD3 is at least 95% identical to the amino acid sequence SEQ ID NO: 9.

In a preferred embodiment of the bispecific antibody of the invention:

the anti-CD19 light chain variable domain $V_L$CD19 consists of the amino acid sequence SEQ ID NO: 3,
the anti-CD19 heavy chain variable domain $V_H$CD19 consists of the amino acid sequence SEQ ID NO: 5,
the anti-CD3 heavy chain variable domain $V_H$CD3 consists of the amino acid sequence SEQ ID NO: 7 and
the anti-CD3 light chain variable domain $V_L$CD3 consists of the amino acid sequence SEQ ID NO: 9.

In a preferred embodiment, the bispecific antibody of the invention further comprises a signal peptide.

In a preferred embodiment of the bispecific antibody of the invention, said signal peptide is selected from the group consisting of human kappa light chain signal peptide, human lambda light chain signal peptide, human heavy chain signal peptide ($V_H1$, $V_H2$, $V_H3$, $V_H4$, $V_H5$, $V_H6$ or $V_H7$), oncostatin M signal peptide, human interleukin signal peptides, such as IL-1 signal peptide and IL-2 signal peptide.

In a preferred embodiment, the bispecific antibody of the invention further comprises a linker.

Suitable nonimmunogenic linker peptides include $(Gly_4\text{-}Ser)_n$, $(Ser\text{-}Gly_4)_n$, $(Gly_4\text{-}S)_n$, $Gly_4(Ser\text{-}Gly_4)_n$ or $Gly_2(Ser\text{-}Gly_2)_n$ linker peptides, wherein n is generally a number between 1 and 10, typically between 1 and 4.

In a preferred embodiment, said linker is a peptide linker consisting of the amino acid sequence selected from the group consisting of $(Gly_4\text{-}Ser)_n$, $(Ser\text{-}Gly_4)_n$, $(Gly_4\text{-}S)_n$, $Gly_4(Ser\text{-}Gly_4)_n$, $Gly_2(Ser\text{-}Gly_2)_n$, wherein n is a value from 1 to 10. In a more preferred embodiment, said linker is a peptide linker consisting of the amino acid sequence $(Gly_4\text{-}Ser)_n$, wherein n is a value from 1 to 10. In a yet more preferred embodiment, n is a value from 1 to 4.

In other preferred embodiment, the bispecific antibody of the invention further comprises a polyhistidine tag.

The bispecific antibody comprising a polyhistidine tag enables carrying out identification of the bispecific antibody by agents recognizing the polyhistidine tag, such as specific antibodies for that tag. It also enables carrying out purification methods based on recognition of the polyhistidine tag, such as chromatographic methods, High Performance Liquid Chromatography (HPLC), etc.

In other preferred embodiment of the bispecific antibody of the invention, said bispecific antibody is at least 95% identical to the amino acid sequence SEQ ID NO: 1.

In a more preferred embodiment of the bispecific antibody of the invention, said bispecific antibody consists of the amino acid sequence SEQ ID NO: 1.

The present invention also provides an ex vivo method of preparation of T cells secreting the bispecific antibody of the invention, the method comprising transducing isolated T cells from a subject with a synthetic polynucleotide encoding the bispecific antibody of the invention, or a vector comprising the same.

There are various methods of introducing exogenous polynucleotides into a host cell. Physical treatments, chemical compounds, biological particles or combinations thereof can be used in said methods of introducing exogenous polynucleotides into a host cell.

Methods of introducing exogenous polynucleotides into a host cell include, but are not limited to, electroporation, microinjection, gene gun, cell squeezing, impalefection, sonoporation, optical transfection, hydrodynamic delivery, lipofection, magnetofection, particle bombardment, nucleoside-modified mRNA and RNA transfection.

Methods of introducing exogenous polynucleotides into a host cell include the use of DNA or RNA vectors. Vector for introducing exogenous polynucleotides into a host cell include, but are not limited to, transposon-based vectors, Sleeping Beauty transposon-based vectors and minicircles.

Chemical compounds for introducing exogenous polynucleotides into a host cell include, but are not limited to, calcium phosphate, highly branched organic compounds, such as dendrimers, cationic polymers, such as DEAE-dextran or polyethylenimine (PEI), liposomes and polymeric gene carriers (polyplexes).

Biological particles for introducing exogenous polynucleotides into a host cell include viral particles, which can be derived from lentivirus, retrovirus, poxvirus, adenovirus, adeno-associated virus and herpes simplex virus I. In an embodiment, viral vectors are lentiviral vectors.

In an embodiment of the method of preparation of T cells of the invention, the method comprises:
(a) activating and expanding T cells by mixing isolated T cells from a subject and an activating agent, hence obtaining activated and expanded T cells;
(b) transducing the activated and expanded T cells obtained in step (a) with a synthetic polynucleotide encoding the bispecific antibody of the invention, or a vector comprising the same, hence obtaining T cells secreting the bispecific antibody of the invention.

An automated cell processing platform may be used for processing T cells in all steps in which T cells of the invention are processed. Processing T cells includes culturing, activating, genetic modifying, selecting and expanding T cells. An automated cell processing platform enables the magnetic separation of different cells types, automated washing, fractionation and cultivation of cells. In an automated cell processing platform, cell processing steps may take place in a single-use chamber and may include specific tubing sets. Suitable automated cell processing platform include the CliniMACS Prodigy® platform, commercially available from Miltenyi Biotec.

In an embodiment of the method of preparation of T cells secreting the bispecific antibody of the invention, the method comprises:
(i) generating lentiviral particles by mixing cells with a lentiviral vector encoding the bispecific antibody of the invention;
(ii) collecting the lentiviral particles formed in step (i);
(iii) activating and expanding T cells by mixing isolated T cells from a subject and an activating agent, hence obtaining activated and expanded T cells; and
(iv) transducing the activated and expanded T cells obtained in step (iii) by mixing the lentiviral particles obtained in step (i) and collected in step (ii) and the activated and expanded T cells obtained in step (iii), hence obtaining T cells secreting the bispecific antibody of the invention.

In a preferred embodiment of the method of preparation of T cells secreting the bispecific antibody of the invention, the method comprises:
(i) generating lentiviral particles by mixing cells, a lentiviral vector encoding the bispecific antibody of the invention, a plasmid encoding the human immunodeficiency virus 1 (HIV-1) Gag, Gag/Pol and Rev proteins and a plasmid encoding the vesicular stomatitis virus (VSV) G envelope protein;
(ii) collecting the lentiviral particles formed in step (i);
(iii) activating and expanding T cells by mixing isolated T cells from a subject and an activating agent, hence obtaining activated and expanded T cells; and
(iv) transducing the activated and expanded T cells obtained in step (iii) by mixing the lentiviral particles obtained in step (i) and collected in step (ii) and the activated and expanded T cells obtained in step (iii), hence obtaining T cells secreting the bispecific antibody of the invention.

Biosafety of a vector production system is best achieved by distributing the sequences encoding its various components over as many independent units as possible, to maximize the number of recombination events that would be required to recreate a replication-competent virus. This ensures that only replication-defective viruses are produced, because the various plasmids would have to undergo multiple and complex recombination events to regenerate a replication-competent virus.

In the previous embodiment, lentiviral particles are produced using a 3-plasmid system, alternatively known as a second generation lentiviral vector.

The human immunodeficiency virus 1 (HIV-1) Rev protein is an accessory protein playing an important role on viral genome nuclear exportation.

The vesicular stomatitis virus (VSV) G envelope protein is a glycoprotein that interacts with target cell receptors to mediate virus cell entry.

Suitable lentiviral vectors encoding the bispecific antibody of the invention include pCSCMV. Suitable plasmids encoding the human immunodeficiency virus 1 (HIV-1) Gag, Gag/Pol and Rev proteins include pCMV-dR8.2 dvpr. Suitable plasmids encoding for the vesicular stomatitis virus (VSV) G envelope protein include pMD2.G.VSV.G.

In a preferred embodiment of the method of preparation of T cells secreting the bispecific antibody of the invention, the method comprises:
(i) generating lentiviral particles by mixing cells, a lentiviral vector encoding the bispecific antibody of the invention, a plasmid encoding the human immunodeficiency virus 1 (HIV-1) Gag and Gag/Pol proteins, a plasmid encoding the HIV-1 Rev protein and a plasmid encoding the vesicular stomatitis virus (VSV) G envelope protein;
(ii) collecting the lentiviral particles formed in step (i);
(iii) activating and expanding T cells by mixing isolated T cells from a subject and an activating agent, hence obtaining activated and expanded T cells; and
(iv) transducing the activated and expanded T cells obtained in step (iii) by mixing the lentiviral particles obtained in step (i) and collected in step (ii) and the activated and expanded T cells obtained in step (iii), hence obtaining T cells secreting the bispecific antibody of the invention.

In the previous embodiment, lentiviral particles are produced using a 4-plasmid system, alternatively known as a third generation lentiviral vector.

Suitable lentiviral vectors encoding the bispecific antibody of the invention include pCCL. Suitable plasmids encoding the human immunodeficiency virus 1 (HIV-1) Gag and Gag/Pol proteins include pMDLg/RRE. Suitable plasmids encoding the HIV-1 Rev protein include pRSVrev. Suitable plasmids encoding the vesicular stomatitis virus (VSV) G envelope protein include pMD.G.

The plasmid pCCL comprises the sequence encoding the bispecific antibody of the invention and the cytomegalovirus (CMV) promoter.

In an embodiment, cells used in step (i) are human cells. In a preferred embodiment, cells used in step (i) are HEK293T cells.

In an embodiment, step (i) further comprises adding a compound selected from the group consisting of calcium phosphate, cationic polymers, DEAE-dextran, polyethylenimine (PEI), liposomes and polymeric gene carriers (polyplexes).

The method of preparation of T cells of the invention unexpectedly provides T cells comprising 1 or 2 copies per cell genome of the gene encoding the bispecific antibody, which reduces the risk of mutational insertion and increases the safety of a therapy based on said cells.

In an embodiment of the method of preparation of T cells of the invention, the mixture formed in step (i) is incubated for a period from 24 to 48 hours.

In a preferred embodiment of the method of preparation of T cells of the invention, said activating agent is selected from the group consisting of anti-CD3 antibody, anti-CD3-coated beads, anti-CD28 antibody, anti-CD28-coated beads and mixtures thereof.

In a preferred embodiment of the method of preparation of T cells of the invention, the mixture formed in step (iii) is incubated for a period from 24 to 48 hours. In a more preferred embodiment, the mixture formed in step (iii) is incubated for 48 hours.

In a preferred embodiment of the method of preparation of T cells of the invention, the mixture formed in step (iii) is incubated at a T cells:activating agent ratio from 100:1 to 1:3. In more preferred embodiments, said ratio is selected from the values 100:1, 30:1, 10:1, 3:1, 1:1 and 1:3. In a more preferred embodiment, said ratio is 1:3.

In a preferred embodiment of the method of preparation of T cells of the invention, the concentration of the T cells in the mixture formed in step (iii) is from $1 \times 10^5$ to $1 \times 10^7$ cells/ml.

In a more preferred embodiment, the concentration of the T cells in the mixture formed in step (iii) is $1 \times 10^6$ cells/ml.

In a preferred embodiment of the method of preparation of T cells of the invention, the ratio of lentiviral particles:T cells in step (iv) is from 1 to 20, preferably from 1 to 10. In a preferred embodiment of the method of preparation of T cells of the invention, the value of the ratio of lentiviral particles:T cells in step (iv) is selected from 1, 5 and 10.

In a preferred embodiment, the method of preparation of T cells of the invention further comprises the following step:
(v) expanding T cells secreting the bispecific antibody of the invention, formed in step (iv) by culturing the same in a cell culture medium comprising compounds selected from the group consisting of IL-2, IL-7, IL-15, and mixtures thereof.

In a preferred embodiment of the method of preparation of T cells of the invention, said T cells are cultured in step (v) for a period from 6 to 12 days. In a more preferred embodiment of the method of preparation of T cells of the invention, said T cells are cultured in step (v) for a period from 6 to 8 days.

The present invention also provides T cells secreting the bispecific antibody of the invention.

The present invention also provides T cells obtainable according to the method of preparation of T cells of the invention.

The examples evidence that T cells secretes the A3B1-OKT3 bispecific antibody and that this bispecific antibody bound to the CD3 complexes on the cell surface of the T cells. This results in an effective and specific adhesion of T cells to plastic-immobilized CD19.

As shown in the examples, T cells secreting the A3B1-OKT3 bispecific antibody unexpectedly recognize and kill CD19-positive target cells in antigen dependent manner more efficiently, at lower E:T ratios, than CD19 CAR-T cells transduced at the same ratio of lentiviral particles:targets (Multiplicity of Infection, MOI) (Example 3 and FIG. 8G).

In the examples, T cells secreting the bispecific antibody A3B1-OKT3 (STAb-T cells) were mixed with other T cells (bystander T cells). STAb-T cells activated bystander T cells and hence, activated bystander T cells then recognize and kill CD19$^+$ target cells. This has been observed at a ratio (A-T:T$_h$0) of STAb-T cells:bystander T cells of 1:1000 (Example 4), which resembles tumors, where a reduced number of T cells secreting bispecific antibody could activate the entire population of tumor infiltrating lymphocytes (TIL) to induce an effective anti-tumor response. This feature represents a substantial increase in the therapeutic potential of the T cells of the invention with respect to CAR-T cell therapies, which is a clear advantage.

As shown in the examples, A3B1-OKT3 bispecific antibody secreted by STAb-T cells activated bystander T cells that were separated from STAb-T cells by a semipermeable membrane (a physical barrier for the T cells) (Example 4).

As shown in the examples, it has been observed that CAR-mediated immunological synapse (IS) exhibited a disorganized multifocal signaling cluster structure, with major differences relative to the typical TCR-initiated IS. It has been shown that A3B1-OKT3 bispecific antibody and blinatumomab configure a canonical IS, with actin clearance and CD3 accumulation in the central supramolecular activation clusters (cSMAC) (Examples 5 and 7). These results indicate that IS topology positively influence the functional capacity and cytotoxic potential of CAR-T and STAb-T cells, representing an advantage of STAb-T cells secreting the bispecific antibody of the invention over CAR-T cells in cancer immunotherapy.

As shown in the examples, data from signaling experiments showed shorter activating signals in CAR-Jurkat (CAR-JK) cells compared to control *Staphylococcus Aureus* Enterotoxin-E (SEE)-stimulated cells (Example 6). This might be related to the shorter time required for a CAR to form a functional IS with respect to the time required by the TCR. Thus, CAR T cells dissociate faster than TCR-stimulated T cells from killed tumor targets, initially enabling faster serial killing. However, far from giving rise to more efficient tumor clearance, CAR-mediated killing is eventually reduced compared to that mediated by TCR ligation, due to a sharp CAR downregulation. On the other hand, as T cell exhaustion occurs after repeated activation of T cells, it may be argued that this faster kinetics of serial killing would render CAR-T cells more rapidly prone to exhaustion. By contrast, the interaction of the T cells secreting the bispecific antibody of the invention with target cells elicited signaling kinetics more similar to those generated by activation controls. Altogether, it can be derived from these results that the T cells secreting the bispecific antibody of the invention give rise to a T cell-early activation reminiscent of the one induced by T cells stimulated by antigen during physiological cognate interactions.

As shown in the examples, in real-time cytotoxicity assays, STAb-T cells killed leukemia cells more efficiently than CD19 CAR-T cells at low effector:target (E:T) ratios (Example 8).

Importantly, it has been shown, in long-term co-culture experiments performed with low E:T ratios, that CAR-T cells were not able to completely abrogate tumor cell growth, and this might be related to the loss of CD19 cell-surface expression, what would render tumor cells "invisible" to CAR-T cells. By contrast, STAb-T cells secreting the bispecific antibody of the invention efficiently killed tumor cells in a short period of time, even at the lowest E:T ratio. It is stated that STAb-T cells are more effective than CAR-T cells in preventing tumor relapse. Moreover, the observed sharp downmodulation of CAR expression after encountering CD19$^+$ cells may help even CD19-expressing targets to escape T cell control. On the contrary, the high levels of both, CD3 expression and A3B1-OKT3 bispecific antibody secretion demonstrated after the STAb-T cell of the invention—tumor cell interaction, explain, together with the ability to recruit bystander T cells, the observed higher anti-tumor effect of CD19 STAb-T of the invention over CD19 CAR-T cells.

The T cells of the invention provide cancer therapies with several advantages. First, in vivo secretion of the bispecific antibody of the invention by the T cells of the invention results in effective concentrations of T cell-redirecting bispecific antibodies, which compensates for the rapid renal clearance of small-sized antibody fragments and render better tolerated bispecific antibodies. Second, in vivo secretion of the bispecific antibody of the invention by the T cells of the invention removes potential concerns about formulating and long-term storage of bispecific antibodies in a manner that prevents aggregation and deterioration. Third, T cell recruitment is not restricted to engineered T cells of the invention, as is the case with the CAR-T cell approach. The recruitment, by bispecific antibodies, of both engineered T cells of the invention and unmodified bystander T cells, present at the tumor site, leads to an improvement in anti-tumor T cell responses. Fourth, STAb-T strategy promotes a canonical IS topology which may be a determining factor in order to increase the functional capacity and cytotoxic potential of the STAb-T cells secreting the bispecific antibody of the invention. Fifth, the interaction between CD19 and CAR promotes an intense and rapid downmodulation of both molecules, which could promote the escape of leukemic cells from immune control. This situation is not observed in co-cultures of CD19$^+$ leukemic cells and the STAb-T cells secreting the bispecific antibody of the invention.

In a preferred embodiment, the T cells of the invention comprise 1 or 2 copies per cell genome of the synthetic polynucleotide encoding the bispecific antibody of the invention or vector comprising the same. Said T cells comprising 1 or 2 copies per cell genome of the gene encoding the bispecific antibody reduce the risk of mutational insertion and increases the safety of a therapy based on said cells.

In an embodiment, the T cells of the invention comprise the synthetic polynucleotide encoding the bispecific antibody of the invention or a vector comprising said synthetic polynucleotide and secretes the specific antibody of the invention.

The present invention also provides the bispecific antibody, or the T cells of the invention, for use as a medicament.

The present invention also provides the bispecific antibody, or T cells of the invention, for use in the treatment of a hematological malignancy in a subject.

In an embodiment of the bispecific antibody, or T cells, for use of the invention, said hematological malignancy is selected from the group consisting of lymphoma, leukemia and myeloma.

In a preferred embodiment of the bispecific antibody, or T cells, for use of the invention, said hematological malignancy is selected from the group consisting of B cell acute lymphoblastic leukemia (ALL), minimal residual disease-positive ALL, chronic lymphatic leukemia (CLL), hairy cell leukemia, non-Hodgkin's lymphoma, B cell lymphoma, mantle cell lymphoma (MCL), diffuse large B cell lymphoma (DLBCL), follicular lymphoma, marginal zone B cell lymphoma, Burkitt's lymphoma, lymphoplasmacytic lymphoma, myelodysplastic syndrome (MDS) and multiple myeloma.

In an embodiment, the present invention refers to the use of the bispecific antibody, or the T cells, of the invention for the manufacture of a medicament.

In another embodiment, the present invention refers to the use of the bispecific antibody, or T cells, of the invention for the manufacture of a medicament for the treatment of a hematological malignancy in a subject.

In an embodiment, the present invention also refers to a method of treating a subject with a hematological malignancy which comprises administering the bispecific antibody, or T cells, of the invention to said subject.

In a preferred embodiment, the present invention refers to a method of treating a subject with a hematological malignancy which comprises administering an effective amount of the bispecific antibody, or T cells, of the invention to said subject.

In embodiments, said hematological malignancy is selected from the group consisting of lymphoma, leukemia and myeloma.

In embodiments, said hematological malignancy is selected from the group consisting of B cell acute lymphoblastic leukemia (ALL), minimal residual disease-positive ALL, chronic lymphatic leukemia (CLL), hairy cell leukemia, T-cell leukemia, non-Hodgkin's lymphoma, B-cell lymphoma, mantle cell lymphoma (MCL), diffuse large B-cell lymphoma (DLBCL), follicular lymphoma, marginal zone B-cell lymphoma, Burkitt's lymphoma, lymphoplasmacytic lymphoma, myelodysplastic syndrome (MDS) and multiple myeloma.

In a preferred embodiment of the bispecific antibody, or T cells, for use of the invention, said bispecific antibody, or T cells, are administered to a subject by infusion or injection.

In a preferred embodiment, combination therapies comprising CAR-T cells and T cells of the invention are provided, to obtain improved therapeutic effects in cancer patients. In a more preferred embodiment, combination therapies comprising CAR-T cells and T cells of the invention provide synergistic therapeutic effects in cancer patients.

Therefore, in a preferred embodiment of the bispecific antibody or T cells for use of the invention, said bispecific antibody, or T cells, are combined with a treatment comprising administering CAR-T cells to said subject.

In a preferred embodiment, T cells of the invention are combined with CAR-T cells with the same or different specificity.

In a more preferred embodiment of the bispecific antibody, or T cells, for use of the invention, said CAR-T cells are anti-CD19 CAR-T cells.

In a yet more preferred embodiment of the bispecific antibody, or T cells, for use of the invention, said anti-CD19 CAR-T cells comprise the anti-CD19 light chain variable domain V$_L$CD19 consisting of the amino acid sequence SEQ ID NO: 3 and the anti-CD19 heavy chain variable domain V$_H$CD19 consisting of the amino acid sequence SEQ ID NO: 5.

In a preferred embodiment of the bispecific antibody, or T cells, for use of the invention, said T cells and said CAR-T cells are administered to said subject sequentially or simultaneously.

The present invention also provides a pharmaceutical composition comprising the bispecific antibody, or T cells, of the invention, and at least one pharmaceutically acceptable excipient.

The pharmaceutical composition of the invention may consist of water solutions, saline solutions or solutions buffered to physiological pH. The pharmaceutical composition may include various carrier agents, thickeners, buffers, preservatives, surfactants, nanoparticles, liposomes and others. The pharmaceutical composition may further include active ingredients such as antimicrobial agents, anti-inflammatory agents, anaesthetic agents, etc.

The pharmaceutical composition of the invention may be administered to a subject in several different ways, depending on whether the treatment is local or systemic, and depending on the area to be treated. Thus, for example, pharmaceutical composition of the invention may be administered to a subject by ocular, vaginal, rectal, intranasal, oral, by inhalation, or by parenteral route, whether intradermal, subcutaneous, intramuscular, intraperitoneal, intrarectal, intra-arterial, intralymphatic, intravenous, intrathecal, intraocular, intracranial, intraventricular, intratracheal and intratumoral. Parenteral administration, if used, is generally performed by injection. The solutions for injection can be prepared in various ways, such as solutions or liquid suspensions.

The excipient may be an inert ingredient or ingredients. As an example, said excipient may be a diluent.

The pharmaceutical composition of the invention can be administered with or without combining with other active ingredients.

The pharmaceutical composition of the invention can be administered in single or multiple doses.

The present invention also provides a synthetic polynucleotide encoding the bispecific antibody of the invention, or a vector comprising the same.

In an embodiment of the synthetic polynucleotide or a vector comprising the same, of the invention, said synthetic polynucleotide is at least 95% identical to the polynucleotide sequence SEQ ID NO: 20.

In a preferred embodiment of the synthetic polynucleotide or a vector comprising the same, of the invention, said synthetic polynucleotide of the invention consists of the polynucleotide sequence SEQ ID NO: 20.

DESCRIPTION OF EMBODIMENTS

Figure 1:
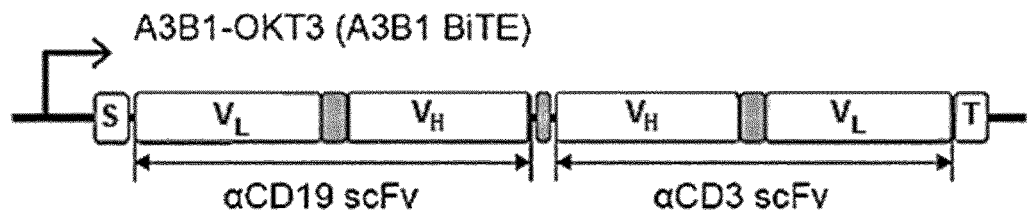
FIG. 1. Schematic diagrams showing the genetic (A) and domain structure (B) of the A3B1-OKT3 bispecific antibody (also known as A3B1 BiTE), bearing a signal peptide from the human k light chain signal peptide (S), the anti-CD19 A3B1 scFv gene and the anti-CD3 OKT3 scFv gene, and the His tag (T). The left arrow indicates the direction of transcription. (C) Three-dimensional structure of the A3B1-OKT3 bispecific antibody.
Figure 1:
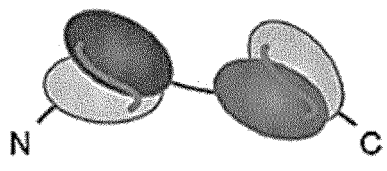
Figure 1:
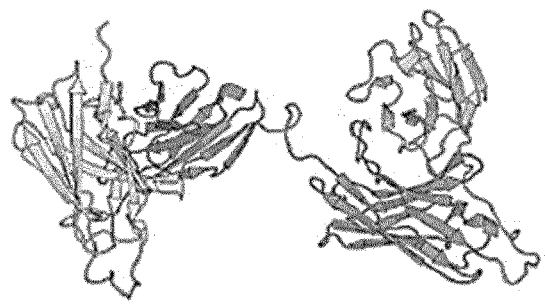

Material and Methods
Cell Lines and Culture Conditions
HEK293 (CRL-1573), HEK293T (CRL-3216), and HeLa (CCL-2) cells were cultured in Dulbecco's modified Eagle's medium (DMEM) (Lonza, Walkersville, MD, USA) supplemented with 2 mM L-glutamine (Life Technologies, Paisley, UK), 10% (vol/vol) heat inactivated fetal calf serum (FCS) and antibiotics (100 units/mL penicillin, 100 μg/mL streptomycin) (both from Sigma-Aldrich, St. Louis, MO, USA), referred as to DMEM complete medium (DCM). Jurkat, Clone E6-1 (TIB-152), Raji (CCL-86), NALM6 (CRL3273) and K562 (CCL-243) cells were maintained in RPMI-1640 (Lonza) supplemented with 2 mM L-glutamine, heat-inactivated 10% FCS, and antibiotics, referred as to RPMI complete medium (RCM). All cell lines were obtained from the American Type Culture Collection (Rockville, MD, USA), and were grown at 37° C. and 5% $CO_2$. NALM6 cells expressing firefly luciferase (Luc) (NALM6$^{Luc}$) were provided by Dr. Manel Juan (Department of Immunology, Hospital Clinic, Barcelona, Spain). HeLa$^{Luc}$ are HeLa cells infected with lentivirus encoding the Luc gene. All cell lines were routinely screened for mycoplasma contamination by PCR using the Mycoplasma Gel Detection Kit (Biotools, Madrid, Spain).

Jurkat cells were derived from the peripheral blood of a subject with T cell leukemia. Nalm6 cells were derived from the peripheral blood of a subject with acute lymphoblastic leukemia (ALL). Raji cells were derived from the B-lymphocytes of a subject with Burkitt's lymphoma.

Vector Construction and Preparation of Lentiviral Particles

To construct the expression vector pCDNA3.1-A3B1-OKT3 a synthetic gene (A3B1-OKT3 BiTE) encoding the human kappa light chain signal peptide L1, the A3B1 scFv ($V_L$- $V_H$), a five-residue linker ($G_4S$), the OKT3 scFv ($V_H$-$V_L$), and a C-terminal polyHis (HHHHHH) tag was synthesized by GeneArt AG (ThermoFisher Scientific, Regensburg, Germany), and cloned as HindIII/XbaI into the plasmid pCDNA3.1 (ThermoFisher Scientific). To generate the lentiviral transfer vector the complete A3B1-OKT3 bispecific antibody gene (including signal peptide L1, A3B1 scFv, ($G_4S$), OKT3 scFv and polyHis tag) was synthesized by GeneArt AG and cloned as MluI/BspEI into the vector pCCL-EF1α-CAR19, to obtain the plasmid pCCL-EF1α-A3B1 BiTE. To produce lentiviral particles, HEK293T cells were transfected with the transfer vector together with packaging plasmids pMDLg/pRRE (Addgene, 12251), pRSVrev (Addgene, 12253), and envelope plasmid pMD2.G (Addgene, 12259), using linear polyethyleneimine (PEI) molecular weight (MW) 25,000 (Polysciences, 23966-1).

HEK293T cells ($6 \times 10^6$) were plated 24 hours before transfection in 10-cm dishes. At the time of transfection, 14 μg total DNA (6.9 μg transfer vector, 3.41 μg pMDLg/pRRE, 1.7 μg pRSV-Rev, and 2 μg pMD2.G) was diluted in serum-free DMEM. 35 μg PEI was added to the mix and incubated for 20 min at room temperature. After incubation, DNA-PEI complexes were added onto the cells cultured in 7 mL complete DMEM. Media were replaced 4 hours later. Viral supernatants were collected 48 hours later and clarified by centrifugation and filtration using a 0.45-μm filter. Viral supernatants were concentrated using ultracentrifugation at 26,000 rpm for 2 hours 30 min. Virus-containing pellets were resuspended in complete XVivo15 media and stored at −80° C. until use.

Viral supernatants were collected 48 hours later and clarified by centrifugation and filtration using a 0.45 μm-pore filter, ultracentrifuged (26,000 rpm for 2 hours), resuspended in complete XVivo15 media (Lonza, Walkersville, MD, USA), aliquoted and stored at −80° C. until use.

Expression and Purification of the A3B1-OKT3 Bispecific Antibody

HEK293 cells were transfected with the expression vector using calcium phosphate and selected in DCM with 500 μg/ml G-418 (Life Technologies, Grand Island, NY, USA) to generate stable cell lines. Supernatants from transiently and stably transfected cell populations were analyzed by western blotting and FACS. The A3B1-OKT3 bispecific antibody was purified from DCM conditioned medium collected from stably transfected HEK293 cells. Collected medium was centrifuged, filtered and purified 500 mL at a time using a 1 mL HiTrap Excel column (GE Healthcare, Uppsala, Sweden), washing with 30 column volume of 20 mM imidazole in PBS (pH 7.4) and eluting with 500 mM of imidazole in PBS. Elution fractions containing the relevant proteins were then pooled, dialyzed against PBS, and concentrated using spintrap columns (Merck Millipore, Billerica, MA, USA).

Western Blotting

Samples were separated under reducing conditions on 10-20% Tris-glycine gels (Life Technologies, Carlsbad, CA, USA) and transferred onto PVDF membranes (Merck Millipore, Tullagreen, Carrigtwohill, Ireland) and probed with anti-His mAb (Quiagen, Hilden Germany) (200 ng/ml), followed by incubation with horseradish peroxidase (HRP)-conjugated goat anti-mouse (GAM) IgG, Fc specific (1:5000 dilution) (Sigma-Aldrich). Visualization of protein bands was performed with Pierce ECL Western Blotting substrate (Rockford, IL, USA).

For analysis of BiTE and CAR expression, samples were lysed for 5 minutes in ice-cold RIPA buffer (Sigma-Aldrich) with 5 mM EDTA and 1× Halt Protease Inhibitor Cocktail (ThermoFisher). Lysates were then centrifuged at 11,000 g for 10 minutes at 4° C. and soluble fractions were collected. For analysis of BiTE secretion by transfected or transduced cells, supernatants were collected. 15 mg of protein or 16 ml of supernatant were separated under reducing conditions on 10-20% Tris-glycine gels (Life Technologies, Carlsbad, CA, USA), transferred onto Immobilon-PVDF membranes (Merck Millipore, Tullagreen, Carrigtwohill, Ireland) and probed with mouse anti-human CD247 (1:1000) (BD Biosciences) or anti-His mAb (Qiagen, Hilden Germany) (200 ng/ml), followed by incubation with horseradish peroxidase (HRP)-conjugated goat anti-mouse (GAM) IgG, Fc specific (1:5000) (Sigma-Aldrich). Mouse anti-b actin HRP-conjugated mAb (1:50,000) was used as loading control. Visualization of protein bands was performed with Pierce ECL Western Blotting substrate (Rockford, IL, USA).

For analysis of T cell signaling, CAR-JK and STAb-JK cells were incubated at 37° C. with Raji cells at a Jurkat/Raji ratio 10:1 for the indicated times. NT-JK cells were incubated with non-loaded Raji cells or Raji cells loaded during 1 hour with 5 nM Blincyto (blinatumomab) (Amgen Inc, Thousand Oaks, California) or 1 μg/mL Staphylococcus Aureus Enterotoxin-E (SEE) (Toxin Technologies, Sarasota, FL, USA). The stimulation time 0 minutes corresponds to Jurkat cells mixed with Raji cells at room temperature and immediately centrifuged and lysed. Samples were lysed for 30 minutes in ice-cold lysis buffer containing 20 mM Tris-HCl pH 7.5; 1% NP-40; 0.2% Triton X-100 (Sigma-Aldrich); 2 mM EDTA; 150 mM NaCl; 1.5 mM $MgCl_2$; 5 mM β-glicerolphosphate; lx protease inhibitor cocktail; 1 mM NaF; 1 mM PMSF; 1 mM $Na_3VO_4$ and 1 mM sodium pyrophosphate. Lysates were then centrifuged at 10.000 rpm for 10 minutes at 4° C. and soluble fractions were collected, mixed with 6× Laemmli buffer (Alfa Aesar, Haverhill, MA, USA) containing 20% β-mercaptoethanol, boiled at 95° C. for 5 minutes and resolved in 10% SDS-PAGE acrylamide gels. Resolved proteins were transferred to Immobilion PVDF membranes, which were blocked with blocking buffer (LI-COR Bioscience, Lincoln, NE, USA), incubated over night with rabbit anti phospho-Y783-PLCγ1, anti PLCγ1, anti phospho-T202/T204-ERK1/2 or mouse anti-ERK1/2 primary antibodies (all from Cell Signaling Technology, Beverly, MA, USA) and incubated 30 minutes with 680 goat-anti rabbit and 800 goat-anti mouse IR dyes (Miltenyi Biotec). All blots were scanned, and fluorescence was quantified with an Odyssey Infrared Imager (LI-COR). Densitometry of images was done with Image Studio Freeware (LI-COR). When necessary, blots were striped in 50 ml containing 2% SDS; 12.5% Tris-HCl pH 6.8 and 0.7% µ-mercaptoethanol for 30 minutes at 50° C.

Enzyme-Linked Immunosorbent Assay

Human CD19:human Fc chimera (CD19:Fc) (R&D Systems, Minneapolis, MN, USA) was immobilized (5 µg/ml) on Maxisorp plates (NUNC, Roskilde, Denmark) overnight at 4° C. After washing and blocking, conditioned media or purified protein solution were added and incubated for 1 hour at room temperature. The wells were washed and anti-His mAb (Qiagen) added (1 µg/ml). After washing, HRP-GAM IgG, Fc specific (1:2000 dilution) (Sigma-Aldrich) was added, and the plate was developed using tetramethylbenzidine (TMB) (Sigma-Aldrich).

Flow Cytometry

The following mAbs against human proteins, were used: FITC-conjugated anti-CD3 (clone UCHT1), APC-conjugated anti-CD3 (clone UCHT1), PE/Cy7-conjugated anti-CD8 (clone RPA-T8), PE-conjugated anti-CD69 (clone L78), all from BD Biosciences (San Jose, CA, USA); PC7-conjugated anti-CD19 (clone J4.119, Beckman Coulter, Marseille Cedex, France); and PE-conjugated anti-CD4 (clone MEM-241, Immunotools, Friesoythe, Germany). Dapi (Sigma-Aldrich) was used as viability marker. Cell surface expression of A3B1 CAR was analyzed using an APC-conjugated $F(ab')_2$ goat anti-mouse IgG $F(ab')_2$ (Jackson ImmunoResearch, West Grove, PA, USA). Cell surface-bound A3B1-OKT3 bispecific antibody was detected with 1 µg/ml anti-6×His tag-biotin mAb (clone HIS.H8, Invitrogen, Rockford, IL, USA), and PE-conjugated streptavidin (BD Biosciences). Cell acquisition was performed in a BD FACSCAnto II flow cytometer using BD FACSDiva software (both from BD Biosciences, San Jose, CA, USA). Analysis was performed using FlowJo V10 software (Tree Star, Ashland, OR, USA).

Lentivirus Titration

All lentivirus stocks were normalized for p24 and RNA. The p24 concentration was determined by ELISA (Takara, Saint-Germain-en-Laye, France), and the genomic lentiviral RNA by qRT-PCR (Takara). In the case of A3B1 CAR-encoding lentivirus, functional titers (TU/ml) were determined by FACS analysis after limiting dilution in HEK293T cells, using an APC-conjugated $F(ab')_2$ fragment goat anti-mouse IgG $F(ab')_2$ fragment specific (Jackson ImmunoResearch Laboratories).

T Cell Transduction and Culture Conditions

Peripheral blood mononuclear cells (PBMCs) were isolated from peripheral blood of volunteer healthy donors by density gradient centrifugation using Lymphoprep solution (Axis-Shield, Oslo, Norway). All donors provided written informed consent in accordance with the Declaration of Helsinki. CD3+ T cells were purified by negative selection using the Pan T Cell Isolation Kit, human and LS columns (Miltenyi Biotec, Bergisch Gladbach, Germany) following the manufacturer's instructions. The purity of isolated populations was routinely >95%. Cells were then activated and expanded for 24 hours using anti-CD3/CD28 beads (Dynabeads, Gibco) at 1:3 cell:bead ratio in RCM, at a concentration of $1 \times 10^6$ cells/ml. 24 hours later cells were left untransduced (NT cells) or transduced with A3B1 CAR (CAR-T cells) or A3B1-OKT3 bispecific antibody (STAb-T cells) encoding lentivirus at the indicated MOI (Multiplicity of Infection, ratio of lentiviral particles:targets). A3B1 CAR-T cells were transduced with a lentiviral vector encoding an anti-CD19 second generation 4-1BB/CD3 CAR (Castella et al, 2019). A period of cell expansion of 6-8 days was carried out before conducting experiments. Three different cell transductions using three different PBMC donors were used to conduct the experiments in triplicate.

T Cell Activation Assays

For Jurkat T cell activation assays, $10^5$ Jurkat cells were co-cultured with Raji, Nalm6 or K562 cells at effector:target (E:T) ratio of 2:1, and 50 µl of supernatant from transfected HEK293 cell cultures was added. After 48 hours, CD69 expression was analyzed by flow cytometry, and culture supernatants were collected and analyzed for IL-2 levels by ELISA (Diaclone, Besançon Cedex, France.) For primary T cell activation assays, anti-CD3/CD28 beads were removed five days after lentiviral transduction, and activated T cells (A-T) were left resting for 24 hours at a concentration of $0.8 \times 10^6$ cells/ml. Then, transduced or non-transduced A-T were co-cultured with freshly isolated T cells (non-activated T cells, $T_h0$) from the same donor, and Nalm6 or HeLa target cells at the indicated ratios. As controls, $T_h0$ cells were cultured with Nalm6 or Hela target cells in the absence or the presence of 100 ng/ml blinatumomab. After 48 hours, supernatants were collected and levels of IFN-γ were analyzed by ELISA (Diaclone). For proliferation assays, de-beaded A-T were stained with 2.5 µM Cell Trace Violet, and freshly isolated T cells were stained with 2.5 µM Cell Trace CFSE (both from Life Technologies, Eugene, OR, USA) following manufacturer's instructions. Stained A-T and $T_h0$ cells were co-cultured with Nalm6 or HeLa target cells at the indicated ratios. After 5 days, samples were acquired in a FACSCanto flow cytometer and T cell proliferation was analyzed using FCS Express 6 Plus Software (De Novo Software, Los Angeles, CA, USA).

Cytotoxicity Assays

As indicated above, five days after lentiviral transduction, anti-CD3/CD28 beads were removed and A-T cells were left resting for 24 hours. Then, transduced or non-transduced A-T cells were co-cultured with freshly isolated $T_h0$ cells and NALM6$^{Luc}$ or HeLa$^{Luc}$ target cells at the indicated ratios. As controls, $T_h0$ cells were cultured with Nalm6 or Hela target cells in the absence or the presence of 100 ng/ml blinatumomab. After 48 hours viability was measured adding D-luciferin (Promega, Madison, WI, USA) to a final concentration of 20 µg/ml and bioluminescence quantified in relative light units using a Victor luminometer (PerkinElmer, Waltham, MA, USA). A 100% lysis control was included by treating the target cells with 1% Triton-X100 (Sigma-Aldrich), and the value for spontaneous lysis was obtained by incubating the target cells with effector cells (NA-T) only. Percent tumor cell viability was calculated as the mean bioluminescence of each sample divided by the mean bioluminescence of the input number of control target cells times 100. Specific lysis is the difference in tumor cell viability relative to control (0%).

For cytotoxic studies in transwell assays, polycarbonate filter inserts (4.26 mm diameter) with 0.4 µm pores (Corning, Kennebunk, Me, USA) were used. Nalm6$^{Luc}$ and HeLa$^{Luc}$/MKN45$^{Luc}$ cells ($5 \times 10^4$) were plated on bottom wells of 96-well plate with 2:1 E:T ratio ($10^5$ de-beaded A-T cells: NT, CAR-T or STAb-T cells at the indicated ratios were added to insert wells). After 48 hours bioluminescence quantified as described above and cell culture supernatants were collected for IFN-γ secretion analysis.

For realtime cytotoxicity assays, wild type HEK293 (HEK WT) or HEK293 cells stably-transfected to express membrane-bound CD19 (HEK-CD19) were plated at a density of $10^4$ cells per well in a volume of 50 µL in an E-Plate 16 (Acea Biosciences, San Diego, CA). After plating, cells were cultured for 20 h in an xCELLigence RTCA DP system (Acea BioSciences), inside a cell culture incubator at 37° C. and 5% $CO_2$, with measurements taken at 15 min intervals to measure Cell Index, a measure of electrical impedance across well electrodes resulting from cell adherence. After 20 h, NT-T, STAbT or CAR-T cells, at different E:T ratios, were added in a volume of 100 μL per well, with 2 replicate wells per condition. Plates were returned to the xCELLigence and the cytotoxicity was evaluated over 72 h with measurements taken at 15 min intervals. Cell Index values were determined and normalized using RTCA Software 2.0 (Acea Biosciences). Percentage specific lysis was calculated using the following equation: Percentage=[(cell index of UTD−cell index of CAR-T cells)/(cell index of UTD)]×100.

Immunofluorescence and Confocal Microscopy

NT, CAR and STAb, Jurkat or primary, T cells were incubated for 15 minutes on Poly-L-lysine (Sigma-Adrich)-coated coverslips at 37° C. with Raji or Nalm6 target cells at a T cell/target ratio 1:1. Where indicated, target cells were loaded for 1 hour with 5 nM blinatumomab or 1 μg/mL SEE as in Western blot experiments. In order to properly find cell conjugates, target cells were pre-incubated with the fluorescent tracker chloromethyl derivative of aminocoumarin (CMAC) 1 μM (Molecular Probes, Eugene, OR, USA). Jurkat/Raji cell conjugates (200.000 cells each) were fixed with 4% paraformaldehyde in PBS for 5 minutes at RT, permeabilized with 0.1% Triton X-100 for 5 minutes at RT and blocked with 10 μg/ml human gamma globulin for 20 minutes at RT. Samples were stained with mouse anti-CD3ε (T3b clon; kindly provided by Dr. Francisco Sanchez-Madrid, (Hospital Universitario de la Princesa, Madrid, Spain) or with Phalloidin-647 (Molecular Probes) (for filamentous actin detection) for 1 hour at RT. Cells were then washed with TBS and incubated with goat anti-mouse-Ig Alexa 488 (Molecular Probes) secondary antibody at RT for 30 minutes. Finally, coverslips were washed with TBS and distilled water before being mounted with Mowiol (Sigma-Aldrich) medium.

Confocal sections of fixed samples were acquired using an SP-8 laser scanning laser confocal microscopy (Leica Microsystems, Wetzlar, Germany), with a 60×/1.35 oil immersion objective. CMAC, A488 and phalloidin-647 were excited by 405, 488 and 633 nm laser lines, respectively. For 3D reconstructions, z-stacks through the complete IS were acquired every 0.3 μm. Actin clearance was estimated by the ratio of the area of the central region of the IS depleted of actin versus the complete area of the IS including the actin ring in 3D images. Assessment of CD3 coalescence and central supramolecular activation clusters (cSMAC) formation was assessed by visual inspection of the 3D images. 3D reconstruction and image quantitation were performed with ImageJ freeware (National Institutes of Health, Rockville, MD, USA).

Statistical Analysis

Results of experiments are expressed as mean±standard deviation (SD). Statistical tests were done with Prism 6 (GraphPad Software, USA).

Example 1. Generation and Characterization of A3B1-OKT3 Bispecific Antibody

An anti-CD19/anti-CD3 BiTE antibody, identified herein as A3B1-OKT3 bispecific antibody or as A3B1-OKT3 BiTE, was generated. A3B1-OKT3 bispecific antibody comprises the anti-CD19 A3B1 scFv linked to the anti-CD3 OKT3 scFv in a tandem structure (FIG. 1A, 1B, 1C).

The anti-CD19 A3B1 scFv and the anti-CD3 scFv are separated by a linker (linker 2). The anti-CD19 A3B1 scFv comprises an anti-CD19 light chain variable domain $V_L$CD19 and an anti-CD19 heavy chain variable domain $V_H$CD19. The anti-CD3 scFv comprises an anti-CD3 heavy chain variable domain $V_H$CD3 and an anti-CD3 light chain variable domain $V_H$CD3. The domains are arranged in the order $V_L$CD19-$V_H$CD19-$V_H$CD3-$V_L$CD3.

The domains $V_L$CD19-$V_H$CD19 are separated by a linker (linker 1) and the domains $V_H$CD3-$V_L$CD3 are also separated by a linker (linker 3).

A3B1-OKT3 bispecific antibody further comprises the human kappa light chain signal peptide L1 and a polyhistidine tag. Table 1 provides details of A3B1-OKT3 bispecific antibody sequence features. The 3 CDRs regions of each light and heavy variable domains are identified in Table 1.

TABLE 1

| | Sequence |
|---|---|
| A3B1-OKT3 bispecific antibody | SEQ ID NO: 1 |
| Human kappa light chain signal peptide L1 | SEQ ID NO: 2 |
| A3B1 light chain variable domain | SEQ ID NO: 3 |
| Linker 1 | SEQ ID NO: 4 |
| A3B1 heavy chain variable domain | SEQ ID NO: 5 |
| Linker 2 | SEQ ID NO: 6 |
| OKT3 heavy chain variable domain | SEQ ID NO: 7 |
| Linker 3 | SEQ ID NO: 8 |
| OKT3 light chain variable domain | SEQ ID NO: 9 |
| A3B1 light chain CDR1 region | SEQ ID NO: 10 |
| A3B1 light chain CDR2 region | Ile-Ala-Ser |
| A3B1 light chain CDR3 region | SEQ ID NO: 11 |
| A3B1 heavy chain CDR1 region | SEQ ID NO: 12 |
| A3B1 heavy chain CDR2 region | SEQ ID NO: 13 |
| A3B1 heavy chain CDR3 region | SEQ ID NO: 14 |
| OKT3 heavy chain CDR1 region | SEQ ID NO: 15 |
| OKT3 heavy chain CDR2 region | SEQ ID NO: 16 |
| OKT3 heavy chain CDR3 region | SEQ ID NO: 17 |
| OKT3 light chain CDR1 region | SEQ ID NO: 18 |
| OKT3 light chain CDR2 region | Asp-Thr-Ser |
| OKT3 light chain CDR3 region | SEQ ID NO: 19 |
| Artificial gene encoding for A3B1-OKT3 bispecific antibody | SEQ ID NO: 20 |

The A3B1-OKT3 bispecific antibody was secreted by transfected HEK293 cells, and the migration pattern was consistent with the molecular weight calculated from its amino acid sequence (54.2 kDa without the signal sequence; FIG. 2A). In FACS analysis, CD3+ Jurkat cells, CD19+ Nalm6 and Raji cells were used.

Figure 2:
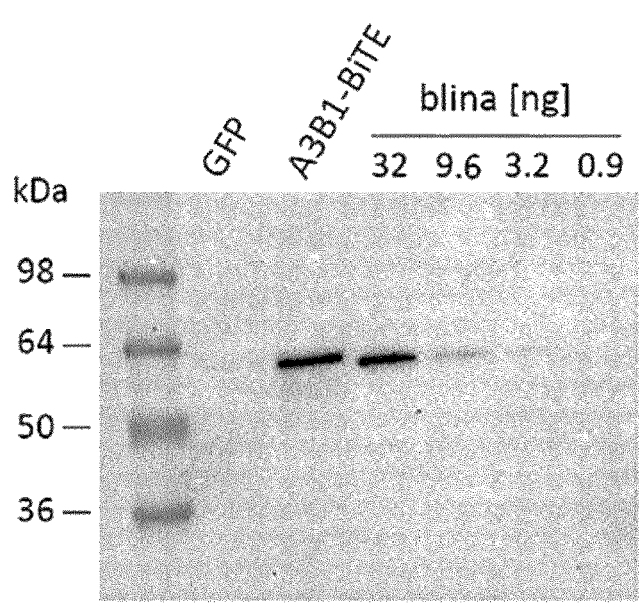
FIG. 2. Detection of secreted A3B1-OKT3 bispecific antibody in the conditioned media from GFP- or A3B1-OKT3 BiTE-transfected HEK-293 cells by western blot (A). The functionality of secreted A3B1-OKT3 BiTE was demonstrated by FACS on $CD3^+$ Jurkat cells, $CD19^+$ NALM6 and Raji cells, and $CD3^-CD19^-$ K562 cells (B) and using different amounts of purified blinatumomab as control (C).
Figure 2:
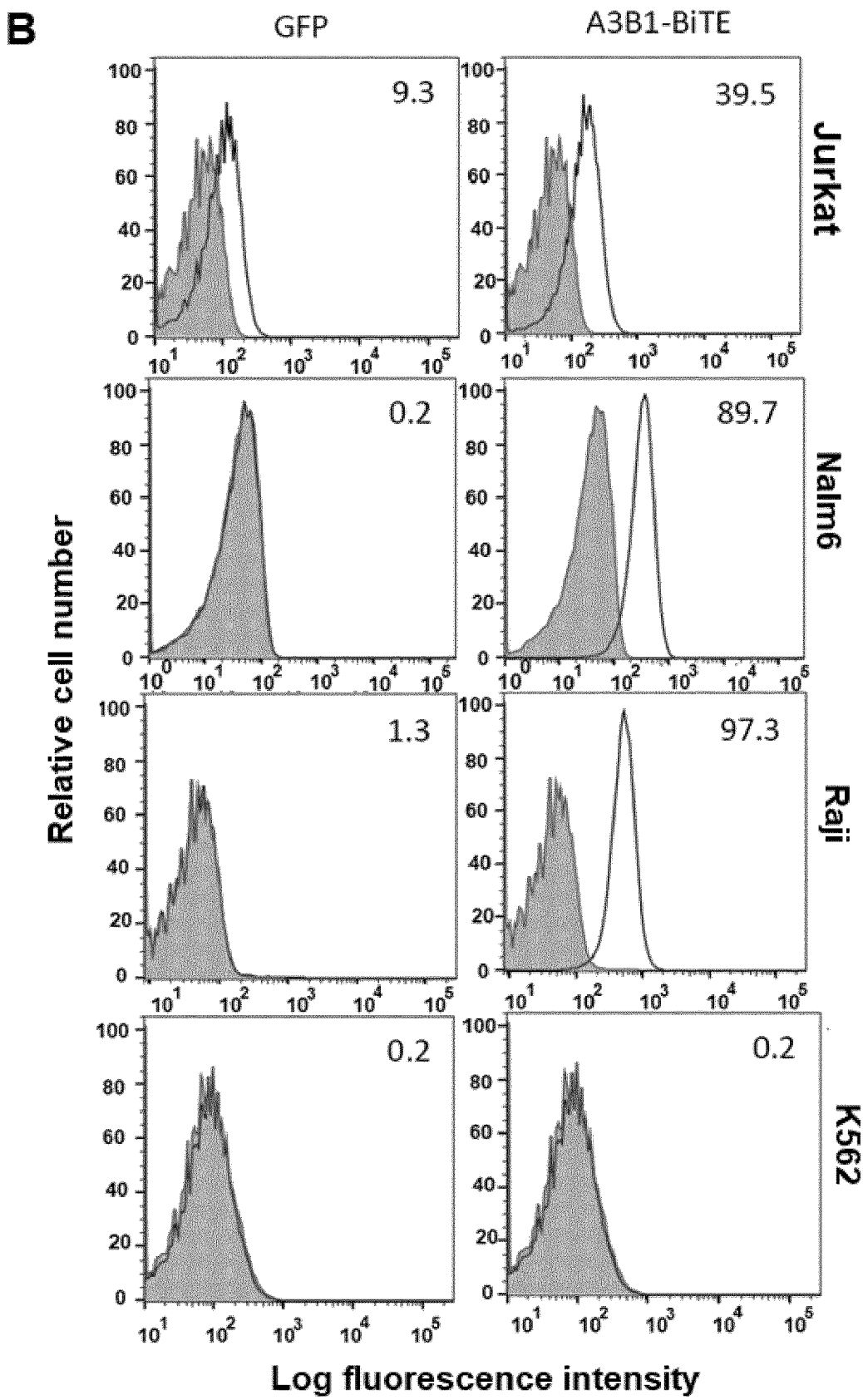
Figure 2:
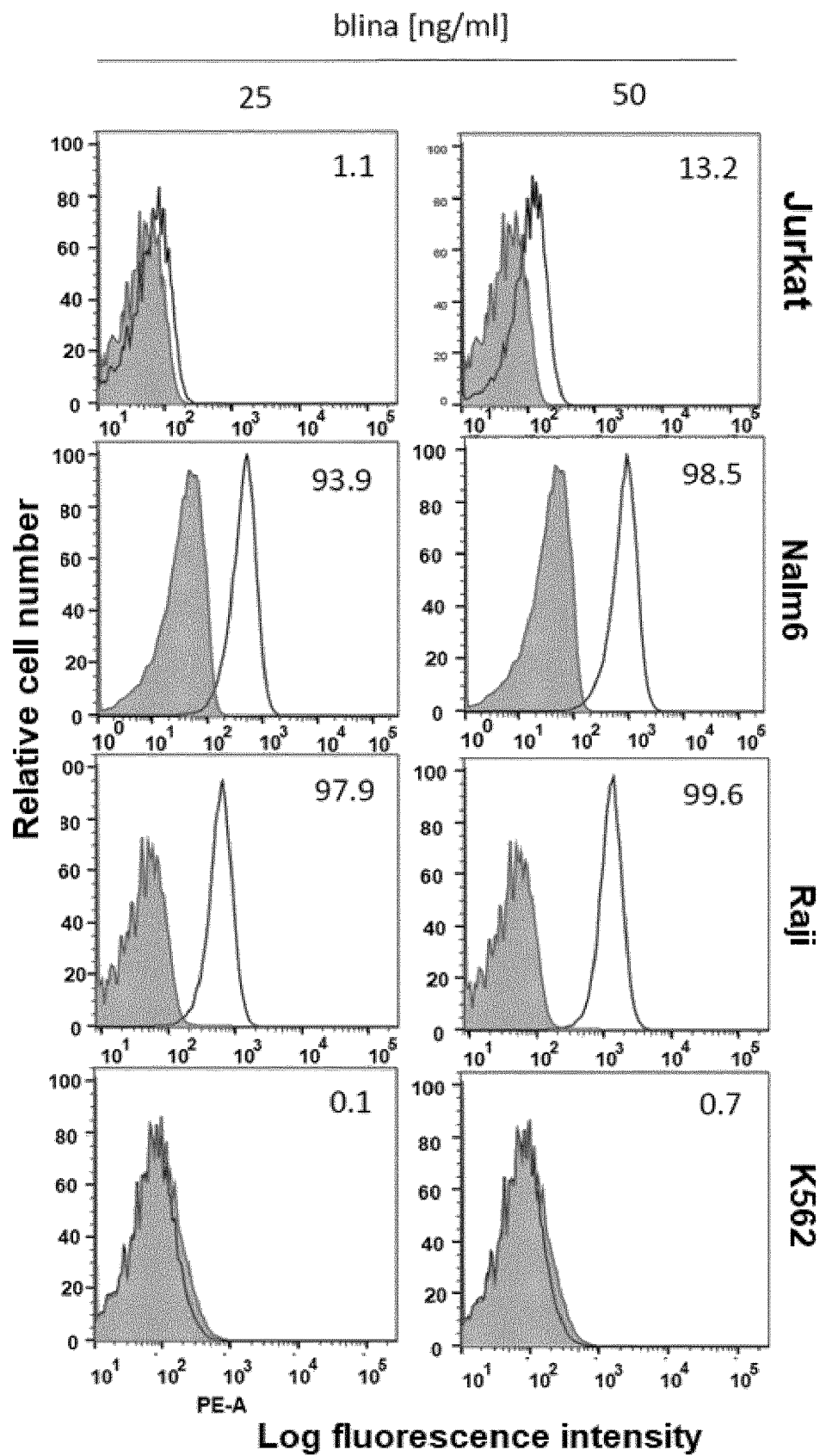
Figure 3:
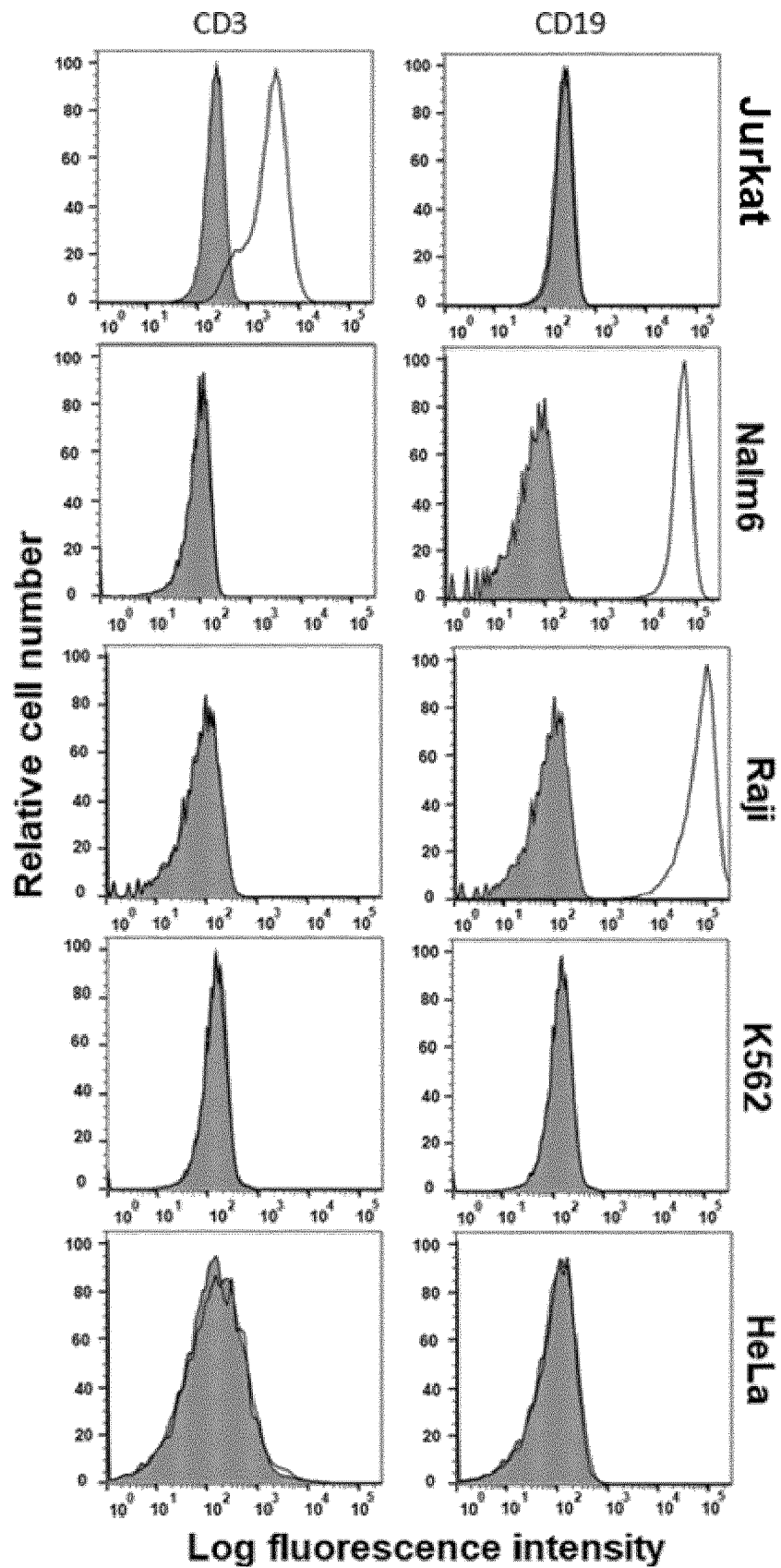
FIG. 3. Analysis of CD3 and CD19 expression on different cell lines by flow cytometry.
Figure 4:
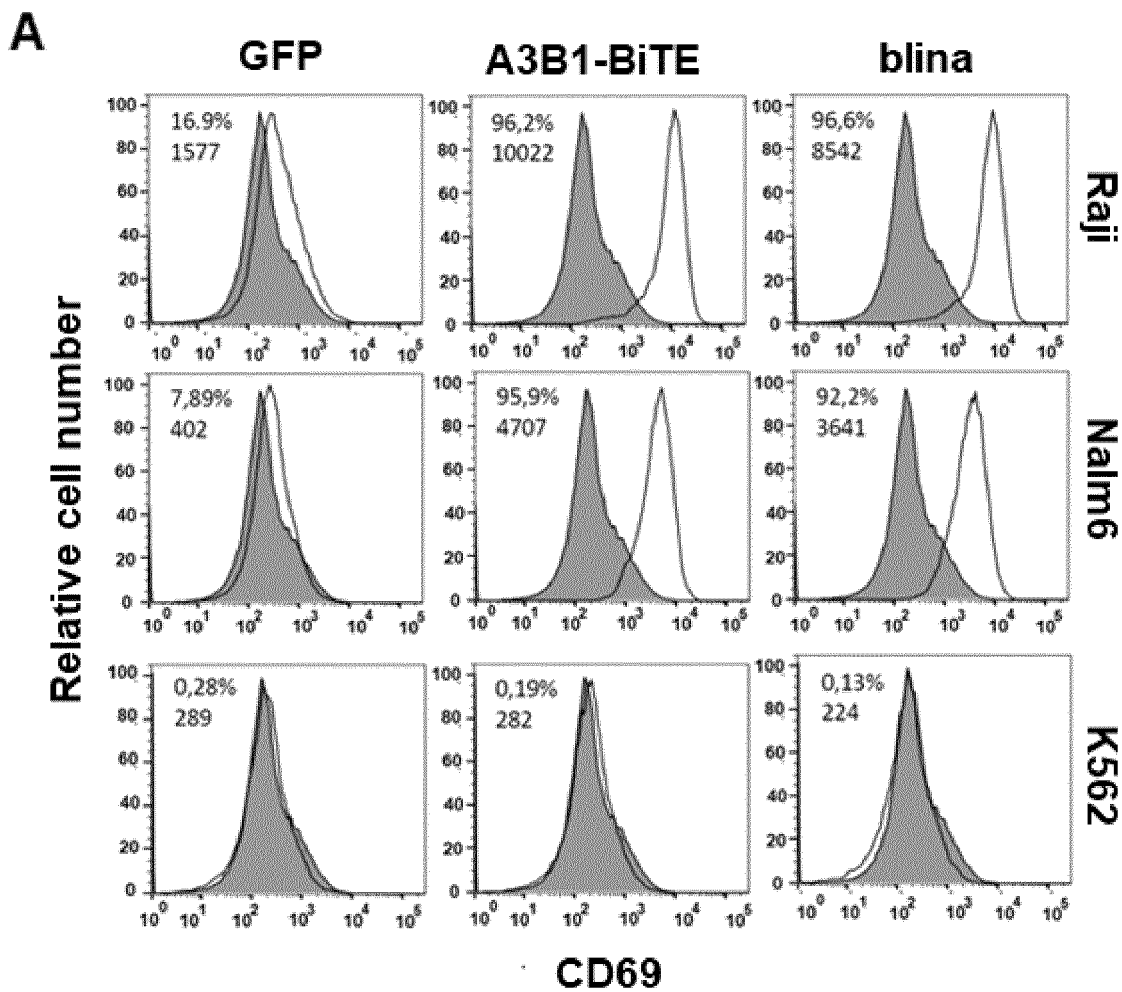
FIG. 4. Activation of human primary T cells by secreted A3B1-OKT3 bispecific antibody. FACS analysis of CD69 expression (A), and ELISA for IL-2 secretion (B) of effector (E) Jurkat T cells co-cultured with $CD19^-$ (K562) or $CD19^+$ (Raji or Nalm6) target (T) cells at a 4:1 E:T ratio. In panel (B), bars marked as 1 correspond to GFP, bars marked as 2 correspond to A3B1-OKT3 bispecific antibody and bars marked as 3 correspond to blinatumomab.
Figure 4:
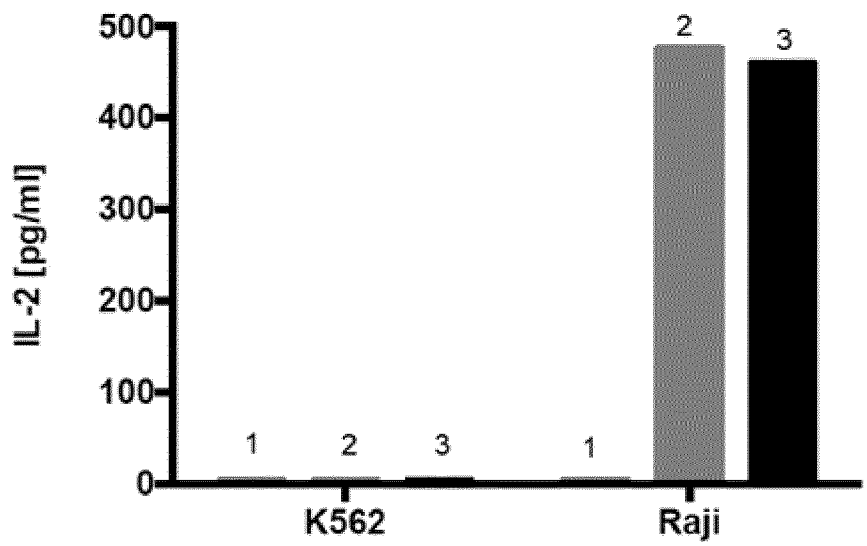

FACS analysis demonstrated that A3B1-OKT3 BiTE bound to CD3+ Jurkat cells and to CD19+ Nalm6 and Raji cells, but not to CD3-CD19- K562 cells (FIGS. 2 and 3). When T cells were co-cultured with CD19+ target cells in the presence of conditioned medium from A3B1-OKT3 BiTE-transfected HEK293 the levels of CD69 expression (FIG. 4A) and IL-2 secretion (FIG. 4B) were similar to those observed when cells were co-cultured with 100 ng/ml blinatumomab.

Figure 5:
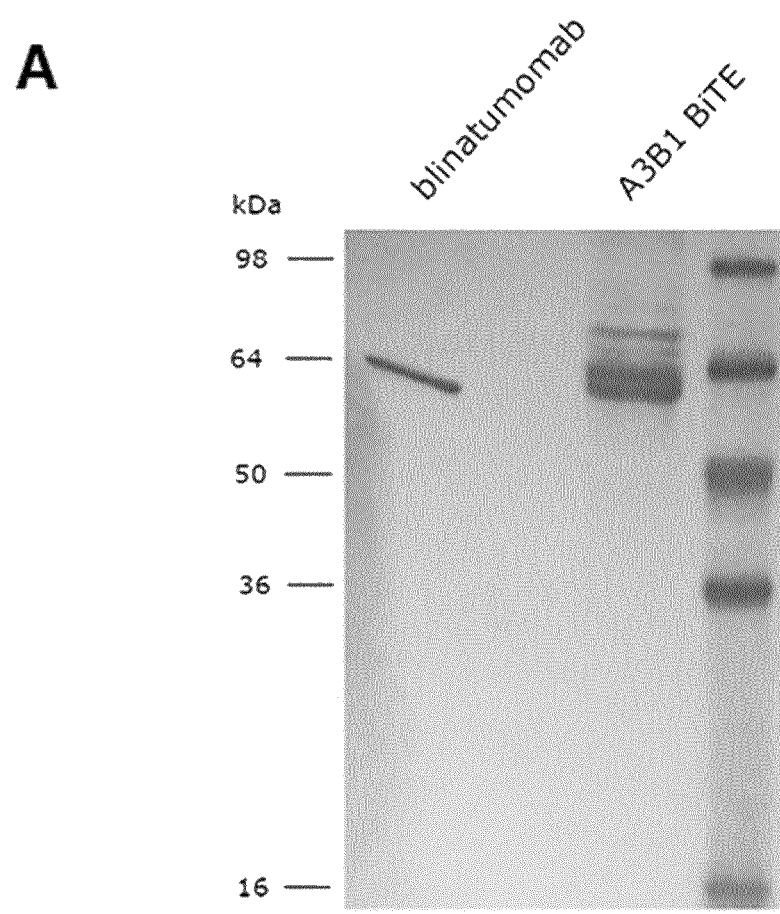
FIG. 5. Reducing SDS-PAGE of the purified A3B1-OKT3 bispecific antibody and blinatumomab (A). Titration ELISA of purified A3B1-OKT3 bispecific antibody against plastic-immobilized human CD19-Fc chimera (hCD19) and BSA (B). Induction of T cell cytotoxicity by purified A3B1-OKT3 bispecific antibody against luciferase-expressing $CD19^+$ Nalm6 and CD19- HeLa cells (C).
Figure 5:
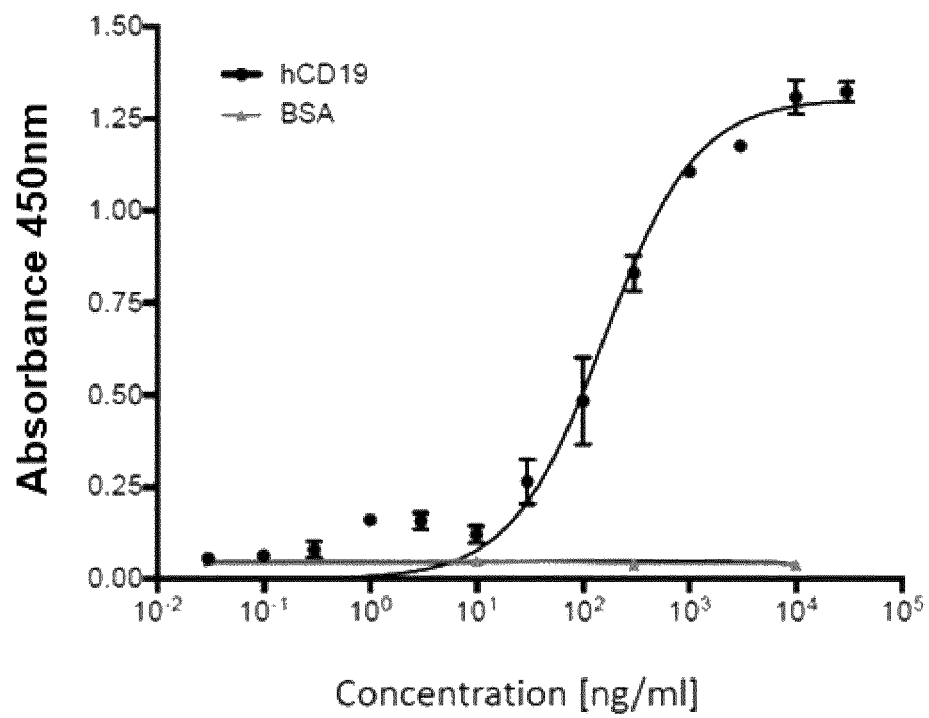
Figure 5:
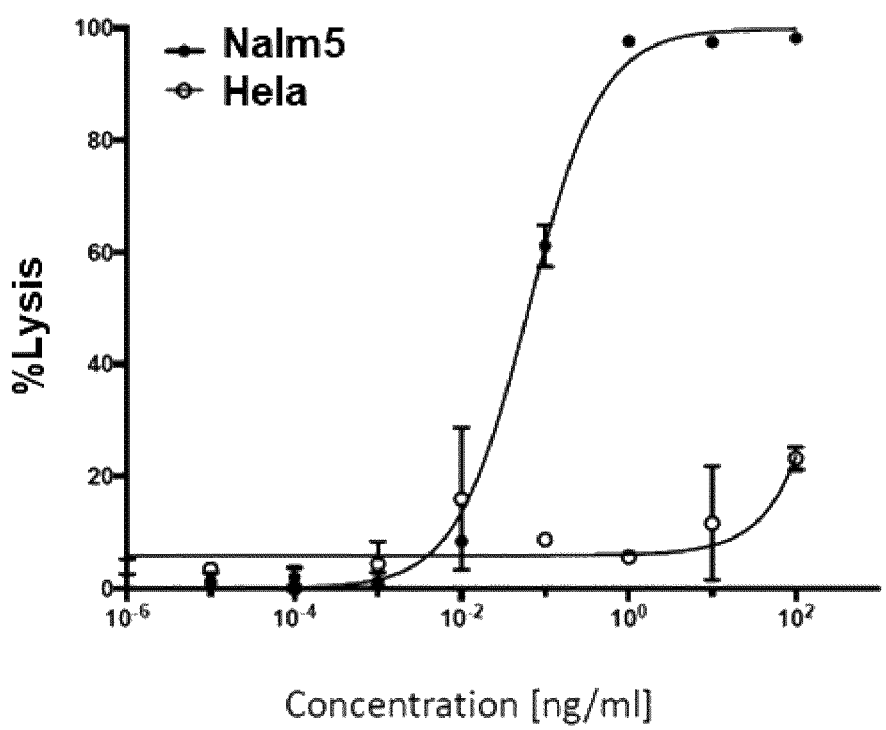

The A3B1-OKT3 bispecific antibody was purified from conditioned medium from stably transfected HEK293 cells by immobilized metal affinity chromatography, which yields protein (1 mg/L) that was >90% pure, as assessed by SDS/PAGE (FIG. 5A). Antibody titration ELISA analysis showed a specific and dose-dependent binding of A3B1-OKT3 bispecific antibody to plastic immobilized human CD19 in fusion with human Fc (hCD19) (FIG. 5B). The A3B1-OKT3 bispecific antibody could redirect primary T cells to specifically lyse CD19+ Nalm6 cells in a concentration-dependent fashion with an $EC_{50}$ values of 90 pg/mL (FIG. 5C). These values were similar to those determined in the same assay for blinatumomab.

Example 2. Preparation of T Cells Secreting A3B1-OKT3 Bispecific Antibody

Figure 6:
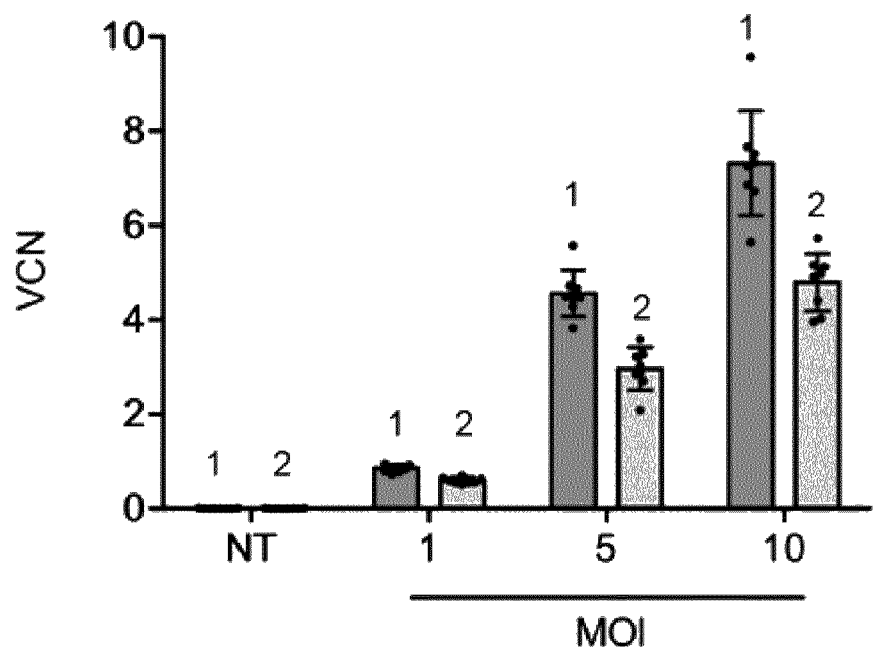
FIG. 6. Determination of the vector copy number (VCN) of integrated lentiviruses in Jurkat T cells transduced at different MOIs with A3B1-OKT3 CAR-encoding lentiviruses (bars marked as 2) of A3B1-OKT3 BiTE-encoding lentiviruses (bars marked as 1) (A). Analysis of the intracellular levels of endogenous CD3ζ and CAR in non-transduced (NT) Jurkat cells, STAb-T and CAR-T cells (B). Determination of the intracellular levels of A3B1-OKT3 bispecific antibody in NT, STAb-T and CAR-T cells (C). Detection of secreted A3B1-OKT3 bispecific antibody in the conditioned media from NT, STAb-T and CAR-T cells (D).
Figure 6:
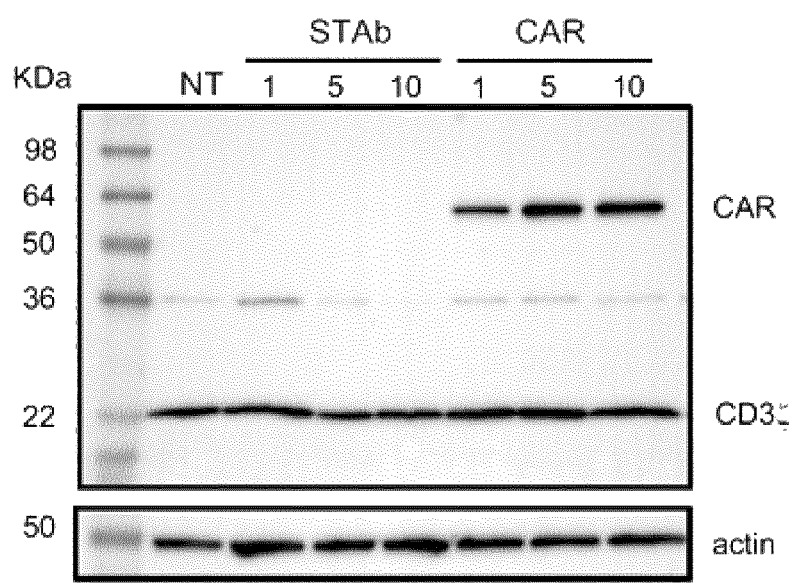
Figure 6:
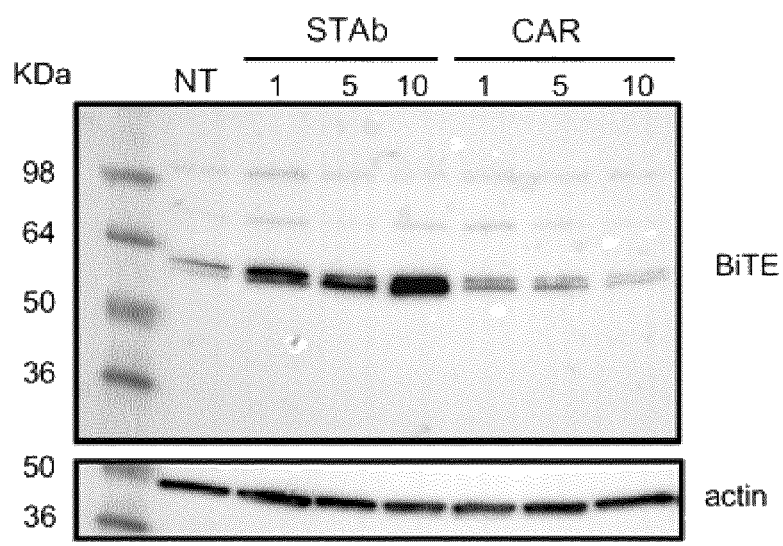
Figure 6:
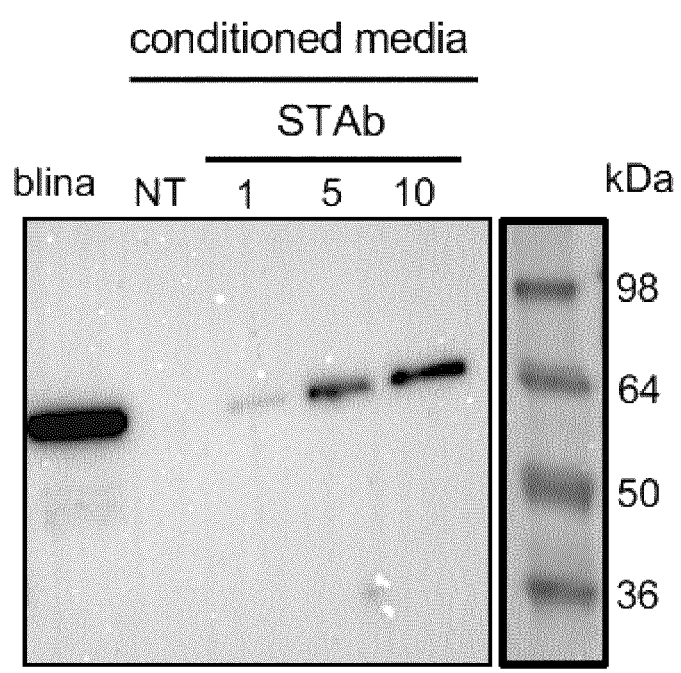
Figure 7:
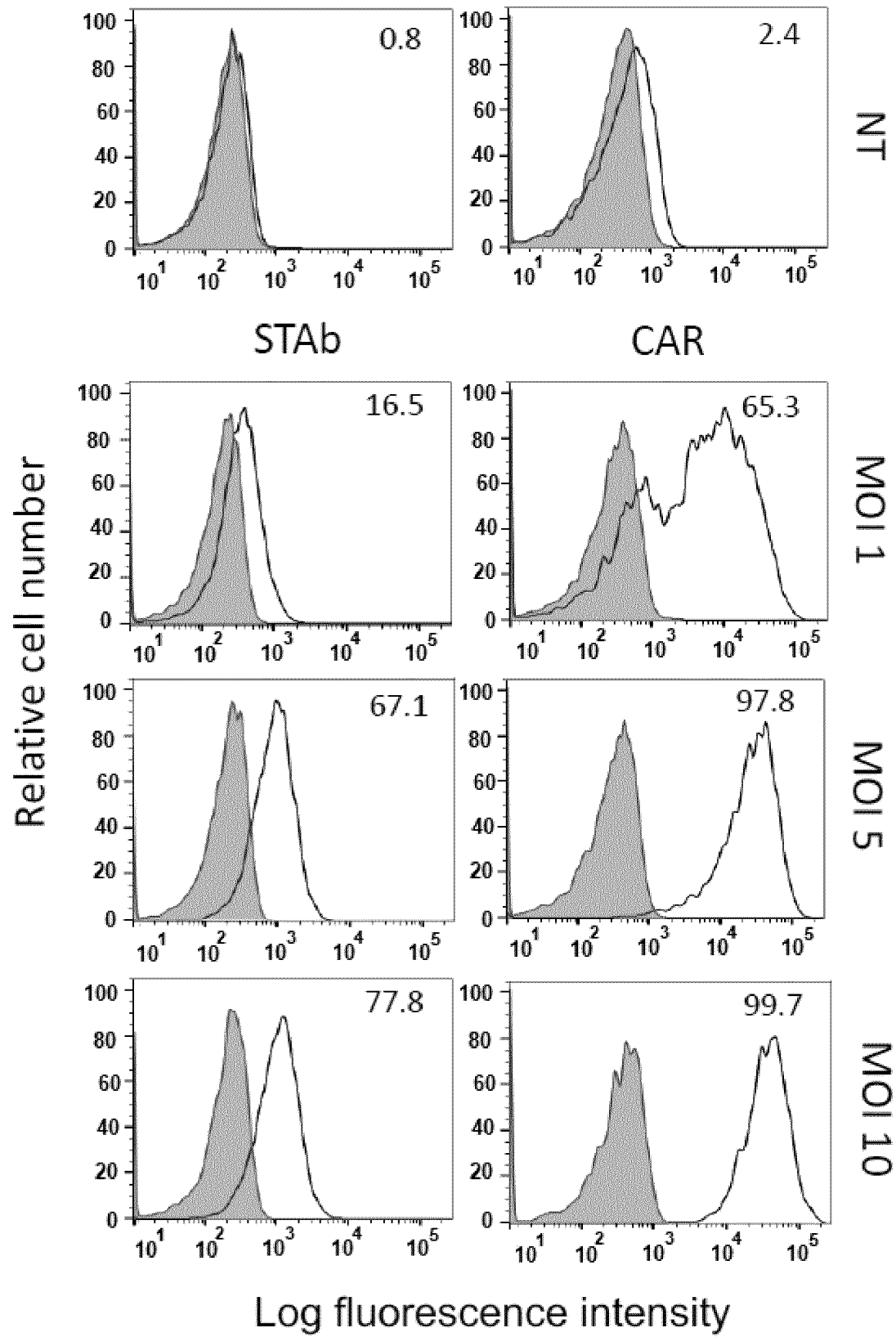
FIG. 7. Non-transduced (NT) or lentivirally-transduced CAR and STAb-T cells were stained to detect cell surface-expressed CAR or cell surface-bound A3B1-OKT3 bispecific antibody (A). Adhesion of NT or lenvirally-transduced CAR-T and STAb-T cells to plastic-immobilized BSA or hCD19 (B).
Figure 7:
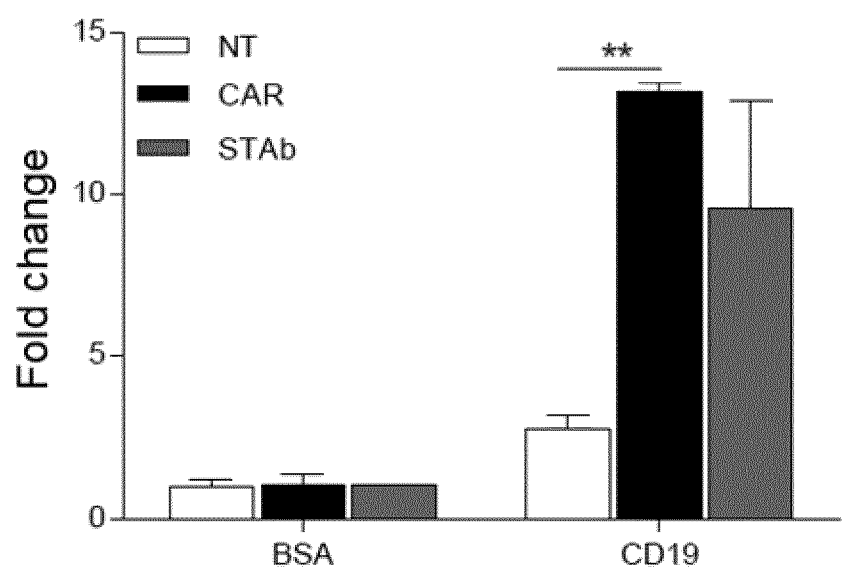

The A3B1-OKT3 bispecific antibody was cloned into a lentiviral vector and Jurkat T cells transduced at MOI (Multiplicity of Infection, ratio of lentiviral particles:targets) values of 1, 5 and 10, with A3B1-OKT3 bispecific antibody-encoding or A3B1 CAR-encoding lentiviruses and the relationship between the number of vector integrations and transgene expression analyzed. Vector copy number (VCN) was found to be similar in both cases, between 1 and 5 copies for A3B1 CAR-infected Jurkat T cells (CD19 CAR-Jurkat), and 1 and 7 for A3B1-OKT3 bispecific antibody-infected Jurkat T cells (CD19 STAb-Jurkat) (FIG. 6A). The intracellular levels of both proteins were similar as determined by Western blotting, with a clear correlationship between MOI and i) CAR expression (FIG. 6B) and ii) bispecific antibody expression and secretion (FIG. 6C,D). The A3B1-OKT3 bispecific antibody was detected in conditioned medium from CD19 STAb-Jurkat cells (FIG. 6D). No A3B1-OKT3 bispecific antibody molecules were detected in media from non-transduced (NT) Jurkat cells. The percentage of A3B1 CAR+ Jurkat T cells varied between 65% and 100%, and a VON-dependent surface staining of CD19 STAb-Jurkat cells was observed with an anti-His-tag mAb, ranging from 16 to 78%, indicating that secreted A3B1-OKT3 BiTEs were loaded onto the CD3 complexes on the T cell surface (FIG. 7A). Importantly, the process of cis-/trans-decoration of the CD3 complex by the secreted A3B1-OKT3 BiTE antibodies results in an effective and specific adhesion of STAb-Jurkat cells to immobilized hCD19 (FIG. 7B).

Figure 8:
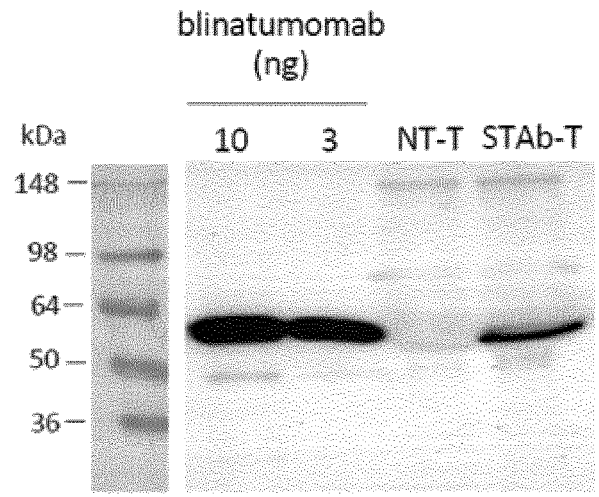
FIG. 8. (A) Detection of secreted A3B1-OKT3 bispecific antibody in the conditioned media from lentivirally-transduced human primary T cells (STAb-T) by western blot. Conditioned media from non-transduced T cells (NT-T) and blinatumomab were used as negative and positive controls, respectively. (B) Non-transduced (NT-T) or lentivirally-transduced CAR-T and STAb-T cells were stained to detect cell surface-expressed CAR or cell surface-bound A3B1-OKT3 bispecific antibody. (C) NT-T, CAR-T or STAb-T cells were co-cultured with luciferase expressing CD19-negative HeLa$^{Luc}$ or CD19-positive Nalm6$^{Luc}$ tumor cells at a 2:1 E:T (C, E). As controls, non-activated T cells were cultured with target cells in the presence of 100 ng/ml blinatumomab (D, F). After 48 hours, IFN-γ production was determined by ELISA (C, D) and D-luciferin was added to detect bioluminescence (E, F). Percent viability was calculated relative to the luminescence from an equal number of target cells co-cultured with NT-T cells, and used to calculate percent specific lysis (E, F). Data are mean±SD (n=3). Determination of the cytotoxic activity of NT-T (points and curves marked as 1), CAR-T (points and curves marked as 2) or STAb-T cells (points and curves marked as 3) co-cultured with CD19-negative tumor cells at a decreasing E:T ratio (G). The experiments were performed three times and results of one representative experiment are shown.
Figure 8:
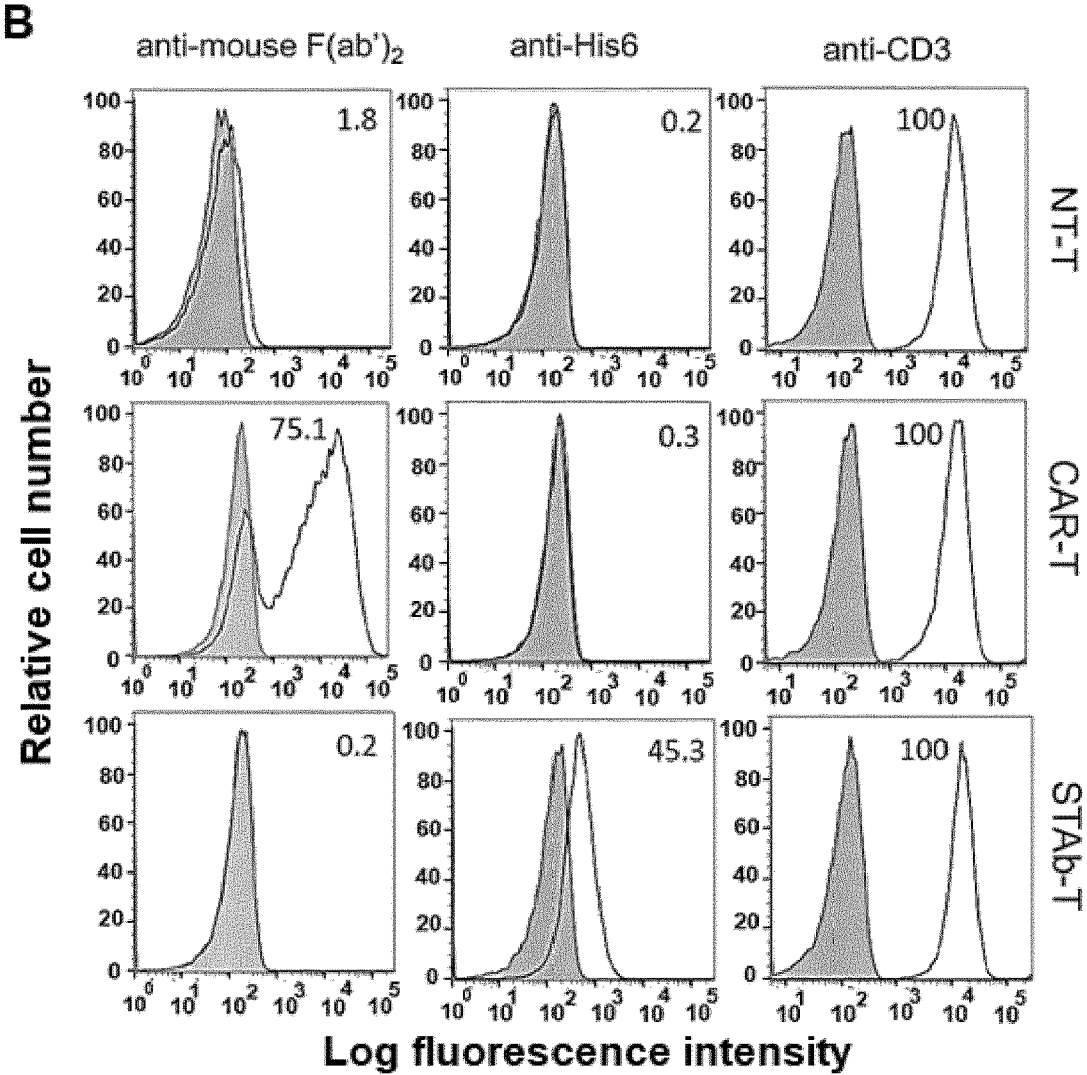
Figure 8:
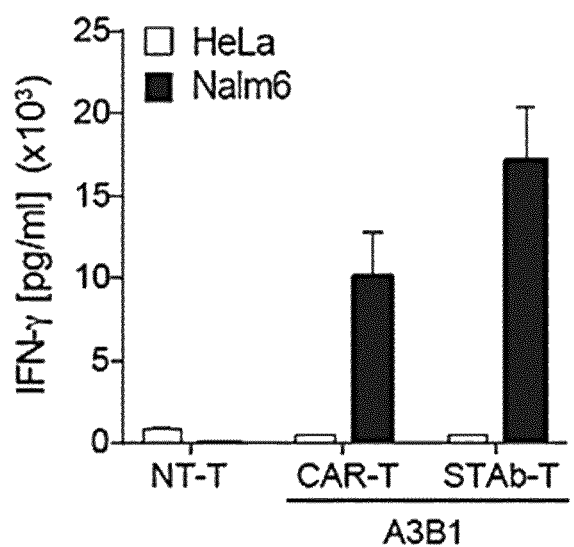
Figure 8:
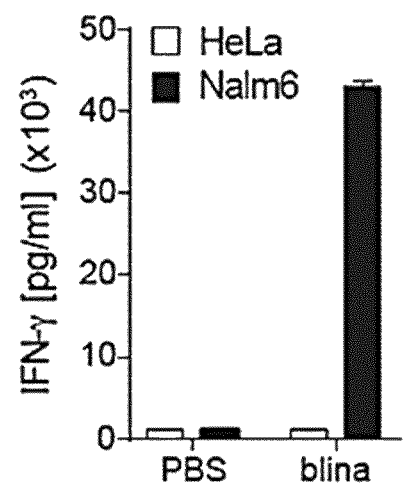
Figure 8:
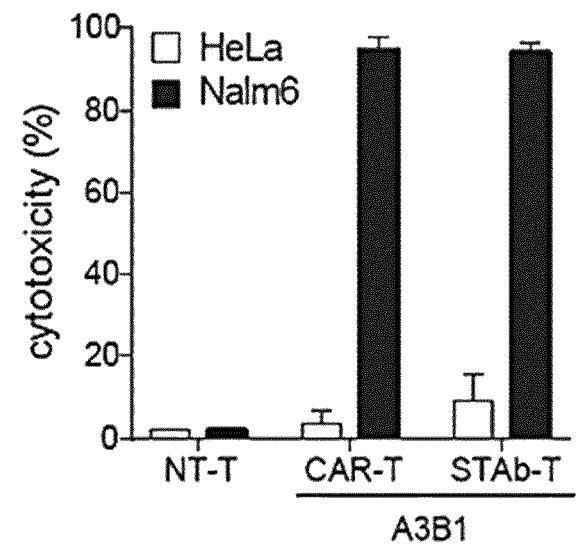
Figure 8:
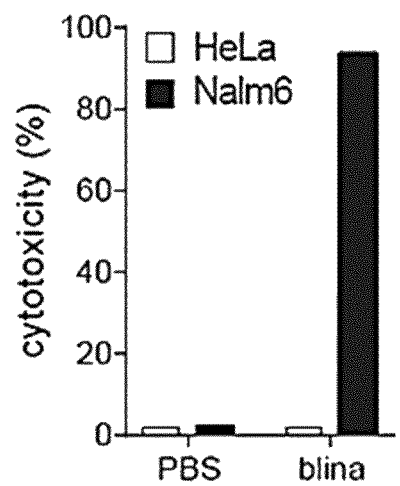
Figure 8:
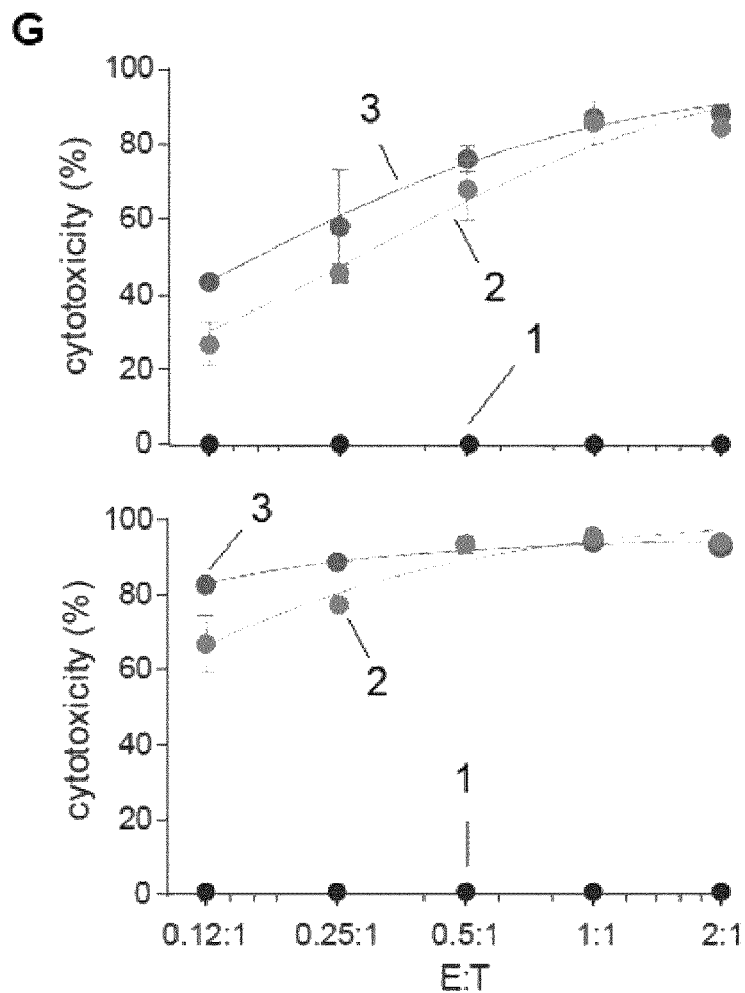

Next, CD3/CD28-activated primary human T cells were transduced to generate CD19 STAb-T cells. Activated T cells were transduced at a MOI (Multiplicity of Infection, ratio of lentiviral particles:targets) of 10 with A3B1-OKT3 bispecific antibody-encoding or A3B1 CAR-encoding lentiviruses, and after an expansion period, the expression of both A3B1-based molecules analyzed. The A3B1-OKT3 bispecific antibody was detected in conditioned-medium from STAb-T cells, had the expected molecular weight (FIG. 8A), and specifically recognize CD19+ and CD3+ cell lines (not shown). No A3B1-OKT3 bispecific antibodies were detected in media from non-transduced (NT-T) (FIG. 8A) or CAR-T cells. Positive surface staining of STAb-T cells was observed with an anti-His-tag antibody (mean of 45%), indicating that secreted A3B1-OKT3 bispecific antibody are loaded onto the CD3 complexes on the T cell surface (FIG. 8B). The percentage of CAR+ T cells varied between 30% and 76%, depending on the experiment (FIG. 8B).

Example 3. Killing Activity of T Cells Secreting A3B1-OKT3 Bispecific Antibody and CD19 CAR-T Cells T cells secreting A3B1-OKT3 bispecific antibody (STAb-T cells) secreted IFNγ after a co-culture at a 2:1 E:T ratio with CD19+ Nalm6 cells, but not with CD19- HeLa cells (FIG. 8C). These levels were similar to those observed with CAR-T cells (FIG. 8O) or when non-transduced (NT) activated T cells (NT-T) were co-cultured with Nalm6 cells in the presence of blinatumomab (FIG. 8D). In cytotoxicity assays, STAb-T cells killed CD19+ but not CD19-cells (FIG. 8E). NT-T cells had no cytolytic activity confirming the specificity of STAb-T cells. These results indicate that STAb-T cells recognize and kill CD19-positive target cells in antigen dependent manner (FIG. 8E). Furthermore, STAb-T cells were more efficient than CAR-T cells at lower E:T ratios concerning the cytotoxic potential in relation to E:T ratio and time (FIG. 8G).

Figure 9:
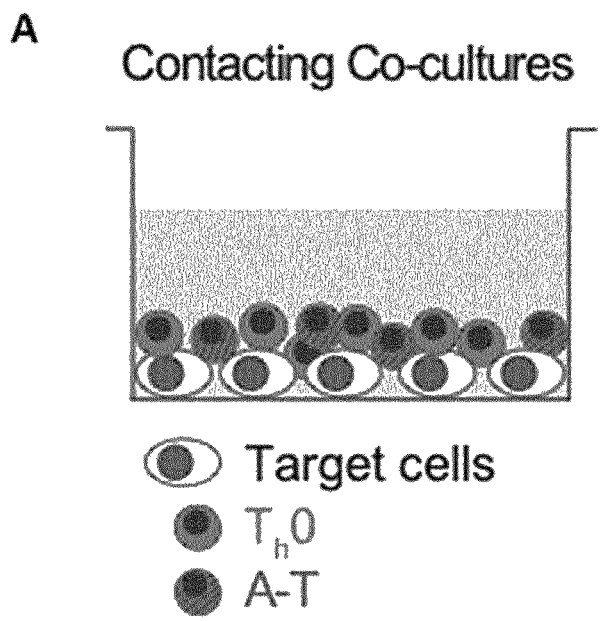
FIG. 9. Decreasing numbers of Cell Trace Violet-stained activated T (A-T) cells (NT-T, CAR-T or STAb-T cells) were co-cultured with Nalm6$^{Luc}$ or HeLa$^{Luc}$ target cells (A) and increasing numbers of CFSE-stained freshly isolated non-activated T cells ($T_h0$). The total effector:target (E:T) ratio was constant (2:1), but the ratios A-T:Target and A-T:$T_h0$ varied as indicated. After 5 days, Cell Trace Violet or CFSE dilution were analyzed by flow cytometry (B) to measure proliferation of A-T cells (peaks without any mark) and $T_h0$ cells (peaks marked as 1), respectively. Decreasing numbers of NT-T, CAR-T or STAb-T cells were co-cultured (A) with Nalm6$^{Luc}$ or HeLa$^{Luc}$ target cells and increasing numbers of $T_h0$ cells, from the same donor. The total effector:target (E:T) ratio was constant (2:1), but the ratios activated T cells (A-T):$T_h0$ and A-T:target varied considerably. After 48 hours, IFN-γ production was determined by ELISA (C) and D-luciferin was added to detect bioluminescence (D). Percent viability was calculated relative to the luminescence from an equal number of target cells co-cultured with NA-T cells and used to calculate percent specific lysis (D). Data are mean±SD (n=3). The experiments were performed three times and results of one representative experiment are shown. Similar experiments were performed in a non-contacting co-culture transwell assay (E). $5 \times 10^4$ target cells (Nalm6$^{Luc}$ or HeLa$^{Luc}$) and $1 \times 10^5$ $T_h0$ cells were plated in the bottom well and decreasing numbers (from $10^5$ to $10^1$) of A-T (NT-T, CAR-T or STAb-T) cells in the insert well. After 48 hours, IFN-γ production was determined by ELISA (F) and the number of live target cells determined by luciferase assay (G). In panels (C), (D), (F) and (G), closed circles and curve marked as 1 corresponds to NT-T+Nalm6, closed circles and curve marked as 2 correspond to CAR-T+Nalm6, closed circles and curve marked as 3 correspond to STAb-T+Nalm6, open circle marked as 4 correspond to NT-T+HeLa, open circle marked as 5 correspond to CAR-T+HeLa and open circle marked as 6 correspond to STAb-T+HeLa. (n=3; *P≤0.05, P≤0.01, *P≤0.001, Student's t test).
Figure 9:
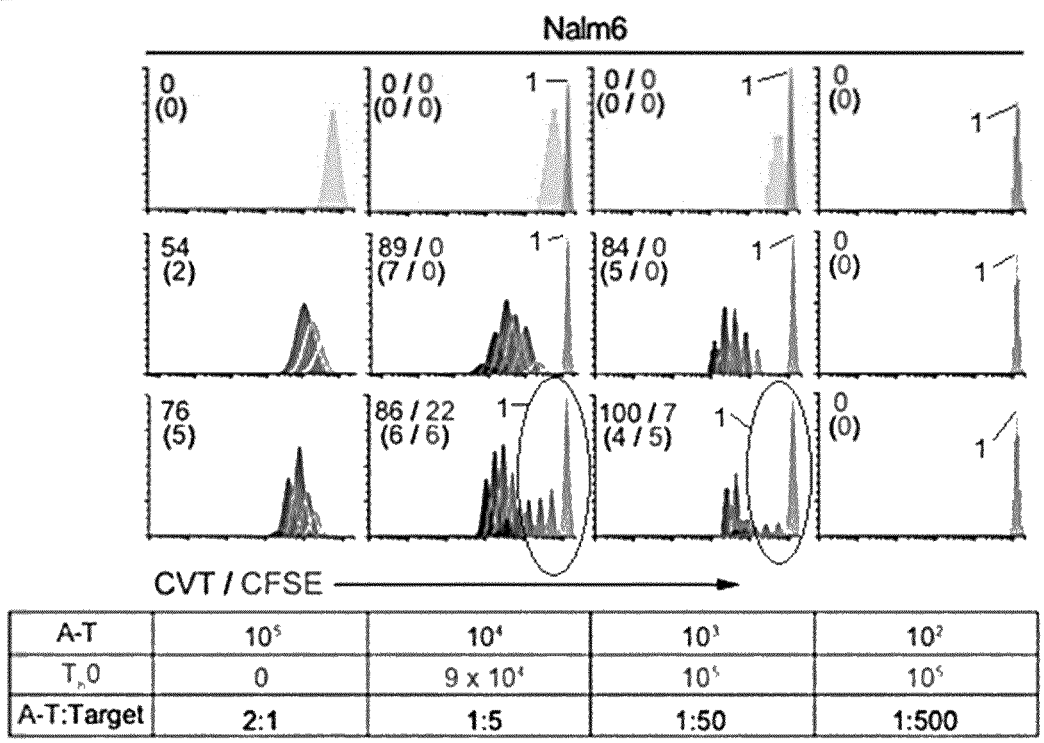
Figure 9:
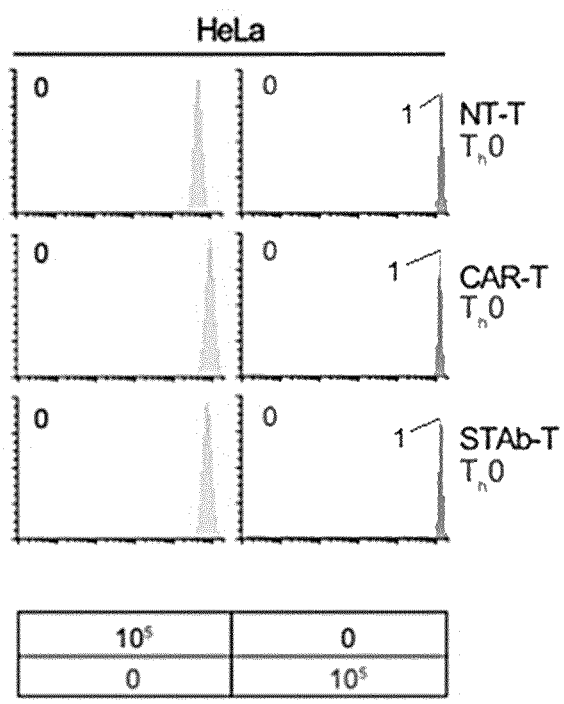
Figure 9:
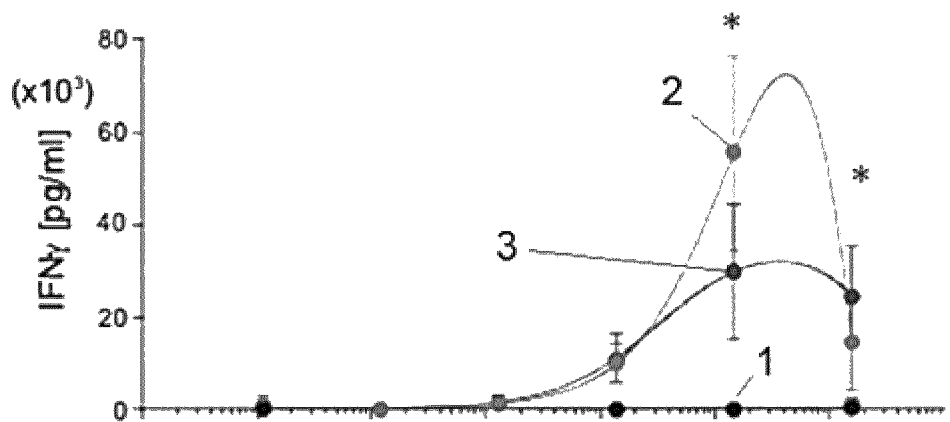
Figure 9:
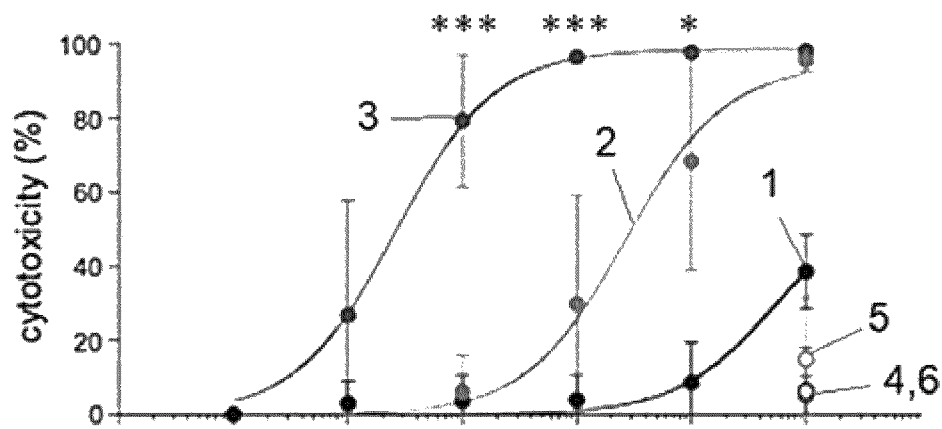
Figure 9:
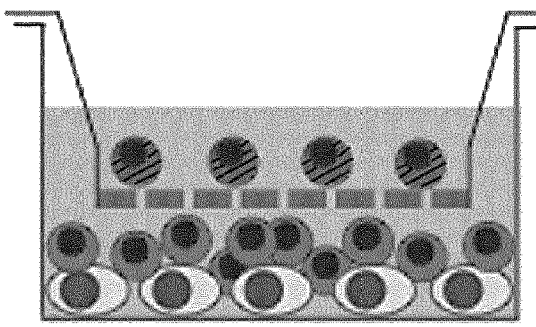
Figure 9:
Figure 9:
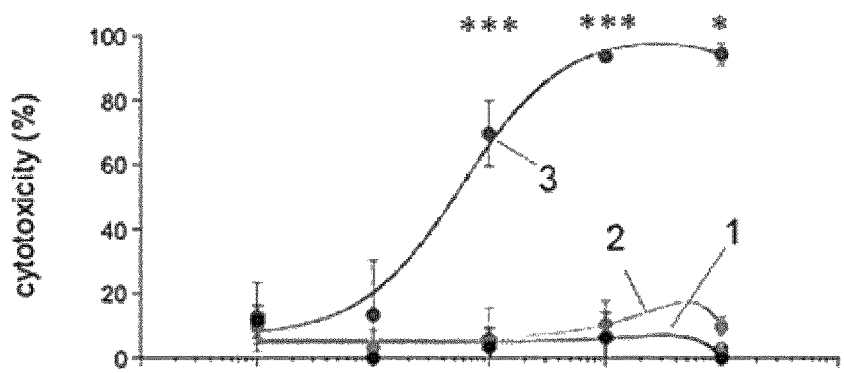

Example 4. Effect of T Cells Secreting A3B1-OKT3 Bispecific Antibody on Other T Cells To demonstrate that STAb-T cells were able to recruit bystander T cells to kill CD19-positive targets, different in vitro co-culture setups, with and without direct cell-cell contacts were used (FIG. 9). To this end, NT or lentivirally-transduced activated T cells (A-T) or mixtures of A-T and non-activated T cells ($T_h0$) were co-cultured with CD19+ Nalm6 or CD19- HeLa cells at a constant 2:1 E:T ratio. The A-T (NT-T, CAR-T or STAb-T) and $T_h0$ cells were mixed at different A-T:$T_h0$ ratios (from 1:9 to 1:100.000) keeping a constant number of $1\times10^5$ effector T cells.

When stimulated with Nalm6 cells, in a direct cell-cell contact context (FIG. 9A), the STAb-T cells proliferated efficiently and exhibited a percentage of dividing cells of 76, 86 and 100 at 2:1, 1:1 and 1:50 A-T:Target ratios, respectively (FIG. 9B). The proliferation of CAR-T cells was less efficient at the 2:1 A-T:Target ratio with only a 54% of dividing cells (FIG. 9B). In this context, the levels of IFN-γ secretion by CAR-T cells were significantly higher than those observed in STAb-T cells (FIG. 90). However, the cytotoxic capacity of CAR-T cells rapidly declined as the A-T:Target ratio increased being able to induce 50% lysis of Nalm6 cells at a 1:50 A-T:Target ratio, which disappeared completely at the 1:500 A-T:Target ratio (FIG. 9D). Importantly, bystander $T_h0$ cells mixed with STAb-T cells were efficiently stimulated to proliferate by Nalm6 cells, with a percentage of dividing cells of 22.3 and 7.3 at 1:9 and 1:100 A-T:$T_h0$ ratios, respectively (FIG. 9A).

The percentage of dividing T cells was higher than observed when $T_h0$ cells were cultured with Nalm6 cells in the presence of blinatumomab. This ability to recruit bystander $T_h0$ cells results in STAb-T cells being able to induce 100% of tumor cell lysis, even when they represented 1 out of 500 total Target cells (FIG. 9D). Even at a 1:5,000 A-T:Target ratio, STAb-T cells induced 30% lysis of Nalm6 cells (FIG. 9D). No detectable proliferation, IFN-γ secretion and cytotoxicity was observed when $T_h0$ cells were mixed with NT, and co-cultured with Nalm6 cells (FIG. 9A-D; respectively); and when A-T cells and A-T:$T_h0$ mixtures were cultured with HeLa cells (FIG. 9A-D; respectively).

To further demonstrate that STAb-T cells are able to recruit bystander $T_h0$ cells to CD19-positive targets, transwell assays were used (FIG. 9E). CD19+ Nalm6$^{Luc}$ cells or CD19-HeLa$^{Luc}$ cells were plated with or without $T_h0$ cells in the bottom well, and NT-T, CAR-T or STAb-T cells were plated in the insert well (FIG. 9E). T cells activation (FIG. 9F) and tumor cell killing (FIG. 9G) was dependent on the presence of $T_h0$ cells in the bottom well and STAb-T cells in the insert well, indicating that secreted A3B1-OKT3 BiTEs effectively redirected $T_h0$ cells to CD19-positive targets. The extraordinary recruiting capacity of these cells is evidenced by the fact that only 1000 STAb-T cells were able to induce 100% of tumor cell lysis, indicating that a single STAb-T cell is capable of efficiently redirecting 100 $T_h0$ cells to kill CD19+ tumor cells (FIG. 9G).

Figure 10:
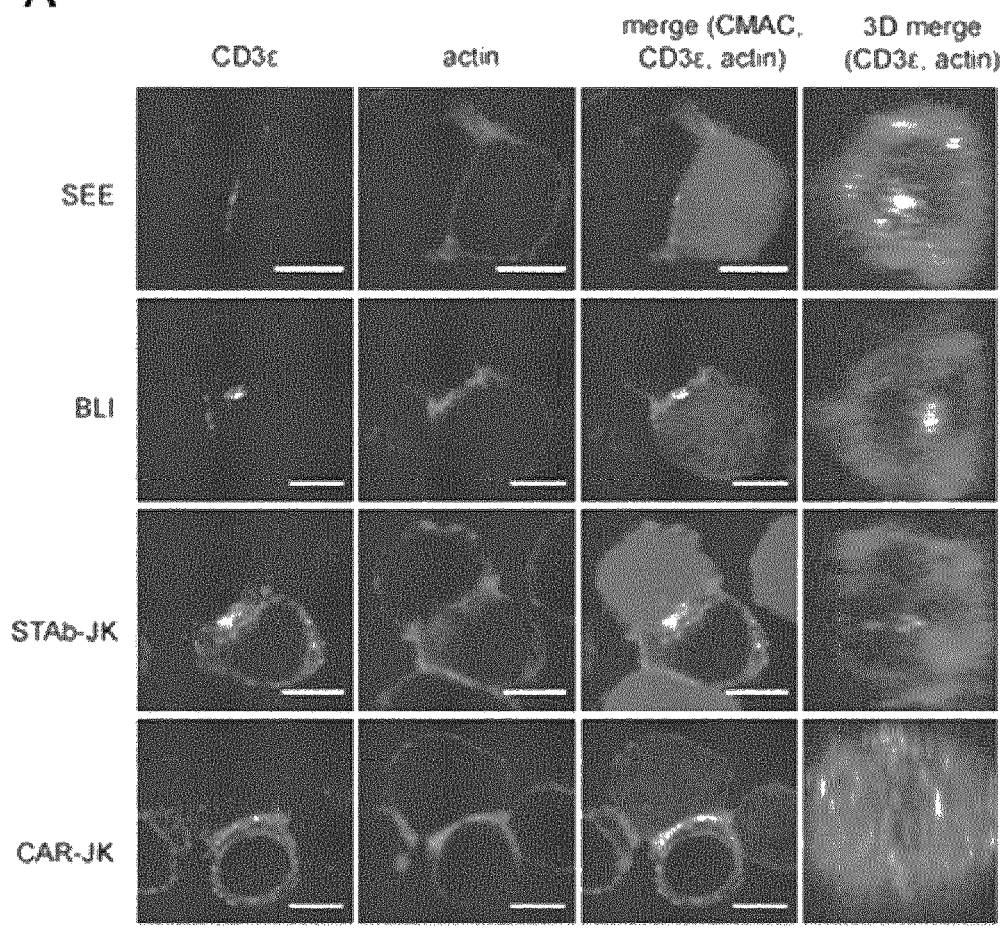
FIG. 10. Jurkat STAb and CAR cell immunological synapse (IS) assembly. CAR-Jurkat (CAR-JK) and STAb-Jurkat (STAb-JK) cells were stimulated for 15 min with Raji cells. As activation controls, non-transduced Jurkat (NT-Jurkat, NT-JK) cells were incubated with Raji cells loaded with SEE or blinatumomab 5 nM (BLI). SEE$^-$ control samples correspond to NT-JK cells incubated with unloaded Raji cells. (A) Distribution of CD3ε and actin at the mature IS. Representative cell conjugates of Jurkat cells interacting with Raji cells labelled with CMAC are shown. The green (CD3ε) and red (actin) channels, as well as the merged images, are shown. Scale bar corresponds to 5 μm. The IS topology obtained from the 3D reconstructions of region of interest placed at the IS in confocal stacks containing the red and the green channels are shown. (B) The graph represents the actin clearance at the IS in each sample estimated as the fraction of actin cleared area. Symbols in each sample indicate individual cells analyzed and the black line the average value. Samples were compared by an ordinary one-way ANOVA with a Tukey's multiple comparison test. *p<0.05; p<0.01; *p<0.001; ****p<0,0001. (C) Graph representing the percentage of cell conjugates showing peripheral CD3 microclusters or central supramolecular activation clusters (cSMAC) formation by CD3 coalescence. Contingency tests were performed in each possible comparison. *p<0.05; p<0.01; *p<0.001; ****p<0,0001. (B and C) Analysis from 3 independent experiments.
Figure 10:
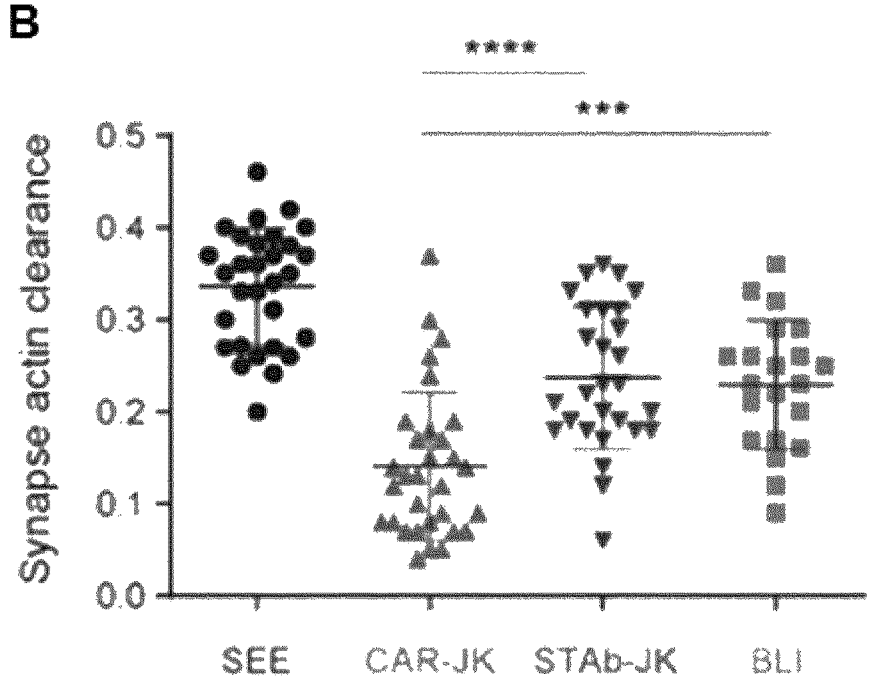
Figure 10:
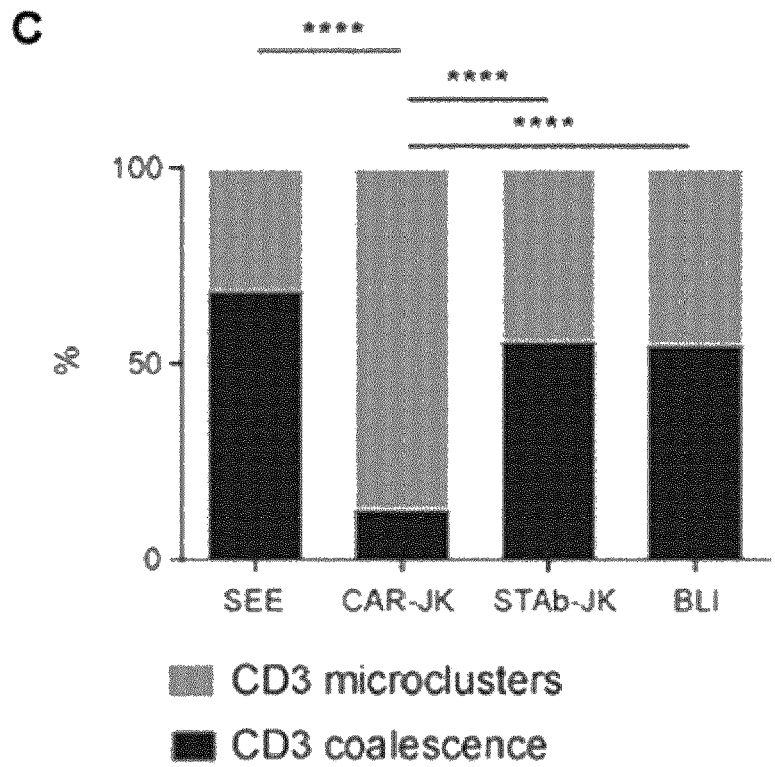

Example 5. Spatial Topology of the Immunological Synapses Assembled by CAR and STAb Cells The spatial topology of the immunological synapse (IS) assembled by the A3B1 CAR or the A3B1-OKT3 bispecific antibody was studied in CD19 CAR-Jurkat (CD19 CAR-JK) cells and CD19 STAb-Jurkat (CD19 STAb-JK) cells, using the CD19-expressing cell line Raji as antigen presenting cell. As controls, non-transduced Jurkat (NT-JK) cells were incubated with unloaded (non-activated control) or with Raji cells loaded with blinatumomab or the bacterial superantigen (SAG) staphylococcal enterotoxin E (SEE) (activation controls). Bacterial SAGs bind, as intact molecules to the class II MHC molecules expressed on professional antigen presenting cells (APCs) outside the peptide-binding groove then sequentially bind the TCR via the variable region of the TCR β-chain. Jurkat-Raji cell conjugates incubated at 37° C. for 15 minutes were stained for F-actin and CD3ε to evaluate the organization of the distal and central supramolecular activation clusters, dSMAC and cSMAC, respectively. 3D confocal microscopy was implemented to visualize the central filamentous actin clearance, with the typical actin ring at the dSMAC, and the coalescence of CD3ε microclusters at the cSMAC occurring in the mature IS. All conditions, including CD19 CAR-JK cells, recruited CD3ε to the IS. However, STAb-JK, but not CAR-JK cells cleared actin and formed the cSMAC by CD3 coalescence in a similar way to J-NT-T cells stimulated by SEE or blinatumomab (FIG. 10A, 10B, 10C).

Figure 11:
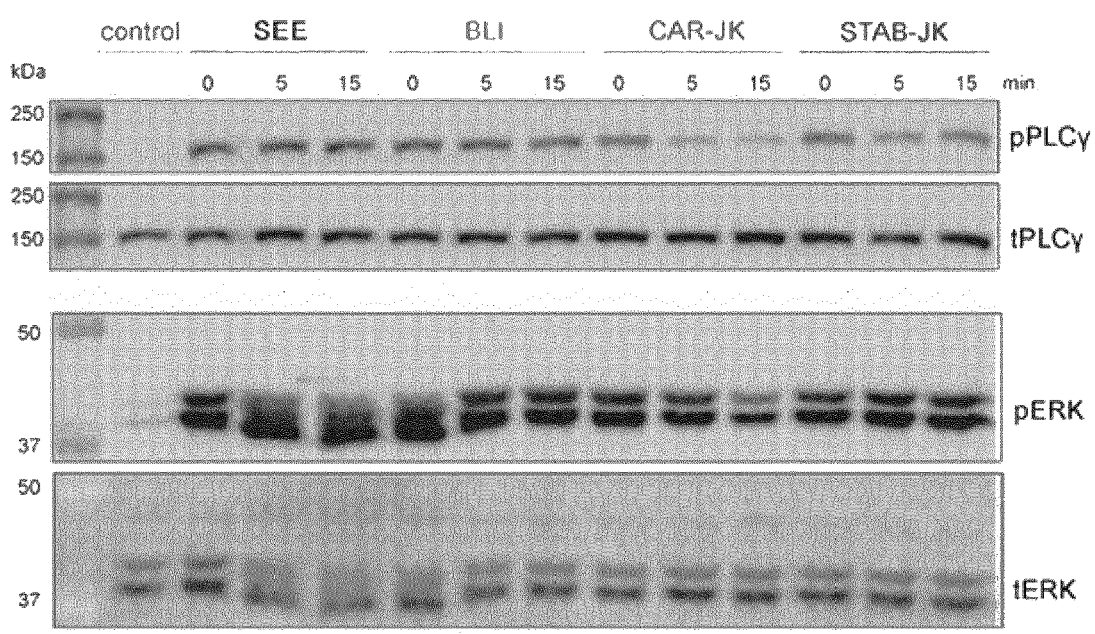
FIG. 11. Early signaling in Jurkat CAR and STAb cells. (A) Western blot for quantification of PLCγ1 and ERK1/2 activation. (B) Phosphorylated fraction of the molecules analyzed in (A), normalized to the maximum fraction found in 0 minutes (min). Mean±SD from 3 independent experiments is shown. Samples were compared by a paired two-tailed Student t-test. *p<0.05.
Figure 11:
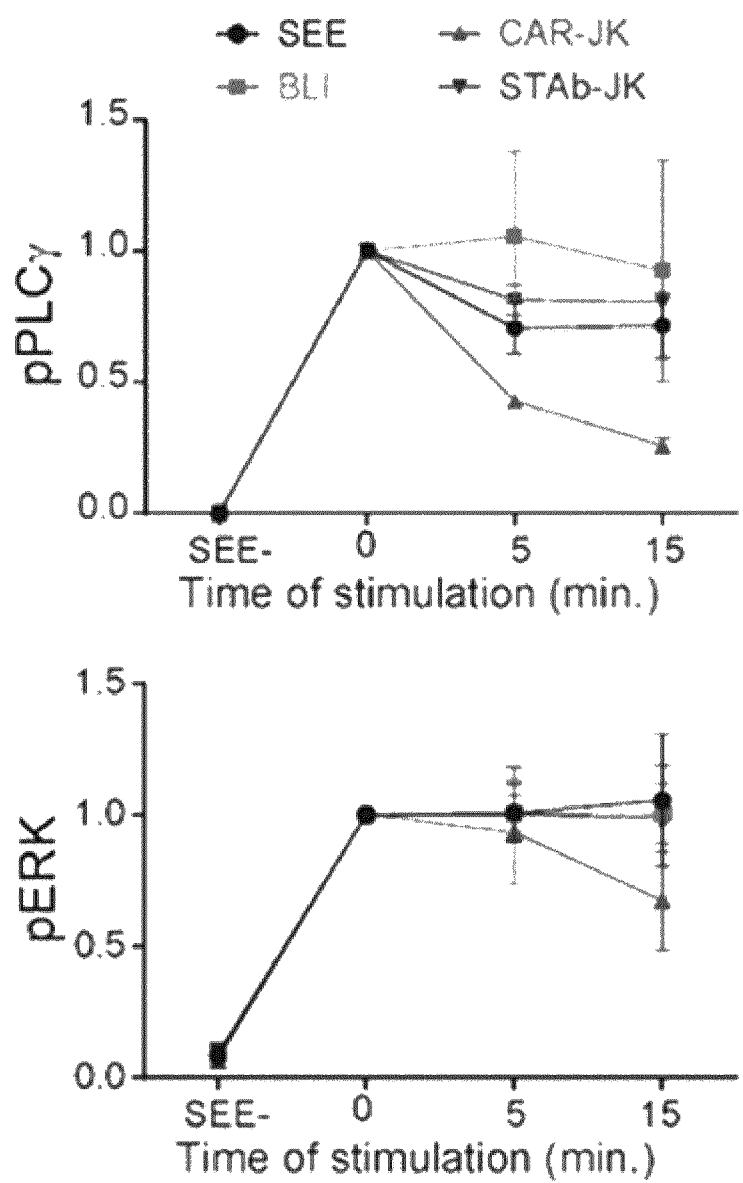
Figure 12:
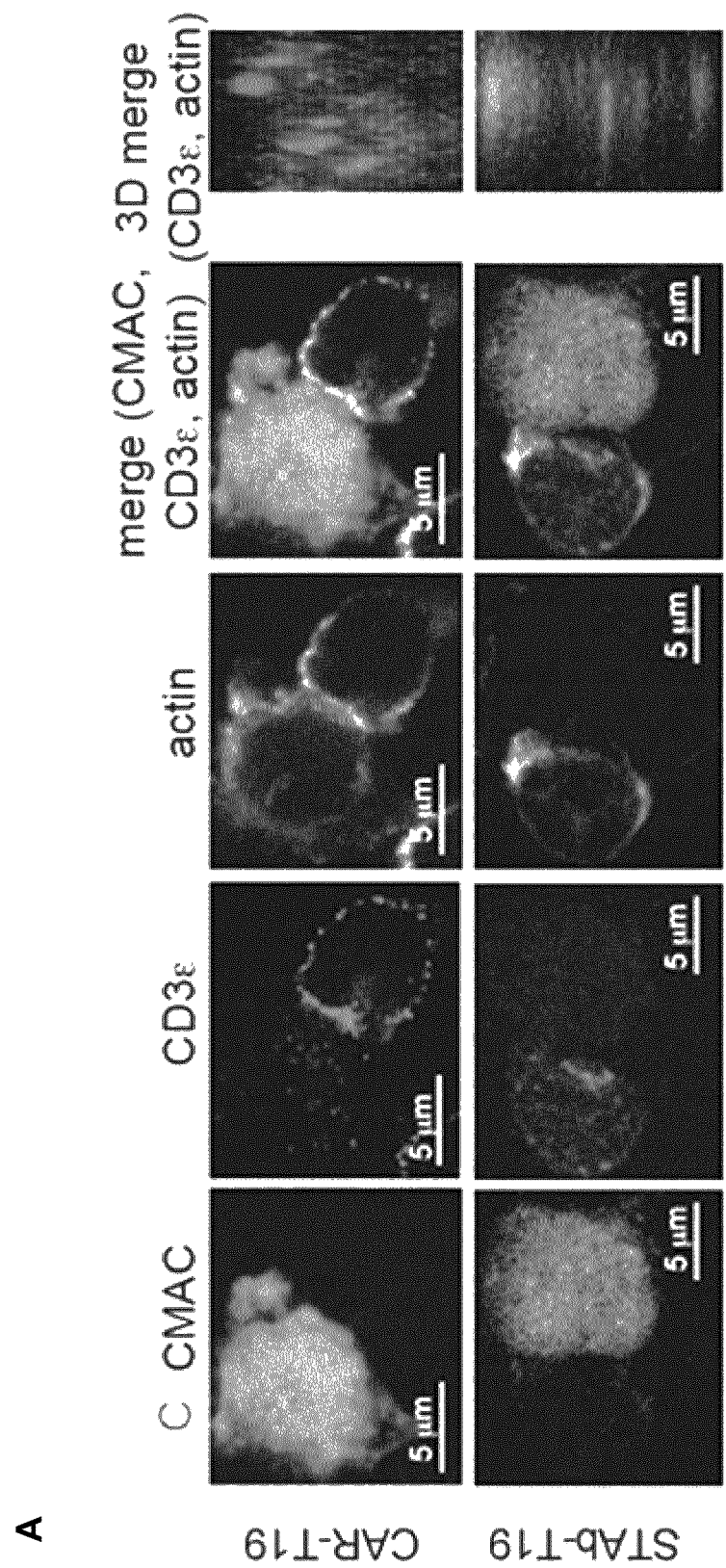
FIG. 12. (A-F) Immunological synapse assembly by primary CAR-T and STAb-T cells. Human primary CAR-T and STAb-T cells were stimulated for 15 min with Raji cells. (A) Distribution of CD3ε and actin at the mature IS. Representative cell conjugates of T cells interacting with Raji cells labelled with CMAC are shown. The green (CD3ε) and red (actin) channels, as well as the merged images, are shown. Scale bar corresponds to 5 μm. The IS topology obtained from the 3D reconstructions of region of interest placed at the IS in confocal stacks containing the red and the green channels are shown. (B) Graph representing the percentage of cell conjugates showing peripheral CD3 microclusters (in black) or cSMAC formation by CD3 coalescence (in white). Graphs representing CD3 polarization (C), actin polarization (D), CD3/actin colocalization (E) and actin clearance at the IS (F). Symbols in each sample indicate individual cells analyzed and the black line the average value. Samples were compared by an ordinary one-way ANOVA with a Tukey's multiple comparison test. *p<0.05; p<0.01; *p<0.001; ****p<0,0001. *p<0.05; p<0.01; *p<0.001; ****p<0, 0001. (B-F) Analysis from 3 independent experiments.
Figure 12:
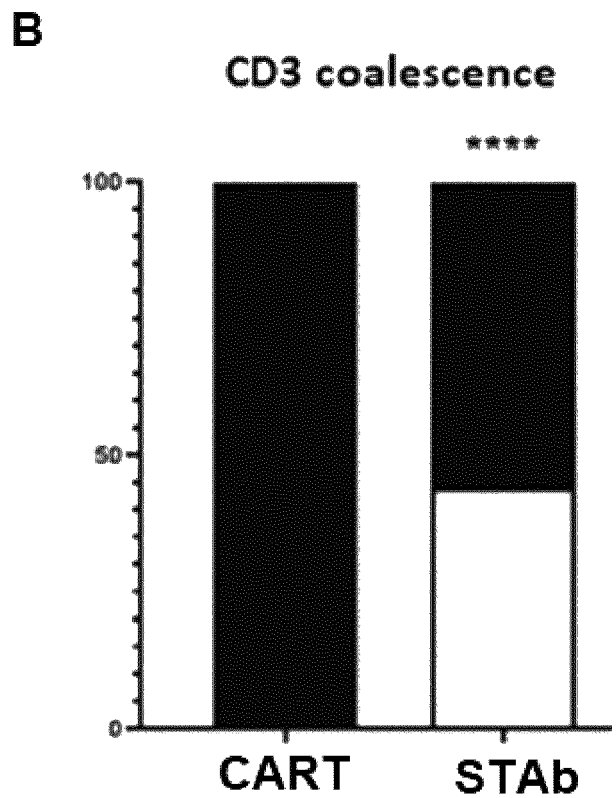
Figure 12:
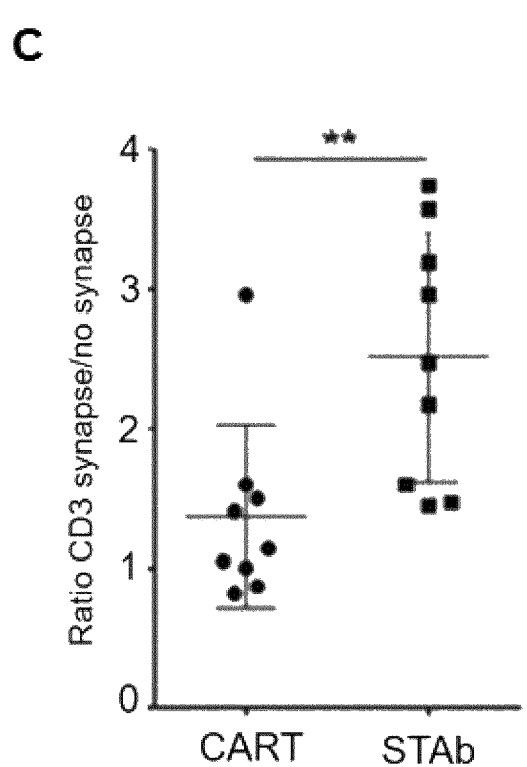
Figure 12:
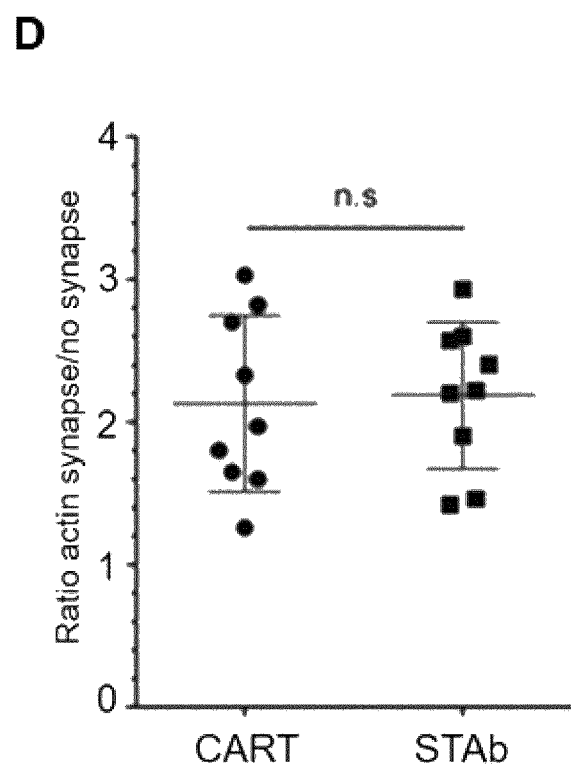
Figure 12:
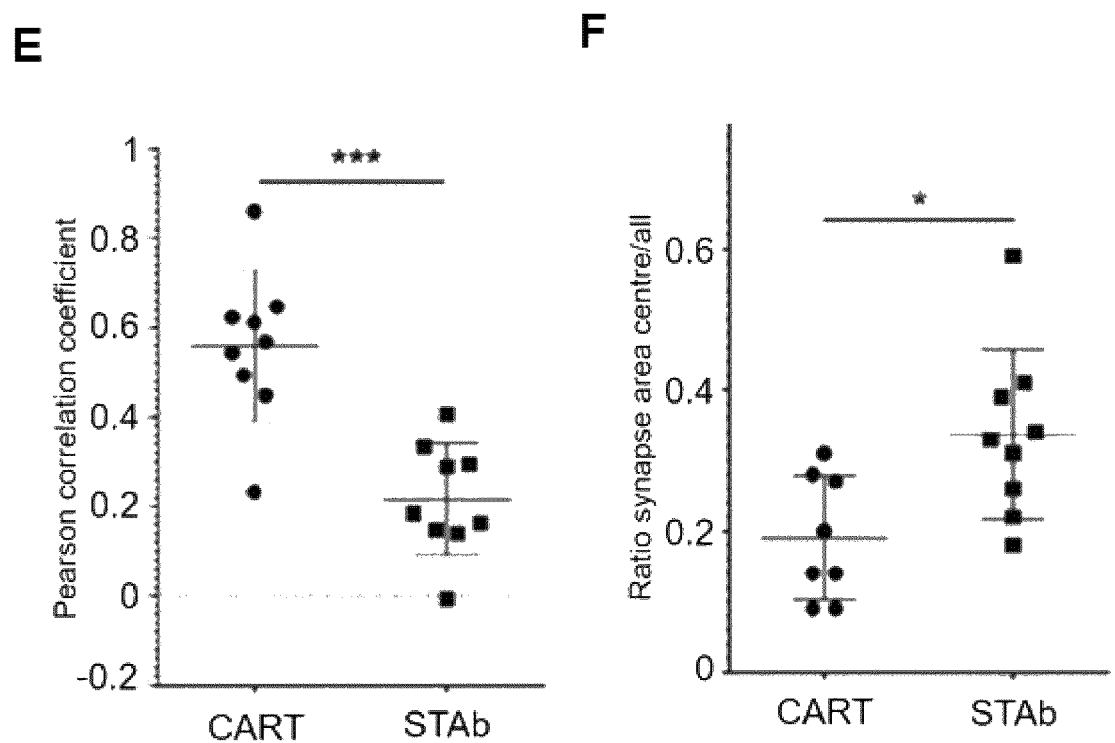

Example 6. Early Signaling During CAR- and STAb-Mediated Jurkat T Cell Activation The activation of CAR-JK and STAb-JK cells was assessed in co-cultures with Raji cells. As activation control, NT-T cells were stimulated with blinatumomab- or SEE-loaded Raji cells. As negative control, NT-JK cells were incubated with Raji cells alone. PLCγ1 and ERK1/2 activation were analyzed by Western blot due to their important role in early activation signaling downstream the TCR. Interestingly, STAb-JK cells showed PLCγ1 and ERK1/2 activation kinetics similar to NT-JK cells stimulated with SEE or blinatumomab. However, CAR-JK cells showed a more transient signaling compared to the rest of stimulation conditions (FIG. 11A, 11B).

Example 7. Immunological Synapse Assembly by Primary STAb-T and CAR-T Cells

The immunological synapse assembly by primary STAb-T cells and CAR-T cells following their interaction with Raji cells was analyzed. Primary STAb-T cells organized a canonical IS, with proper filamentous actin (F-actin) containing dSMAC and accumulation of CD3ε at the cSMAC (FIG. 12A, 12B, 12C, 12D, 12E, 12F). By contrast, primary CAR-T cells formed a non-canonical IS with disperse clusters of CD3ε and a F-actin not properly cleared from the central area of the cognate interaction (FIG. 12A, 12B, 12C, 12D, 12E, 12F).

Figure 13:
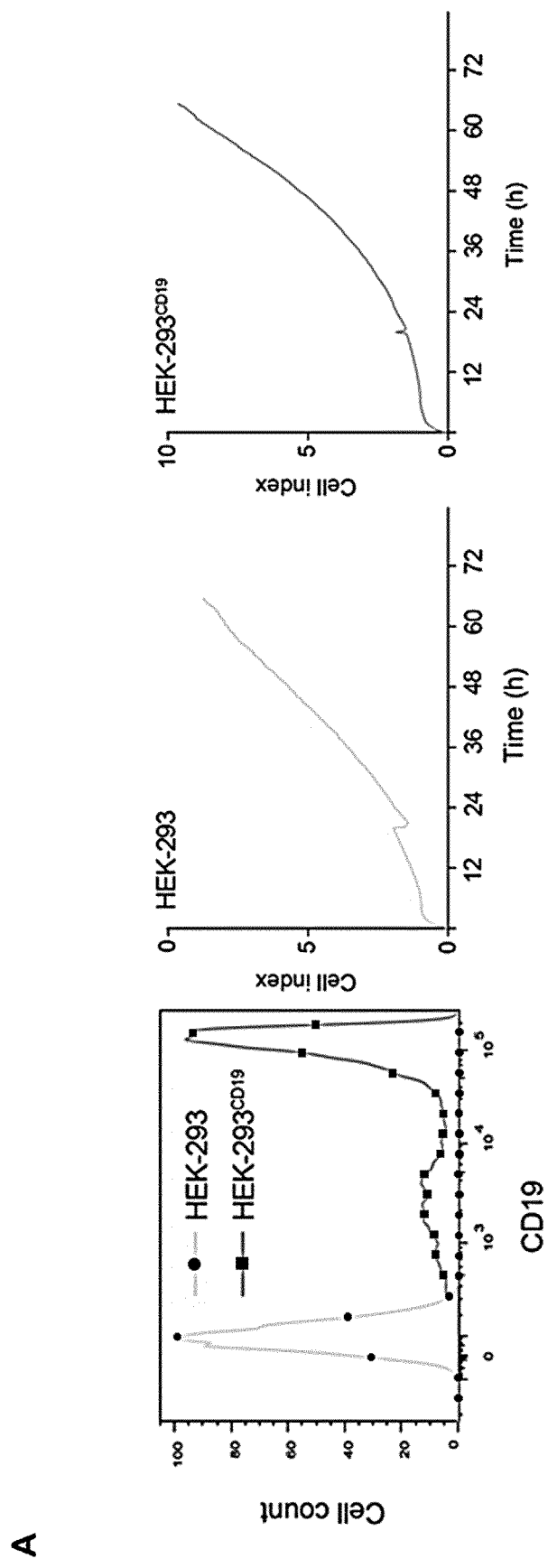
FIG. 13. Impedance-based real-time cytotoxicity assay. (A) CD19 expression by HEK-293 (line with circles) and HEK-293$^{CD19}$ (line with squares) target cells and cell viability kinetics over time of both cell lines cultured alone. (B) Cell viability kinetics of HEK-293$^{CD19}$ (upper panel) and HEK-293 (lower panel) co-cultured with different E:T ratios (line 1, E:T ratio 5:1; line 2, E:T ratio 1:1, line 3, E:T ratio 0.5:1, line 4, E:T ratio 0.12:1, line 5, E:T ratio 0.25:1) of NT-T, CAR-T or STAb-T cells, presented as percentage lysis as well (E:T ratio=0.5:1). (C). Cell viability of CAR-T (line 1) and STAb-T (line 2) cells was evaluated over 72 h with measurements taken at 15 min intervals. Cell Index values were determined and normalized. Results from one of two experiments performed in duplicate are shown.
Figure 13:
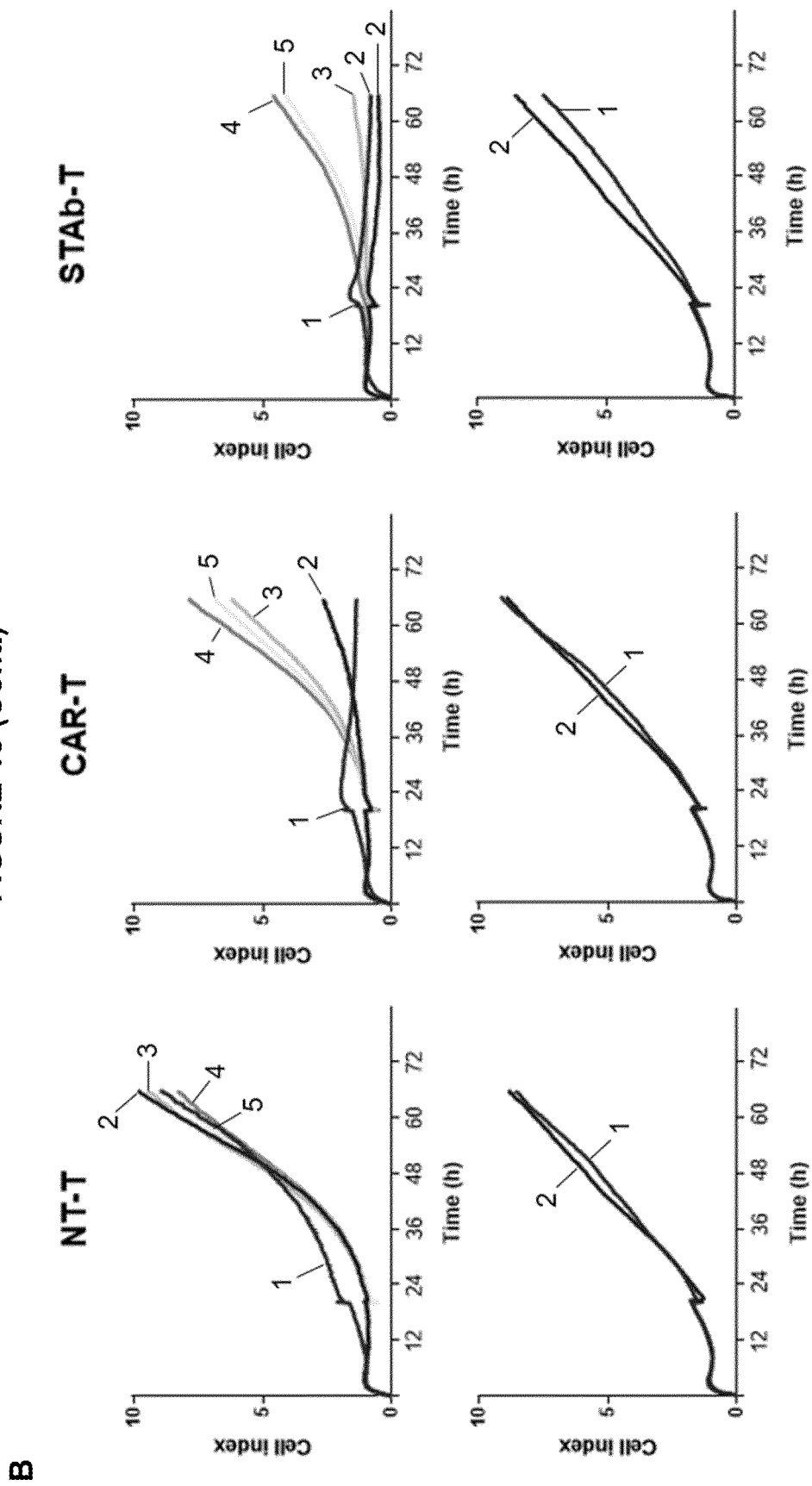
Figure 13:
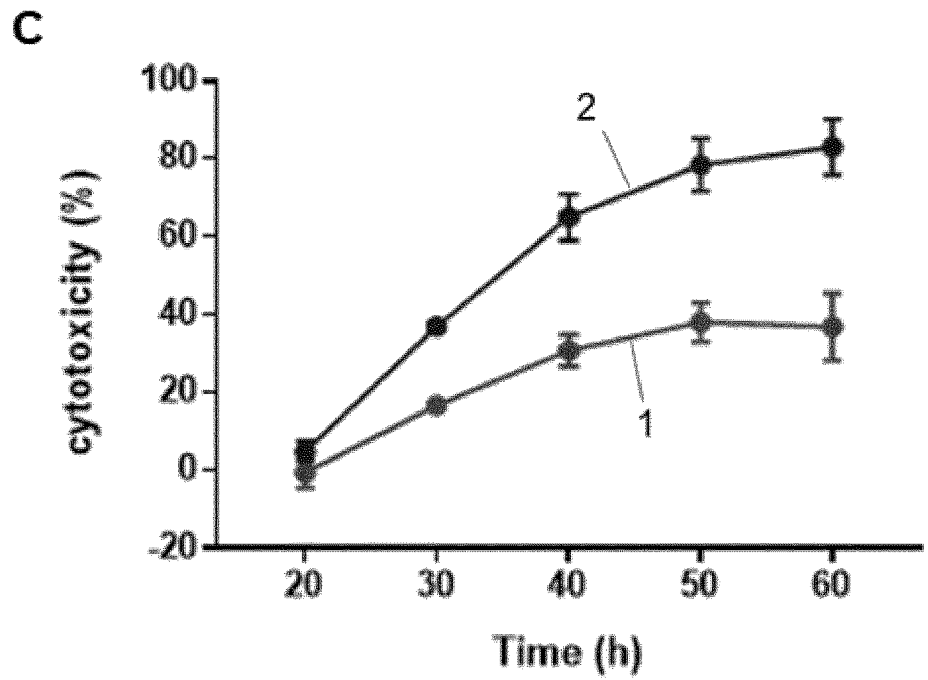

Example 8. CD19 STAb-T Cells Exhibited Superior Killing Ability than CD19 CAR-T Cells In an impedance-based cytotoxicity assay for real-time and label-free assessment of T cell-mediated killing primary STAb-T cells were found to mediate rapid reduction in target cell viability against adherent CD19$^+$ cells (FIG. 13A) at all the effector to target (E:T) ratios tested, whereas primary CAR-T cells showed cytotoxic effect only at the highest E:T ratios (FIG. 13B). When displayed as percentage cytotoxicity at several time points, STAb-T cells were significantly more effective than CAR-T cells (FIG. 13C). By contrast, CD19$^+$ cells co-cultured with non-transduced (NT)-T cells, or CD19$^-$ cells co-cultured with NT-T, CAR-T or STAb-T cells, displayed similar viability kinetics than those showed by target cells cultured alone (FIG. 13B).

Figure 14:
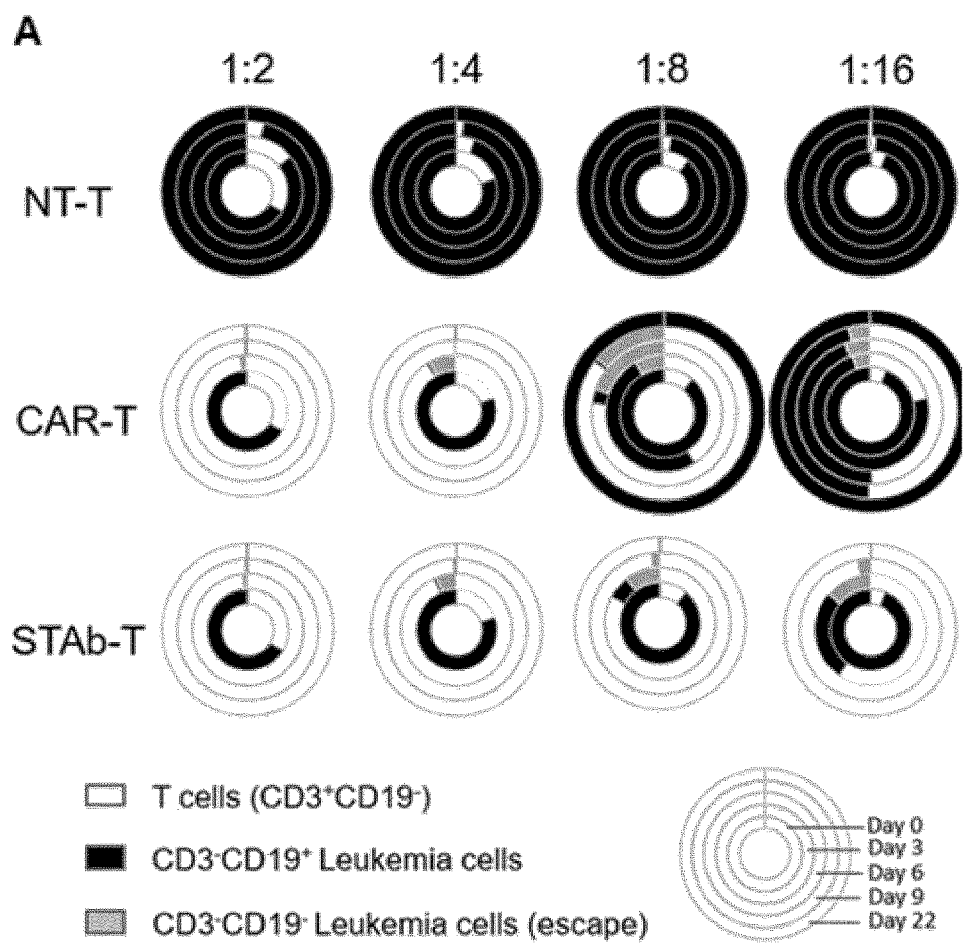
FIG. 14. Leukemia escape from immune pressure. NT-T, CAR-T or STAb-T cells (CD3+CD19−) were co-cultured with Nalm6 (CD3−CD19$^+$) target cells at the indicated effector:target (E:T) ratios. Expression of CD19 and CD3 was analyzed, by flow cytometry, in cell co-cultures at time 0 and after 3, 6, 9 and 22 days. (A) Percentage of: T cells (CD3+CD19−), wild type leukemic cells (CD3−CD19$^+$) and leukemic cells that have lost CD19 expression (CD3−CD19−) at the indicated time points. Data are mean of 3 similar experiments. (B) Representative dot plots showing the different cells populations present, after the indicated times, in CAR-T/Nalm6 cell co-cultures performed at an E:T ratio 1:16.
Figure 14:
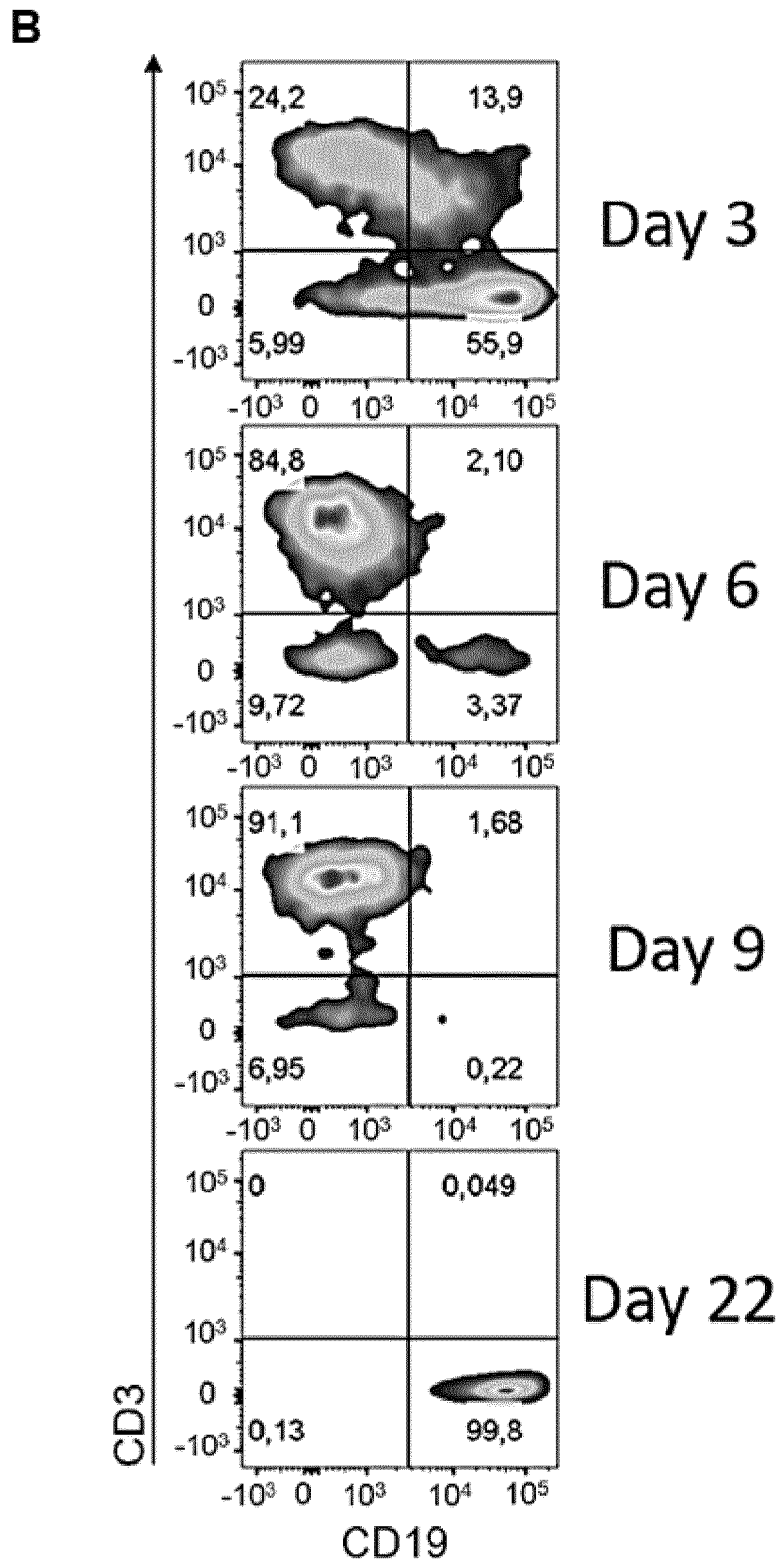

Example 9. CD19$^+$ Leukemia Cells Escape from Immune Control Exerted by CAR-T and STAb-T Cells Next, the ability of CD19$^+$ leukemic B cells to escape from immune control was studied by co-culturing primary CAR and STAb T cells with Nalm6 cells at low E:T ratios. Whereas co-culture with NT-T cells did not inhibit the growth of Nalm6 cells (FIG. 14A), STAb-T cells completely eliminated all leukemia cells from day 6 (FIG. 14A), even at the 1:16 E:T ratio (FIG. 14A). By contrast, CAR-T cells did not eliminate CD19$^+$ cells at the 1:8 E:T ratio where leukemia cells persist, with a partial down-modulation of CD19 (FIG. 14A). On day 6, Nalm6 cells have almost completely lost surface expression of CD19, a situation that was still evident on day 9. Thereafter, leukemia cells progressed and recover surface expression of CD19 (FIG. 14B).

Figure 15:
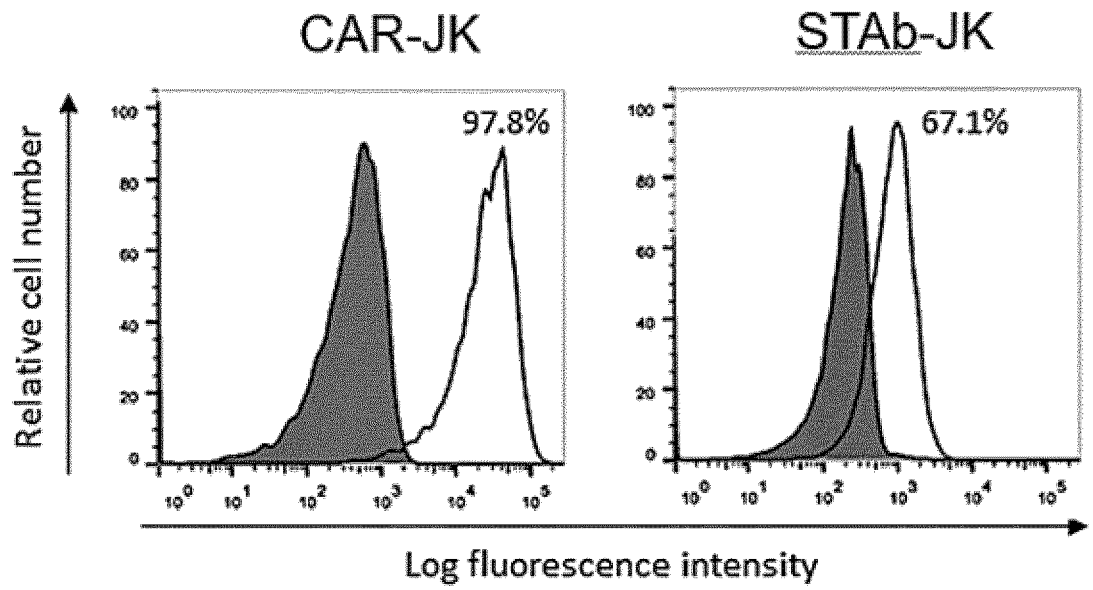
FIG. 15. Modulation of cell surface by transduced Jurkat T cells. Jurkat T cells were transduced (MOI 5) with an A3B1-CAR or A3B1-OKT3 bispecific antibody encoding a lentiviral vector, to obtain CAR-JK or STAb-JK cells, respectively. (A) Level of CAR expression was detected with anti-mouse-Fab mAb and BiTE cell-surface decoration was detected with an anti-His mAb. (B) Non-transduced Jurkat T cells (NT-JK), CAR-JK or STAb-JK were co-cultured with Nalm6 cells at 1:1 E:T ratio and surface expression of CD3, CD19, CD2 and CD10 were analyzed at time 0 and after 2 h. (C) CD19 cell-surface and intracellular expression on Nalm6 cells co-cultured for 2 hours with STAb-JK cells in the absence or the presence of bafilomycin A1.
Figure 15:
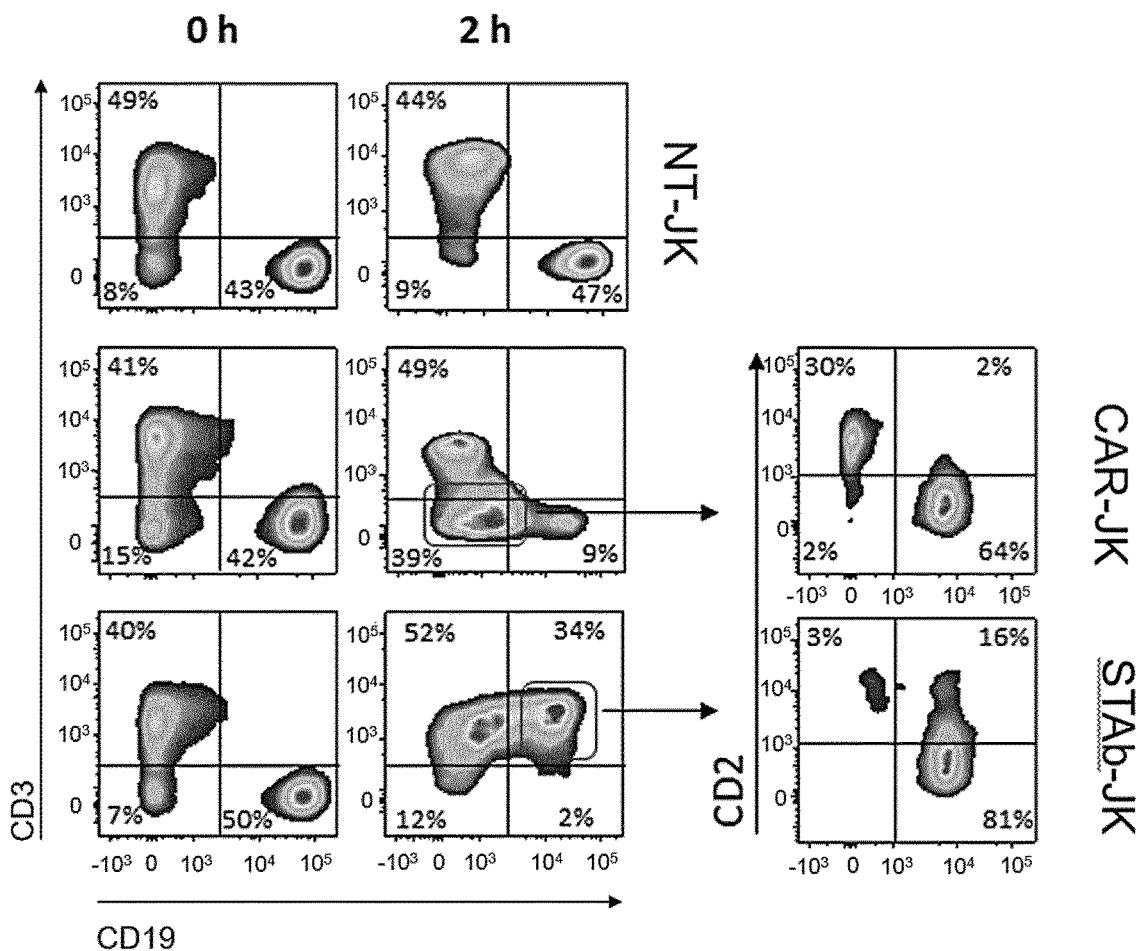
Figure 15:
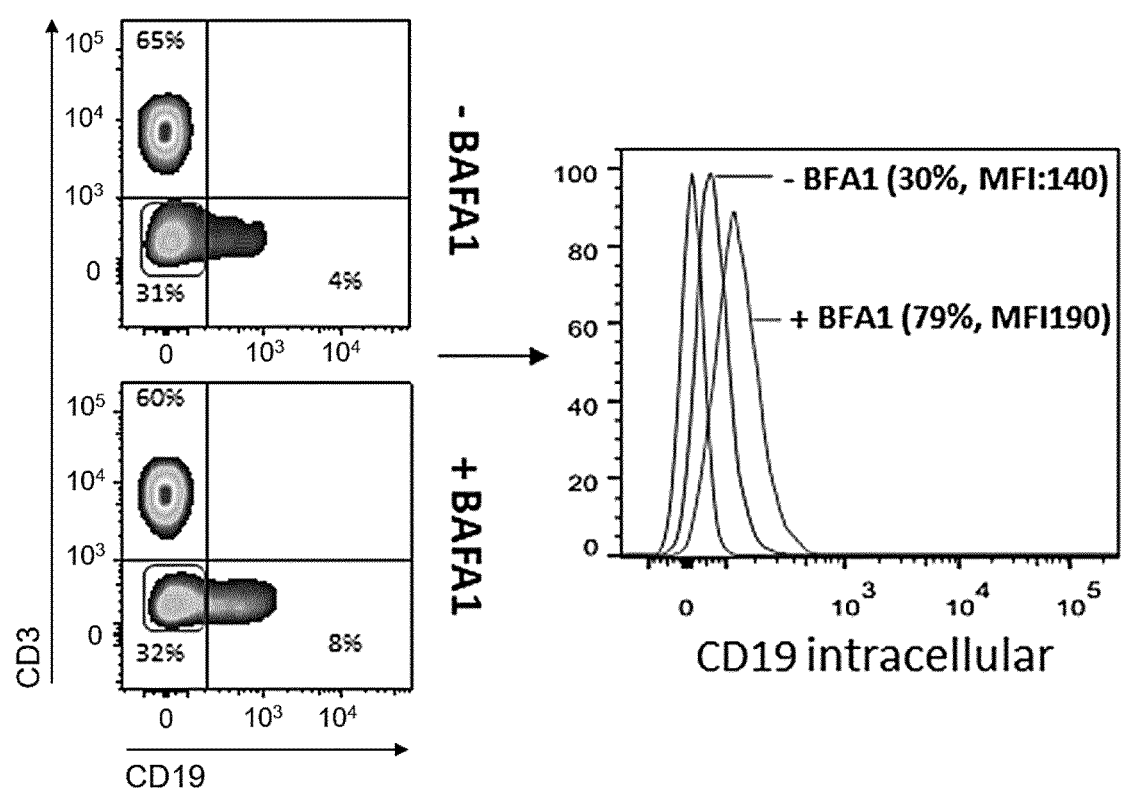

To more carefully study leukemia escape, Nalm6 cells were co-cultured at 1:1 E:T ratio with lentivirally-transduced Jurkat T cells, CAR-JK or STAb-JK (FIG. 15A). Nalm6 cells showed a rapid and nearly complete CD19 down-modulation after 2 hours co-culture with CAR-JK cells, that did not affect CD10 expression (FIG. 15B). The CAR CD19 molecules were profoundly down-modulated from the Jurkat cell surface after encountering CD19$^+$ cells, while the expression of CD3 was unaffected (FIG. 15B). CD19 was not lost in co-culture with STAb-JK cells, where a large population of CD3+CD19$^+$ cells was found, consisting predominantly of CD2$^-$CD10$^+$ cells (FIG. 15B). Although the CD3 expression level was slightly lower, there were no significant differences in the percentage of CD3$^+$ cells, but the transfer of CD3 protein from STAb-JK cells to Nalm6 cells was evident (FIG. 15B). To further study the mechanism of CAR-mediated downmodulation CAR-JK cells and Nalm6 cells were co-cultured for two hours either in the absence, or presence of bafilomycin A1 (BafA1), a specific inhibitor of vacuolar H$^+$-ATPase (V-ATPase). After cell surface CD19 staining with PCy7-labelled anti-CD19 J3-119 mAb, cells were fixed and permeabilized, then stained with PCy5-labelled anti-CD19 J3-119 mAb. As shown in FIG. 15C, BafA1-treated cells expressed significantly higher amounts of intracellular CD19 than untreated cells. These results suggest that CD19 is rapidly internalized and degraded by Nalm6 cells following interaction with the CAR.

Sequence Listing Free Text

The sequence listing contains free text, which is shown in Table 2.

TABLE 2

| SEQ ID NO | Position | Text |
|---|---|---|
| 1 | | A3B1-OKT3 bispecific antibody comprising A3B1 anti-CD19 scFv and OKT3 anti-CD3 scFv |
| | 1 ... 22 | Human kappa light chain signal peptide L1 |
| | 26 ... 135 | A3B1 light chain variable domain |
| | 51 ... 60 | A3B1 light chain CDR1 region |
| | 78 ... 80 | A3B1 light chain CDR2 region |
| | 117 ... 125 | A3B1 light chain CDR3 region |
| | 136 ... 155 | Linker 1 |

TABLE 2-continued

| SEQ ID NO | Position | Text |
|---|---|---|
| | 157...279 | A3B1 heavy chain variable domain |
| | 183...190 | A3B1 heavy chain CDR1 region |
| | 208...215 | A3B1 heavy chain CDR2 region |
| | 254...268 | A3B1 heavy chain CDR3 region |
| | 280...284 | Linker 2 |
| | 286...404 | OKT3 heavy chain variable domain |
| | 311...318 | OKT3 heavy chain CDR1 region |
| | 336...343 | OKT3 heavy chain CDR2 region |
| | 382...393 | OKT3 heavy chain CDR3 region |
| | 405...525 | Linker 3 |
| | 420...525 | OKT3 light chain variable domain |
| | 446...450 | OKT3 light chain CDR1 region |
| | 468...470 | OKT3 light chain CDR2 region |
| | 507...515 | OKT3 light chain CDR3 region |
| | 528...533 | Polyhistidine tag |
| 2 | | Human kappa light chain signal peptide L1 |
| 3 | | A3B1 light chain variable domain |
| 4 | | Linker 1 |
| 5 | | A3B1 heavy chain variable domain |
| 6 | | Linker 2 |
| 7 | | OKT3 heavy chain variable domain |
| 8 | | Linker 3 |
| 9 | | OKT3 light chain variable domain |
| 10 | | A3B1 light chain CDR1 region |
| 11 | | A3B1 light chain CDR3 region |
| 12 | | A3B1 heavy chain CDR1 region |
| 13 | | A3B1 heavy chain CDR2 region |
| 14 | | A3B1 heavy chain CDR3 region |
| 15 | | OKT3 heavy chain CDR1 region |
| 16 | | OKT3 heavy chain CDR2 region |
| 17 | | OKT3 heavy chain CDR3 region |
| 18 | | OKT3 light chain CDR1 region |
| 19 | | OKT3 light chain CDR3 region |
| 20 | | Artificial gene encoding for A3B1-OKT3 bispecific antibody |

CITATION LIST

Blanco et al. (2019). T Cell-Redirecting Strategies to 'STAb' Tumors: Beyond CARs and Bispecific Antibodies. *Trends Immunol.*, 40(3), 243-257.

Bluemel et al. (2010). Epitope distance to the target cell membrane and antigen size determine the potency of T cell-mediated lysis by BiTE antibodies specific for a large melanoma surface antigen. *Cancer Immunol. Immunother.*, 59, 1197-1209.

Castella et al. (2019). Development of a Novel Anti-CD19 Chimeric Antigen Receptor: A Paradigm for an Affordable CAR T Cell Production at Academic Institutions. *Mol. Ther.—Methods Clin. Dev.*, 12, 134-144.

Iwahori et al. (2015). Engager T cells: a new class of antigen-specific T cells that redirect bystander T cells. *Mol. Ther.*, 23,171-8.

Kjer-Nielsen et al. (2004). Crystal structure of the human T cell receptor CD3 epsilon gamma heterodimer complexed to the therapeutic mAb OKT3. *Proc. Natl. Acad. Sci. U.S.A.*, 101, 7675-7680.

Liu et al. (2016). Improved anti-leukemia activities of adoptively transferred T cells expressing bispecific T-cell engager in mice. *Blood Cancer J.*, 6, e430.

Velasquez et al. (2016). T cells expressing CD19-specific Engager Molecules for the Immunotherapy of CD19-positive Malignancies. *Sci. Rep.*, 6, 27130.

The invention claimed is:

1. T cells characterized by secreting a bispecific antibody comprising:
    an anti-CD19 single-chain fragment variable (scFv) comprising an anti-CD19 light chain variable domain $V_L$CD19 and an anti-CD19 heavy chain variable domain $V_H$CD19,
    an anti-CD3 single-chain fragment variable (scFv) comprising an anti-CD3 heavy chain domain $V_H$CD3 and an anti-CD3 light chain domain $V_L$CD3,
    wherein the domains are arranged in the order $V_L$CD19-$V_H$CD19-$V_H$CD3-$V_L$CD3, wherein said bispecific antibody comprises:
    an anti-CD19 light chain CDR1 region consisting of the amino acid sequence SEQ ID NO: 10,
    an anti-CD19 light chain CDR2 region consisting of the amino acid sequence Ile-Ala-Ser,
    an anti-CD19 light chain CDR3 region consisting of the amino acid sequence SEQ ID NO: 11,
    an anti-CD19 heavy chain CDR1 region consisting of the amino acid sequence SEQ ID NO: 12,
    an anti-CD19 heavy chain CDR2 region consisting of the amino acid sequence SEQ ID NO: 13,
    an anti-CD19 heavy chain CDR3 region consisting of the amino acid sequence SEQ ID NO: 14,
    an anti-CD3 heavy chain CDR1 region consisting of the amino acid sequence SEQ ID NO: 15,
    an anti-CD3 heavy chain CDR2 region consisting of the amino acid sequence SEQ ID NO: 16 and
    an anti-CD3 heavy chain CDR3 region consisting of the amino acid sequence SEQ ID NO:
    an anti-CD3 light chain CDR1 region consisting of the amino acid sequence SEQ ID NO: 18,
    an anti-CD3 light chain CDR2 region consisting of the amino acid sequence Asp-Thr-Ser,
    an anti-CD3 light chain CDR3 region consisting of the amino acid sequence SEQ ID NO: 19,
    wherein the bispecific antibody is expressed in the cells from a polynucleotide encoding the bispecific antibody and a signal peptide selected from a human kappa light chain signal peptide or a human lambda light chain signal peptide.

2. The T cells according to claim 1 wherein the signal peptide is the human kappa light chain signal peptide L1.

3. The T cells according to claim 1 wherein the bispecific antibody is characterized in that:
    the anti-CD19 light chain variable domain $V_L$CD19 is at least 95% identical to the amino acid sequence SEQ ID NO: 3,
    the anti-CD19 heavy chain variable domain $V_H$CD19 is at least 95% identical to the amino acid sequence SEQ ID NO: 5,
    the anti-CD3 heavy chain variable domain $V_H$CD3 is at least 95% identical to the amino acid sequence SEQ ID NO: 7 and
    the anti-CD3 light chain variable domain $V_L$CD3 is at least 95% identical to the amino acid sequence SEQ ID NO: 9.

4. The T cells according to claim 1 wherein the bispecific antibody further comprises a linker.

5. The T cells according to claim 1 wherein the bispecific antibody is at least 95% identical to the amino acid sequence SEQ ID NO: 1.

6. An ex vivo method of preparation of T cells secreting a bispecific antibody, the method comprising transducing isolated T cells from a subject with a synthetic polynucleotide encoding a bispecific antibody connected to a signal sequence, or a vector comprising the same, wherein the bispecific antibody comprises:
    an anti-CD19 single-chain fragment variable (scFv) comprising an anti-CD19 light chain variable domain $V_L$CD19 and an anti-CD19 heavy chain variable domain $V_H$CD19,
    an anti-CD3 single-chain fragment variable (scFv) comprising an anti-CD3 heavy chain domain $V_H$CD3 and an anti-CD3 light chain domain $V_L$CD3,
    wherein the domains are arranged in the order $V_L$CD19-$V_H$CD19-$V_H$CD3-$V_L$CD3, wherein said bispecific antibody comprises:
    an anti-CD19 light chain CDR1 region consisting of the amino acid sequence SEQ ID NO: 10,
    an anti-CD19 light chain CDR2 region consisting of the amino acid sequence Ile-Ala-Ser,
    an anti-CD19 light chain CDR3 region consisting of the amino acid sequence SEQ ID NO: 11,
    an anti-CD19 heavy chain CDR1 region consisting of the amino acid sequence SEQ ID NO: 12,
    an anti-CD19 heavy chain CDR2 region consisting of the amino acid sequence SEQ ID NO: 13,
    an anti-CD19 heavy chain CDR3 region consisting of the amino acid sequence SEQ ID NO: 14,
    an anti-CD3 heavy chain CDR1 region consisting of the amino acid sequence SEQ ID NO: 15,
    an anti-CD3 heavy chain CDR2 region consisting of the amino acid sequence SEQ ID NO: 16 and
    an anti-CD3 heavy chain CDR3 region consisting of the amino acid sequence SEQ ID NO: 17,
    an anti-CD3 light chain CDR1 region consisting of the amino acid sequence SEQ ID NO: 18,
    an anti-CD3 light chain CDR2 region consisting of the amino acid sequence Asp-Thr-Ser,
    an anti-CD3 light chain CDR3 region consisting of the amino acid sequence SEQ ID NO: 19,
    and wherein the signal peptide is selected from a human kappa light chain signal peptide or a human lambda light chain signal peptide.

7. The method according to claim 6 wherein the signal peptide of the bispecific antibody is the human kappa light chain signal peptide L1.

8. The method according to claim 6 wherein the bispecific antibody is characterized in that:
    the anti-CD19 light chain variable domain $V_L$CD19 is at least 95% identical to the amino acid sequence SEQ ID NO: 3,
    the anti-CD19 heavy chain variable domain $V_H$CD19 is at least 95% identical to the amino acid sequence SEQ ID NO: 5,
    the anti-CD3 heavy chain variable domain $V_H$CD3 is at least 95% identical to the amino acid sequence SEQ ID NO: 7 and
    the anti-CD3 light chain variable domain $V_L$CD3 is at least 95% identical to the amino acid sequence SEQ ID NO: 9.

9. The method according to claim 6 wherein the bispecific antibody further comprises a linker.

10. The method according to claim 6 wherein the bispecific antibody is at least 95% identical to the amino acid sequence SEQ ID NO: 1.

11. T cells obtainable according to the method of claim 6.

12. A method for the treatment of a hematological malignancy or an autoimmune disorder in a subject, the method comprising administering to the subject T-cells characterized by secreting a bispecific antibody comprising:

an anti-CD19 single-chain fragment variable (scFv) comprising an anti-CD19 light chain variable domain $V_L$CD19 and an anti-CD19 heavy chain variable domain $V_H$CD19, an anti-CD3 single-chain fragment variable (scFv) comprising an anti-CD3 heavy chain domain $V_H$CD3 and an anti-CD3 light chain domain $V_L$CD3, wherein the domains are arranged in the order $V_L$CD19-$V_H$CD19-$V_H$CD3-$V_L$CD3, wherein said bispecific antibody comprises:

an anti-CD19 light chain CDR1 region consisting of the amino acid sequence SEQ ID NO: 10, an anti-CD19 light chain CDR2 region consisting of the amino acid sequence Ile-Ala-Ser, an anti-CD19 light chain CDR3 region consisting of the amino acid sequence SEQ ID NO: 11, an anti-CD19 heavy chain CDR1 region consisting of the amino acid sequence SEQ ID NO: 12, an anti-CD19 heavy chain CDR2 region consisting of the amino acid sequence SEQ ID NO: 13, an anti-CD19 heavy chain CDR3 region consisting of the amino acid sequence SEQ ID NO: 14, an anti-CD3 heavy chain CDR1 region consisting of the amino acid sequence SEQ ID NO: 15, an anti-CD3 heavy chain CDR2 region consisting of the amino acid sequence SEQ ID NO: 16 and an anti-CD3 heavy chain CDR3 region consisting of the amino acid sequence SEQ ID NO: 17, an anti-CD3 light chain CDR1 region consisting of the amino acid sequence SEQ ID NO: 18, an anti-CD3 light chain CDR2 region consisting of the amino acid sequence Asp-Thr-Ser, an anti-CD3 light chain CDR3 region consisting of the amino acid sequence SEQ ID NO: 19 wherein the bispecific antibody is expressed in the cells from a polynucleotide encoding the bispecific antibody and a signal peptide selected from a human kappa light chain signal peptide or a human lambda light chain signal peptide.

13. The method according to claim 12 wherein the signal peptide of the bispecific antibody is the human kappa light chain signal peptide L1.

14. The method according to claim 12 wherein the bispecific antibody is characterized in that:
the anti-CD19 light chain variable domain $V_L$CD19 is at least 95% identical to the amino acid sequence SEQ ID NO: 3,
the anti-CD19 heavy chain variable domain $V_H$CD19 is at least 95% identical to the amino acid sequence SEQ ID NO: 5,
the anti-CD3 heavy chain variable domain $V_H$CD3 is at least 95% identical to the amino acid sequence SEQ ID NO: 7 and
the anti-CD3 light chain variable domain $V_L$CD3 is at least 95% identical to the amino acid sequence SEQ ID NO: 9.

15. The method according to claim 12 wherein the bispecific antibody further comprises a linker.

16. The method according to claim 12 wherein the bispecific antibody is at least 95% identical to the amino acid sequence SEQ ID NO: 1.

17. The method according to claim 12 wherein said hematological malignancy is selected from the group consisting of acute B cell lymphoblastic leukemia (ALL), minimal residual disease-positive ALL, chronic lymphatic leukemia (CLL), hairy cell leukemia, non-Hodgkin's lymphoma, B cell lymphoma, mantle cell lymphoma (MCL), diffuse large B cell lymphoma (DLBCL), follicular lymphoma, marginal zone B cell lymphoma, Burkitt's lymphoma, lymphoplasmacytic lymphoma, myelodysplastic syndrome (MDS) and multiple myeloma.

18. The method according to claim 12 wherein the method is combined with a CAR-T treatment comprising administering CAR-T cells to said subject.

19. A pharmaceutical composition comprising the T cells according to claim 1 and at least one pharmaceutically acceptable excipient.

20. The method according to claim 12 wherein said autoimmune disorder is systemic lupus erythematosus.

* * * * *

SEQUENCE LISTING

```
<160> NUMBER OF SEQ ID NOS: 20

<210> SEQ ID NO 1
<211> LENGTH: 533
<212> TYPE: PRT
<213> ORGANISM: Artificial Sequence
<220> FEATURE:
<221> NAME/KEY: SIGNAL
<222> LOCATION: 1..22
<223> OTHER INFORMATION: Human kappa light chain signal peptide L1
<220> FEATURE:
<223> OTHER INFORMATION: A3B1-OKT3 bispecific antibody comprising A3B1
      anti-CD19 scFv and OKT3 anti-CD3 scFv
<220> FEATURE:
<221> NAME/KEY: DOMAIN
<222> LOCATION: 26..135
<223> OTHER INFORMATION: A3B1 light chain variable domain
<220> FEATURE:
<221> NAME/KEY: BINDING
<222> LOCATION: 51..60
<223> OTHER INFORMATION: A3B1 light chain CDR1 region
<220> FEATURE:
<221> NAME/KEY: BINDING
<222> LOCATION: 78..80
<223> OTHER INFORMATION: A3B1 light chain CDR2 region
<220> FEATURE:
<221> NAME/KEY: BINDING
<222> LOCATION: 117..125
<223> OTHER INFORMATION: A3B1 light chain CDR3 region
<220> FEATURE:
<221> NAME/KEY: DOMAIN
<222> LOCATION: 136..155
<223> OTHER INFORMATION: Linker 1
<220> FEATURE:
<221> NAME/KEY: DOMAIN
```

```
<222> LOCATION: 157..279
<223> OTHER INFORMATION: A3B1 heavy chain variable domain
<220> FEATURE:
<221> NAME/KEY: BINDING
<222> LOCATION: 183..190
<223> OTHER INFORMATION: A3B1 heavy chain CDR1 region
<220> FEATURE:
<221> NAME/KEY: BINDING
<222> LOCATION: 208..215
<223> OTHER INFORMATION: A3B1 heavy chain CDR2 region
<220> FEATURE:
<221> NAME/KEY: BINDING
<222> LOCATION: 254..268
<223> OTHER INFORMATION: A3B1 heavy chain CDR3 region
<220> FEATURE:
<221> NAME/KEY: DOMAIN
<222> LOCATION: 280..284
<223> OTHER INFORMATION: Linker 2
<220> FEATURE:
<221> NAME/KEY: DOMAIN
<222> LOCATION: 286..404
<223> OTHER INFORMATION: OKT3 heavy chain variable domain
<220> FEATURE:
<221> NAME/KEY: BINDING
<222> LOCATION: 311..318
<223> OTHER INFORMATION: OKT3 heavy chain CDR1 region
<220> FEATURE:
<221> NAME/KEY: BINDING
<222> LOCATION: 336..343
<223> OTHER INFORMATION: OKT3 heavy chain CDR2 region
<220> FEATURE:
<221> NAME/KEY: BINDING
<222> LOCATION: 382..393
<223> OTHER INFORMATION: OKT3 heavy chain CDR3 region
<220> FEATURE:
<221> NAME/KEY: DOMAIN
<222> LOCATION: 405..419
<223> OTHER INFORMATION: Linker 3
<220> FEATURE:
<221> NAME/KEY: DOMAIN
<222> LOCATION: 420..525
<223> OTHER INFORMATION: OKT3 light chain variable domain
<220> FEATURE:
<221> NAME/KEY: BINDING
<222> LOCATION: 446..450
<223> OTHER INFORMATION: OKT3 light chain CDR1 region
<220> FEATURE:
<221> NAME/KEY: BINDING
<222> LOCATION: 468..470
<223> OTHER INFORMATION: OKT3 light chain CDR2 region
<220> FEATURE:
<221> NAME/KEY: BINDING
<222> LOCATION: 507..515
<223> OTHER INFORMATION: OKT3 light chain CDR3 region
<220> FEATURE:
<221> NAME/KEY: DOMAIN
<222> LOCATION: 528..533
<223> OTHER INFORMATION: Polyhistidine tag

<400> SEQUENCE: 1

Met Asp Met Arg Val Pro Ala Gln Leu Leu Gly Leu Leu Leu Leu Trp
1               5                   10                  15

Leu Ser Gly Ala Arg Cys Thr Gly Asn Ile Val Leu Thr Gln Ser Pro
            20                  25                  30

Ala Ser Leu Ala Val Ser Leu Gly Gln Arg Ala Thr Ile Ser Cys Arg
        35                  40                  45

Ala Ser Glu Ser Val Asp Asn Phe Gly Asn Ser Phe Met His Trp Tyr
    50                  55                  60

Gln Gln Lys Ser Gly Gln Pro Pro Arg Leu Leu Ile Tyr Ile Ala Ser
65                  70                  75                  80

Asn Leu Glu Ser Gly Val Pro Ala Arg Phe Ser Gly Ser Gly Ser Arg
                85                  90                  95
```

-continued

```
Thr Asp Phe Thr Leu Thr Ile Asp Pro Val Glu Ala Asp Ala Ala
            100                 105                 110
Thr Tyr Tyr Cys His Gln Asn Asn Glu Asp Pro Leu Thr Phe Gly Ala
        115                 120                 125
Gly Thr Lys Leu Glu Leu Lys Gly Gly Gly Ser Gly Gly Gly Gly
    130                 135                 140
Ser Gly Gly Gly Gly Ser Gly Gly Gly Ser His Ser Gln Ile Gln
145                 150                 155                 160
Leu Gln Gln Ser Gly Ala Glu Leu Val Arg Pro Gly Ser Ser Val Lys
                165                 170                 175
Ile Ser Cys Lys Ala Ser Gly Phe Ala Phe Ser Ser Tyr Trp Met Asn
            180                 185                 190
Trp Val Lys Gln Arg Pro Gly Gln Gly Leu Glu Trp Ile Gly Gln Ile
        195                 200                 205
Tyr Pro Gly Asp Gly Asp Thr Lys Tyr Asn Val Lys Phe Arg Gly Lys
    210                 215                 220
Ala Thr Leu Thr Ala Asp Glu Ser Ser Ser Thr Ala Tyr Ile Gln Leu
225                 230                 235                 240
Thr Ser Leu Thr Ser Glu Asp Ser Gly Val Tyr Phe Cys Ala Arg Lys
                245                 250                 255
Arg Ile Thr Ala Val Ile Thr Val Phe Asp Val Trp Gly Ala Gly
            260                 265                 270
Thr Thr Val Thr Val Ser Ser Gly Gly Gly Ser Arg Gln Val Gln
        275                 280                 285
Leu Gln Gln Ser Gly Ala Glu Leu Ala Arg Pro Gly Ala Ser Val Lys
    290                 295                 300
Met Ser Cys Lys Ala Ser Gly Tyr Thr Phe Thr Arg Tyr Thr Met His
305                 310                 315                 320
Trp Val Lys Gln Arg Pro Gly Gln Gly Leu Glu Trp Ile Gly Tyr Ile
                325                 330                 335
Asn Pro Ser Arg Gly Tyr Thr Asn Tyr Asn Gln Lys Phe Lys Asp Lys
            340                 345                 350
Ala Thr Leu Thr Thr Asp Lys Ser Ser Ser Thr Ala Tyr Met Gln Leu
        355                 360                 365
Ser Ser Leu Thr Ser Glu Asp Ser Ala Val Tyr Tyr Cys Ala Arg Tyr
    370                 375                 380
Tyr Asp Asp His Tyr Cys Leu Asp Tyr Trp Gly Gln Gly Thr Thr Leu
385                 390                 395                 400
Thr Val Ser Ser Gly Gly Gly Ser Gly Gly Gly Gly Ser Gly Gly
                405                 410                 415
Gly Gly Ser Asp Ile Asp Leu Thr Gln Ser Pro Ala Ile Met Ser Ala
            420                 425                 430
Ser Pro Gly Glu Lys Val Thr Met Thr Cys Ser Ala Ser Ser Ser Val
        435                 440                 445
Ser Tyr Met Asn Trp Tyr Gln Gln Lys Ser Gly Thr Ser Pro Lys Arg
    450                 455                 460
Trp Ile Tyr Asp Thr Ser Lys Leu Ala Ser Gly Val Pro Ala His Phe
465                 470                 475                 480
Arg Gly Ser Gly Ser Gly Thr Ser Tyr Ser Leu Thr Ile Ser Gly Met
                485                 490                 495
Glu Ala Glu Asp Ala Ala Thr Tyr Tyr Cys Gln Gln Trp Ser Ser Asn
            500                 505                 510
Pro Phe Thr Phe Gly Ser Gly Thr Lys Leu Glu Ile Asn Arg Ala His
```

His His His His His
    530

<210> SEQ ID NO 2
<211> LENGTH: 25
<212> TYPE: PRT
<213> ORGANISM: Artificial Sequence
<220> FEATURE:
<223> OTHER INFORMATION: Human kappa light chain signal peptide L1

<400> SEQUENCE: 2

Met Asp Met Arg Val Pro Ala Gln Leu Leu Gly Leu Leu Leu Trp
1               5                   10                  15

Leu Ser Gly Ala Arg Cys Thr Gly Asn
            20                  25

<210> SEQ ID NO 3
<211> LENGTH: 110
<212> TYPE: PRT
<213> ORGANISM: Artificial Sequence
<220> FEATURE:
<223> OTHER INFORMATION: A3B1 light chain variable domain

<400> SEQUENCE: 3

Ile Val Leu Thr Gln Ser Pro Ala Ser Leu Ala Val Ser Leu Gly Gln
1               5                   10                  15

Arg Ala Thr Ile Ser Cys Arg Ala Ser Glu Ser Val Asp Asn Phe Gly
            20                  25                  30

Asn Ser Phe Met His Trp Tyr Gln Gln Lys Ser Gly Gln Pro Pro Arg
        35                  40                  45

Leu Leu Ile Tyr Ile Ala Ser Asn Leu Glu Ser Gly Val Pro Ala Arg
    50                  55                  60

Phe Ser Gly Ser Gly Ser Arg Thr Asp Phe Thr Leu Thr Ile Asp Pro
65                  70                  75                  80

Val Glu Ala Asp Asp Ala Ala Thr Tyr Tyr Cys His Gln Asn Asn Glu
                85                  90                  95

Asp Pro Leu Thr Phe Gly Ala Gly Thr Lys Leu Glu Leu Lys
            100                 105                 110

<210> SEQ ID NO 4
<211> LENGTH: 20
<212> TYPE: PRT
<213> ORGANISM: Artificial Sequence
<220> FEATURE:
<223> OTHER INFORMATION: Linker 1

<400> SEQUENCE: 4

Gly Gly Gly Gly Ser Gly Gly Gly Gly Ser Gly Gly Gly Gly Ser Gly
1               5                   10                  15

Gly Gly Gly Ser
            20

<210> SEQ ID NO 5
<211> LENGTH: 122
<212> TYPE: PRT
<213> ORGANISM: Artificial Sequence
<220> FEATURE:
<223> OTHER INFORMATION: A3B1 heavy chain variable domain

<400> SEQUENCE: 5

Gln Ile Gln Leu Gln Gln Ser Gly Ala Glu Leu Val Arg Pro Gly Ser

```
                 1               5                  10                 15
Ser Val Lys Ile Ser Cys Lys Ala Ser Gly Phe Ala Phe Ser Ser Tyr
                 20                 25                 30

Trp Met Asn Trp Val Lys Gln Arg Pro Gly Gln Gly Leu Glu Trp Ile
            35                 40                 45

Gly Gln Ile Tyr Pro Gly Asp Gly Asp Thr Lys Tyr Asn Val Lys Phe
        50                 55                 60

Arg Gly Lys Ala Thr Leu Thr Ala Asp Glu Ser Ser Ser Thr Ala Tyr
 65                 70                 75                 80

Ile Gln Leu Thr Ser Leu Thr Ser Glu Asp Ser Gly Val Tyr Phe Cys
                85                 90                 95

Ala Arg Lys Arg Ile Thr Ala Val Ile Thr Thr Val Phe Asp Val Trp
                100                105                110

Gly Ala Gly Thr Thr Val Thr Val Ser Ser
            115                120

<210> SEQ ID NO 6
<211> LENGTH: 5
<212> TYPE: PRT
<213> ORGANISM: Artificial Sequence
<220> FEATURE:
<223> OTHER INFORMATION: Linker 2

<400> SEQUENCE: 6

Gly Gly Gly Gly Ser
1               5

<210> SEQ ID NO 7
<211> LENGTH: 119
<212> TYPE: PRT
<213> ORGANISM: Artificial Sequence
<220> FEATURE:
<223> OTHER INFORMATION: OKT3 heavy chain variable domain

<400> SEQUENCE: 7

Gln Val Gln Leu Gln Gln Ser Gly Ala Glu Leu Ala Arg Pro Gly Ala
1               5                  10                 15

Ser Val Lys Met Ser Cys Lys Ala Ser Gly Tyr Thr Phe Thr Arg Tyr
                20                 25                 30

Thr Met His Trp Val Lys Gln Arg Pro Gly Gln Gly Leu Glu Trp Ile
            35                 40                 45

Gly Tyr Ile Asn Pro Ser Arg Gly Tyr Thr Asn Tyr Asn Gln Lys Phe
        50                 55                 60

Lys Asp Lys Ala Thr Leu Thr Thr Asp Lys Ser Ser Ser Thr Ala Tyr
 65                 70                 75                 80

Met Gln Leu Ser Ser Leu Thr Ser Glu Asp Ser Ala Val Tyr Tyr Cys
                85                 90                 95

Ala Arg Tyr Tyr Asp Asp His Tyr Cys Leu Asp Tyr Trp Gly Gln Gly
                100                105                110

Thr Thr Leu Thr Val Ser Ser
            115

<210> SEQ ID NO 8
<211> LENGTH: 15
<212> TYPE: PRT
<213> ORGANISM: Artificial Sequence
<220> FEATURE:
<223> OTHER INFORMATION: Linker 3

<400> SEQUENCE: 8
```

```
Gly Gly Gly Gly Ser Gly Gly Gly Ser Gly Gly Gly Ser
1               5                   10                  15

<210> SEQ ID NO 9
<211> LENGTH: 106
<212> TYPE: PRT
<213> ORGANISM: Artificial Sequence
<220> FEATURE:
<223> OTHER INFORMATION: OKT3 light chain variable domain

<400> SEQUENCE: 9

Asp Ile Asp Leu Thr Gln Ser Pro Ala Ile Met Ser Ala Ser Pro Gly
1               5                   10                  15

Glu Lys Val Thr Met Thr Cys Ser Ala Ser Ser Ser Val Ser Tyr Met
            20                  25                  30

Asn Trp Tyr Gln Gln Lys Ser Gly Thr Ser Pro Lys Arg Trp Ile Tyr
        35                  40                  45

Asp Thr Ser Lys Leu Ala Ser Gly Val Pro Ala His Phe Arg Gly Ser
    50                  55                  60

Gly Ser Gly Thr Ser Tyr Ser Leu Thr Ile Ser Gly Met Glu Ala Glu
65                  70                  75                  80

Asp Ala Ala Thr Tyr Tyr Cys Gln Gln Trp Ser Ser Asn Pro Phe Thr
                85                  90                  95

Phe Gly Ser Gly Thr Lys Leu Glu Ile Asn
            100                 105

<210> SEQ ID NO 10
<211> LENGTH: 10
<212> TYPE: PRT
<213> ORGANISM: Artificial Sequence
<220> FEATURE:
<223> OTHER INFORMATION: A3B1 light chain CDR1 region

<400> SEQUENCE: 10

Glu Ser Val Asp Asn Phe Gly Asn Ser Phe
1               5                   10

<210> SEQ ID NO 11
<211> LENGTH: 9
<212> TYPE: PRT
<213> ORGANISM: Artificial Sequence
<220> FEATURE:
<223> OTHER INFORMATION: A3B1 light chain CDR3 region

<400> SEQUENCE: 11

His Gln Asn Asn Glu Asp Pro Leu Thr
1               5

<210> SEQ ID NO 12
<211> LENGTH: 8
<212> TYPE: PRT
<213> ORGANISM: Artificial Sequence
<220> FEATURE:
<223> OTHER INFORMATION: A3B1 heavy chain CDR1 region

<400> SEQUENCE: 12

Gly Phe Ala Phe Ser Ser Tyr Trp
1               5

<210> SEQ ID NO 13
<211> LENGTH: 8
<212> TYPE: PRT
<213> ORGANISM: Artificial Sequence
```

```
<220> FEATURE:
<223> OTHER INFORMATION: A3B1 heavy chain CDR2 region

<400> SEQUENCE: 13

Ile Tyr Pro Gly Asp Gly Asp Thr
1               5

<210> SEQ ID NO 14
<211> LENGTH: 15
<212> TYPE: PRT
<213> ORGANISM: Artificial Sequence
<220> FEATURE:
<223> OTHER INFORMATION: A3B1 heavy chain CDR3 region

<400> SEQUENCE: 14

Ala Arg Lys Arg Ile Thr Ala Val Ile Thr Thr Val Phe Asp Val
1               5                   10                  15

<210> SEQ ID NO 15
<211> LENGTH: 15
<212> TYPE: PRT
<213> ORGANISM: Artificial Sequence
<220> FEATURE:
<223> OTHER INFORMATION: A3B1 heavy chain CDR3 region

<400> SEQUENCE: 15

Ala Arg Lys Arg Ile Thr Ala Val Ile Thr Thr Val Phe Asp Val
1               5                   10                  15

<210> SEQ ID NO 16
<211> LENGTH: 8
<212> TYPE: PRT
<213> ORGANISM: Artificial Sequence
<220> FEATURE:
<223> OTHER INFORMATION: OKT3 heavy chain CDR2 region

<400> SEQUENCE: 16

Ile Asn Pro Ser Arg Gly Tyr Thr
1               5

<210> SEQ ID NO 17
<211> LENGTH: 12
<212> TYPE: PRT
<213> ORGANISM: Artificial Sequence
<220> FEATURE:
<223> OTHER INFORMATION: OKT3 heavy chain CDR3 region

<400> SEQUENCE: 17

Ala Arg Tyr Tyr Asp Asp His Tyr Cys Leu Asp Tyr
1               5                   10

<210> SEQ ID NO 18
<211> LENGTH: 5
<212> TYPE: PRT
<213> ORGANISM: Artificial Sequence
<220> FEATURE:
<223> OTHER INFORMATION: OKT3 light chain CDR1 region

<400> SEQUENCE: 18

Ser Ser Val Ser Tyr
1               5

<210> SEQ ID NO 19
<211> LENGTH: 9
<212> TYPE: PRT
<213> ORGANISM: Artificial Sequence
<220> FEATURE:
```

<223> OTHER INFORMATION: OKT3 light chain CDR3 region

<400> SEQUENCE: 19

Gln Gln Trp Ser Ser Asn Pro Phe Thr
1               5

<210> SEQ ID NO 20
<211> LENGTH: 1605
<212> TYPE: DNA
<213> ORGANISM: Artificial Sequence
<220> FEATURE:
<223> OTHER INFORMATION: Artificial gene encoding for A3B1-OKT3
       bispecific antibody

<400> SEQUENCE: 20

```
atggacatga gggtccctgc tcagctcctg gggctcctgc tgctctggct ctcaggtgcc      60
agatgtaccg gtaacatcgt gctgactcag agcccagcat ccctggccgt ctcactggga     120
cagcgggcta ccatcagctg cagagcaagc gagtccgtgg acaacttcgg aaattccttt     180
atgcactggt accagcagaa gtctggccag cccctcgac tgctgatcta tattgcctct     240
aacctggaga gtggcgtgcc agctaggttc tctggcagtg ggtcacgcac agactttacc     300
ctgacaattg atcccgtcga agccgacgat gccgctacct actattgcca ccagaacaac     360
gaggacccac tgactttcgg agcagggaca aaactggaac tgaagggtgg aggcgggagc     420
ggaggaggcg gtcgggagg aggaggatcg ggtggcggag gctcacattc tcagattcag     480
ctgcagcagt cgggggcaga gctggtgcgg ccagggtcct cagtcaagat tagttgtaag     540
gcttcaggct ttgcttttca gctcctactgg atgaactggg tgaaacagcg accaggacag     600
ggactggagt ggatcggaca gatctacccc ggagacggcg atacaaagta taatgtcaaa     660
tttcggggca aggccaccct gacagctgac gagtctagtt caaccgccta catccagctg     720
acttcactga ccagcgaaga ttccggcgtg tatttctgcg ctcgaaagcg atcactgca     780
gtcattacca cagtgtttga cgtgtggggg gcaggaacta ccgtgaccgt cagctccggc     840
ggaggtggca gtcgacaggt gcagctgcag cagagcggag ccgaactggc cagaccagga     900
gccagcgtga agatgagctg caaggctagc ggctacacct tcacccggta caccatgcac     960
tgggtgaaac agaggcctgg acagggcctg aatggatcg ctacatcaa ccccagccgg    1020
ggctacacca actacaacca gaagttcaag gacaaggcca ccctgaccac cgacaagagc    1080
agcagcaccg cctacatgca gctgagcagc ctgaccagcg aggacagcgc cgtgtactac    1140
tgcgcccggt actacgacga ccactactgc ctggactact ggggccaggg caccaccctg    1200
acagtgtcta gcggcggagg cggaagtgga ggcggaggaa gcggaggcgg cggatctgac    1260
atcgacctga cccagagccc tgccatcatg tctgccagcc tggcgagaa agtgaccatg    1320
acctgcagcg ccagcagcag cgtgtcctac atgaactggt atcagcagaa gtccggcacc    1380
agccccaagc ggtggatcta cgacaccagc aaactggcca cgcgcgtgcc agcccacttt    1440
agaggctccg gcagcggcac cagctactcc ctgaccatca gcggcatgga agccgaggac    1500
gccgccacct actactgcca gcagtggagc agcaacccct tcaccttcgg ctccggcacc    1560
aagctggaaa tcaaccgggc caccaccac catcaccact gataa                    1605
```